(12) United States Patent
Su et al.

(10) Patent No.: US 12,474,541 B2
(45) Date of Patent: Nov. 18, 2025

(54) IMAGING LENS ASSEMBLY MODULE, IMAGING LENS ASSEMBLY DRIVING MODULE, CAMERA MODULE AND ELECTRONIC DEVICE

(71) Applicant: LARGAN PRECISION CO., LTD., Taichung (TW)

(72) Inventors: Heng-Yi Su, Taichung (TW); Ming-Ta Chou, Taichung (TW); Cheng-Feng Lin, Taichung (TW); Ming-Shun Chang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 791 days.

(21) Appl. No.: 17/527,220

(22) Filed: Nov. 16, 2021

(65) Prior Publication Data
US 2022/0334343 A1    Oct. 20, 2022

(30) Foreign Application Priority Data

Apr. 16, 2021    (TW) .................................. 110113838

(51) Int. Cl.
G02B 7/02    (2021.01)
G02B 7/10    (2021.01)
G02B 13/00    (2006.01)

(52) U.S. Cl.
CPC .............. G02B 7/022 (2013.01); G02B 7/021 (2013.01); G02B 7/025 (2013.01); G02B 7/10 (2013.01); G02B 13/001 (2013.01)

(58) Field of Classification Search
CPC ........ G02B 7/022; G02B 7/021; G02B 7/025; G02B 7/10; G02B 13/001; G02B 13/0065; G02B 7/09; G02B 5/00; G02B 7/00; G03B 11/04; G03B 13/36; G03B 30/00

See application file for complete search history.

(56) References Cited

U.S. PATENT DOCUMENTS 6,997,595 B2    2/2006  Mi et al.
7,156,547 B2    1/2007  Toshima et al.
8,179,603 B2    5/2012  Okuno
(Continued)

FOREIGN PATENT DOCUMENTS

CN    112612105 A    4/2021

*Primary Examiner* — Ricky L Mack
*Assistant Examiner* — K Muhammad
(74) *Attorney, Agent, or Firm* — McClure, Qualey & Rodack, LLP

(57) ABSTRACT

An imaging lens assembly driving module includes a lens carrier, a first molded structure, a second molded structure, a driving mechanism and a mechanical member. The lens carrier defines an optical axis. The first molded structure is disposed correspondingly to the lens carrier and includes a first light blocking structure. The second molded structure is coupled to the first molded structure for forming an inner space, the lens carrier is accommodated in the inner space, and the second molded structure includes a second light blocking structure. The driving mechanism is for driving the lens carrier to move along the optical axis. The mechanical member is for connecting the lens carrier and the first molded structure. The first molded structure is coupled to the second molded structure so that the first light blocking structure and the second light blocking structure form a light passing hole.

21 Claims, 62 Drawing Sheets

(56) References Cited

U.S. PATENT DOCUMENTS

| | | |
|---|---|---|
| 9,612,437 B1 | 4/2017 | Chou et al. |
| 9,978,794 B2 | 5/2018 | Iwafuchi et al. |
| 10,133,037 B2 | 11/2018 | Chou |
| 10,151,900 B2 | 12/2018 | Lin et al. |
| 10,468,446 B2 | 11/2019 | Iwafuchi et al. |
| 10,527,845 B2 | 1/2020 | Kim et al. |
| 11,442,257 B2 | 9/2022 | Lin et al. |
| 2009/0284638 A1 | 11/2009 | Chang et al. |
| 2018/0102388 A1* | 4/2018 | Iwafuchi ............. H01L 27/1462 |
| 2019/0227405 A1* | 7/2019 | Song ...................... G02B 5/005 |
| 2021/0349282 A1* | 11/2021 | Chen ...................... G02B 7/021 |

* cited by examiner

500

IMAGING LENS ASSEMBLY MODULE, IMAGING LENS ASSEMBLY DRIVING MODULE, CAMERA MODULE AND ELECTRONIC DEVICE

RELATED APPLICATIONS

This application claims priority to Taiwan Application Serial Number 110113838, filed Apr. 16, 2021, which is herein incorporated by reference.

BACKGROUND

Technical Field

The present disclosure relates to an imaging lens assembly module and an imaging lens assembly driving module. More particularly, the present disclosure relates to an imaging lens assembly module and an imaging lens assembly driving module disposed on a camera module applied in portable electronic devices.

Description of Related Art

In recent years, portable electronic devices, such as intelligent electronic devices, tablets, etc., are developed rapidly and have been filled with the lives of modern people. Accordingly, the camera module and the imaging lens assembly driving module which are disposed on the portable electronic device are also flourished. However, as technology is more and more advanced, demands for the quality of the imaging lens assembly driving module from users have become higher and higher. Therefore, developing an imaging lens assembly driving module which can decrease a possibility of generating a stray light and maintain the better image quality becomes an important and solving problem in industry.

SUMMARY

According to one aspect of the present disclosure, an imaging lens assembly driving module includes a lens carrier, a first molded structure, a second molded structure, a driving mechanism and a mechanical member. The lens carrier defines an optical axis. The first molded structure is disposed correspondingly to the lens carrier and includes a first light blocking structure. The second molded structure is coupled to the first molded structure for forming an inner space, the lens carrier is accommodated in the inner space, and the second molded structure includes a second light blocking structure. The driving mechanism is for driving the lens carrier to move along the optical axis. The mechanical member is for connecting the lens carrier and the first molded structure. The first molded structure is coupled to the second molded structure so that the first light blocking structure and the second light blocking structure are disposed correspondingly to each other for forming a light passing hole. A cross section of the light passing hole passing through the optical axis includes a valley point, a first crest point and a second crest point. The valley point is a farthest point away from the optical axis in the cross section. The first crest point is a closest point to the optical axis in the cross section. The second crest point is a closest point to the optical axis in another side relative to the first crest point based on a perpendicular line from the valley point to the optical axis. When a distance between the valley point and the optical axis is D, a distance between the first crest point and the optical axis is d1, and a distance between the second crest point and the optical axis is d2, the following conditions are satisfied: $0.1 < d1/D < 0.95$; and $0.1 < d2/D < 0.95$.

According to one aspect of the present disclosure, a camera module includes the imaging lens assembly driving module of the aforementioned aspect.

According to one aspect of the present disclosure, an electronic device includes the camera module of the aforementioned aspect and an image sensor. The image sensor is disposed on an image surface of the camera module.

According to one aspect of the present disclosure, an imaging lens assembly driving module includes a lens carrier, a first molded structure, a second molded structure, a driving mechanism and a mechanical member. The lens carrier defines an optical axis. The first molded structure is disposed correspondingly to the lens carrier. The second molded structure is coupled to the first molded structure, wherein an inner space is formed by the first molded structure and the second molded structure, and the lens carrier is accommodated in the inner space. The driving mechanism is for driving the lens carrier to move along the optical axis. The mechanical member is for connecting the lens carrier and the first molded structure. A light passing hole is formed by at least one of the first molded structure and the second molded structure and comprises a light blocking structure. A cross section of the light passing hole passing through the optical axis includes a valley point, a first crest point and a second crest point. The valley point is a farthest point away from the optical axis in the cross section. The first crest point is a closest point to the optical axis in the cross section. The second crest point is a closest point to the optical axis in another side relative to the first crest point based on a perpendicular line from the valley point to the optical axis. When a distance between the valley point and the optical axis is D, a distance between the first crest point and the optical axis is d1, and a distance between the second crest point and the optical axis is d2, the following conditions are satisfied: $0.1 < d1/D < d2/D$; and $0.9 < d2/D < 1.0$.

According to one aspect of the present disclosure, an imaging lens assembly module includes a lens carrier. The lens carrier includes an imaging lens element set, a light-folding element, a first molded structure and a second molded structure. The imaging lens element set defines the optical axis. The light-folding element is for folding an imaging light from an incident light path of the light-folding element into an emergent light path of the light-folding element. The first molded structure is disposed correspondingly to the light-folding element and includes a first light blocking structure. The second molded structure is coupled to the first molded structure for forming an inner space, at least one of the imaging lens element set and the light-folding element is accommodated in the inner space, and the second molded structure includes a second light blocking structure. The first molded structure is coupled to the second molded structure so that the first light blocking structure and the second light blocking structure are disposed correspondingly to each other for forming a first light passing hole.

According to one aspect of the present disclosure, an imaging lens assembly module includes a lens carrier. The lens carrier includes an imaging lens element set, a light-folding element, a first molded structure, a second molded structure and a third molded structure. The imaging lens element set defines the optical axis. The light-folding element is for folding an imaging light from an incident light path of the light-folding element into an emergent light path of the light-folding element. The first molded structure is disposed correspondingly to the imaging lens element set and includes a first light blocking structure. The second molded structure is disposed correspondingly to the imaging lens element set and includes a second light blocking structure. The third molded structure is coupled to the first molded structure and the second molded structure for forming an inner space, at least one of the imaging lens element set and the light-folding element is accommodated in the inner space, and the third molded structure includes a third light blocking structure. The first molded structure and the second molded structure are coupled to the third molded structure so that the first light blocking structure, the second light blocking structure and the third light blocking structure are disposed correspondingly to each other for forming a third light passing hole.

BRIEF DESCRIPTION OF THE DRAWINGS

The present disclosure can be more fully understood by reading the following detailed description of the embodiment, with reference made to the accompanying drawings as follows.

Figure 5A:
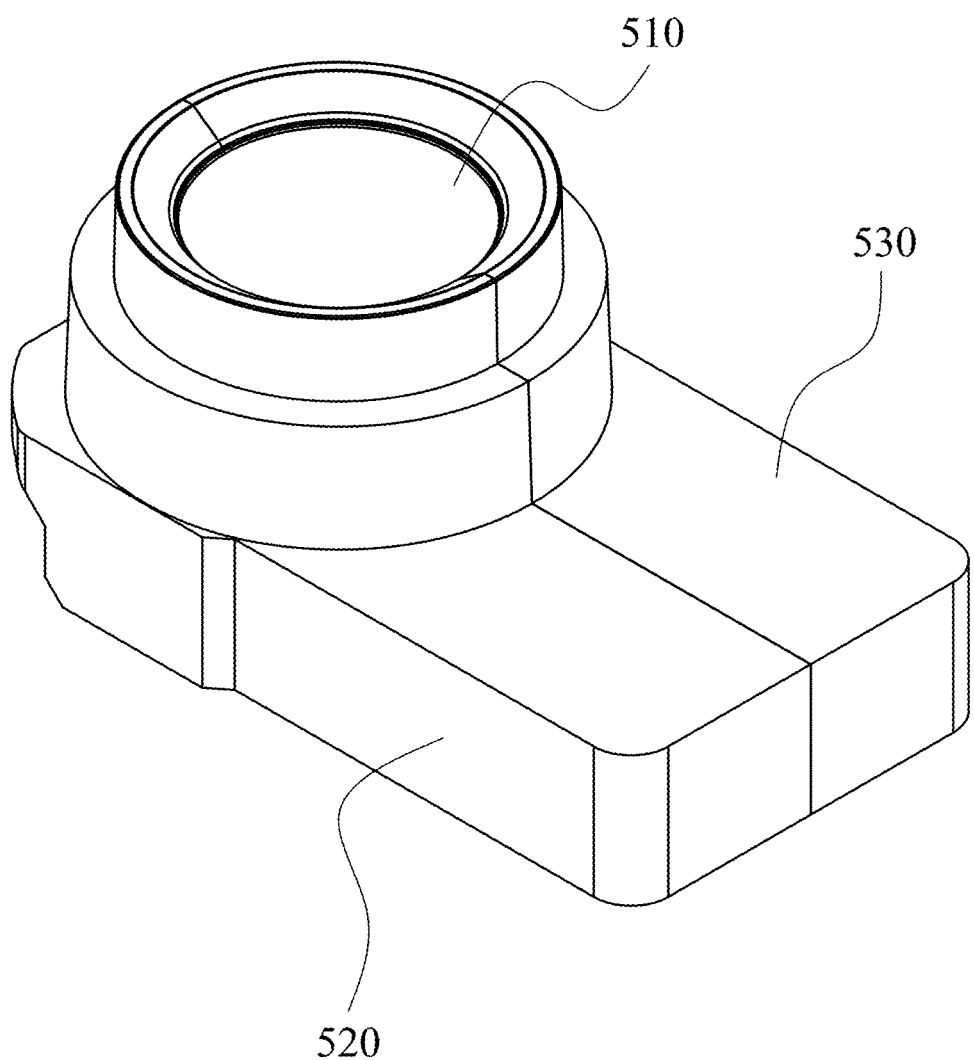
FIG. 5A shows a three-dimensional schematic view of an imaging lens assembly module according to the 5th embodiment of the present disclosure.

5I shows still another side view of the first molded structure and the second molded structure according to the 5th embodiment in FIG. 5A.

Figure 5B:
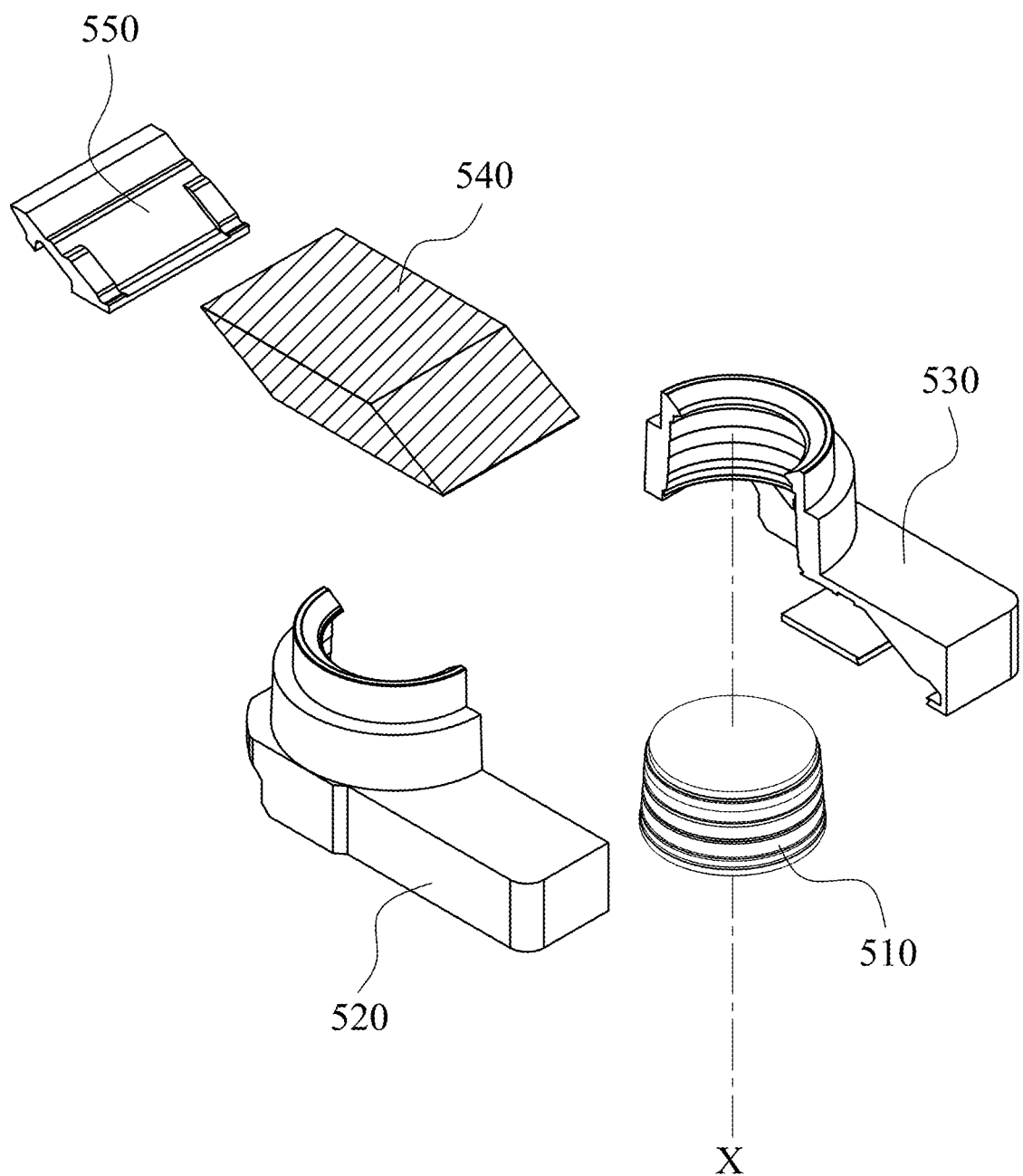
FIG. 5B shows an exploded view of the imaging lens assembly module according to the 5th embodiment in FIG. 5A.
Figure 5C:
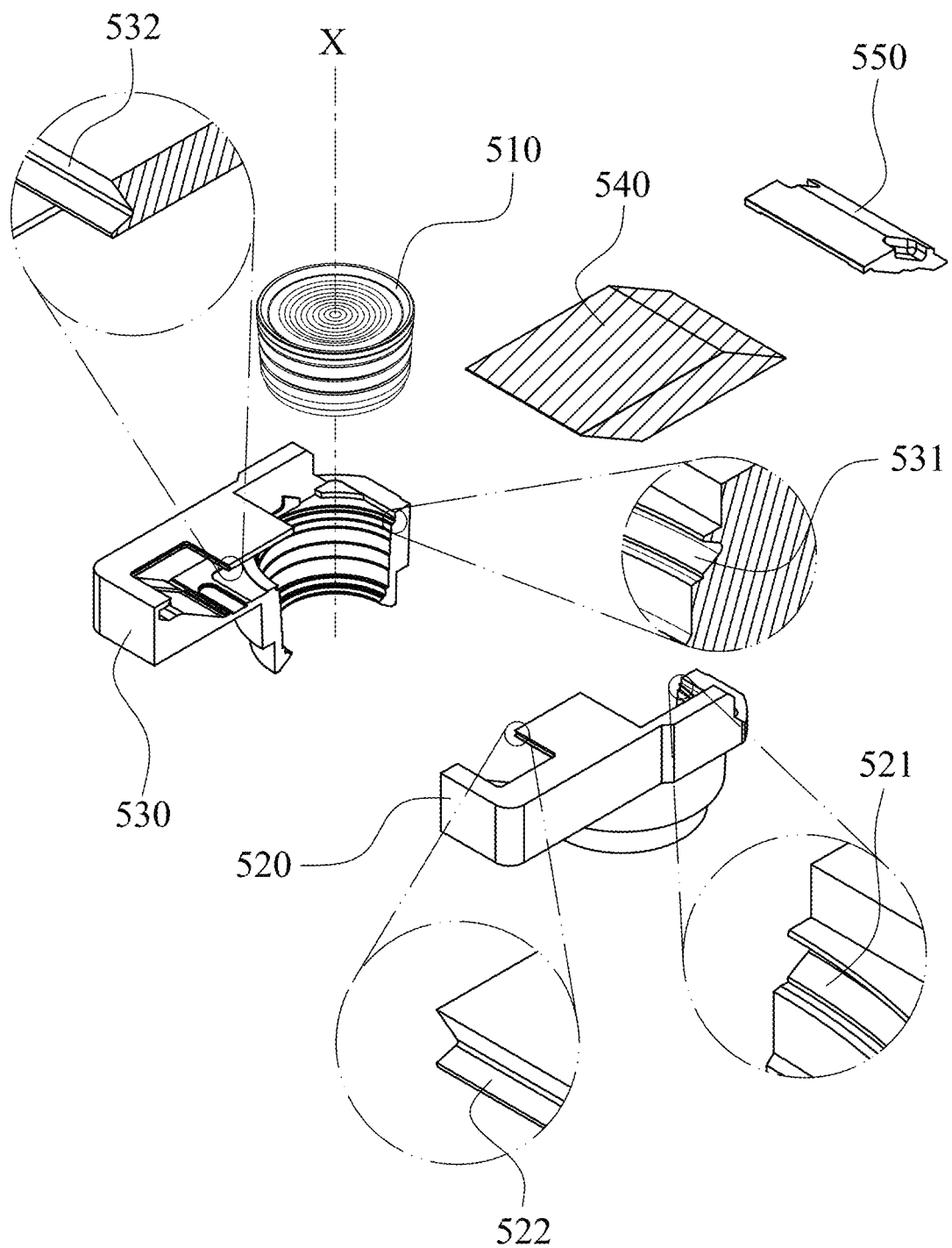
FIG. 5C shows another perspective of the exploded view of the imaging lens assembly module according to the 5th embodiment in FIG. 5A.
Figure 5D:
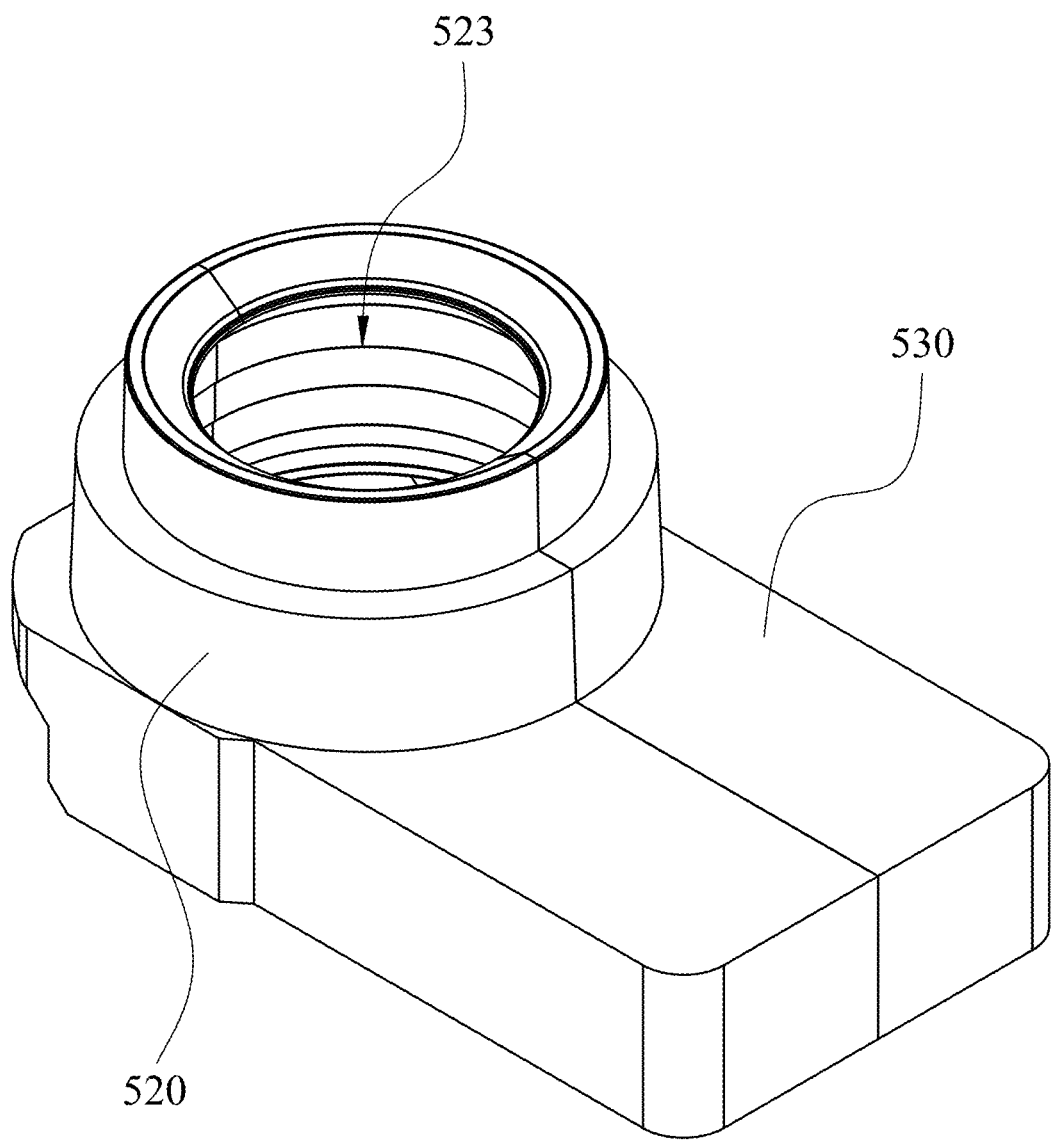
FIG. 5D shows a schematic view of a coupling between the first molded structure and the second molded structure according to the 5th embodiment in FIG. 5A.
Figure 5E:
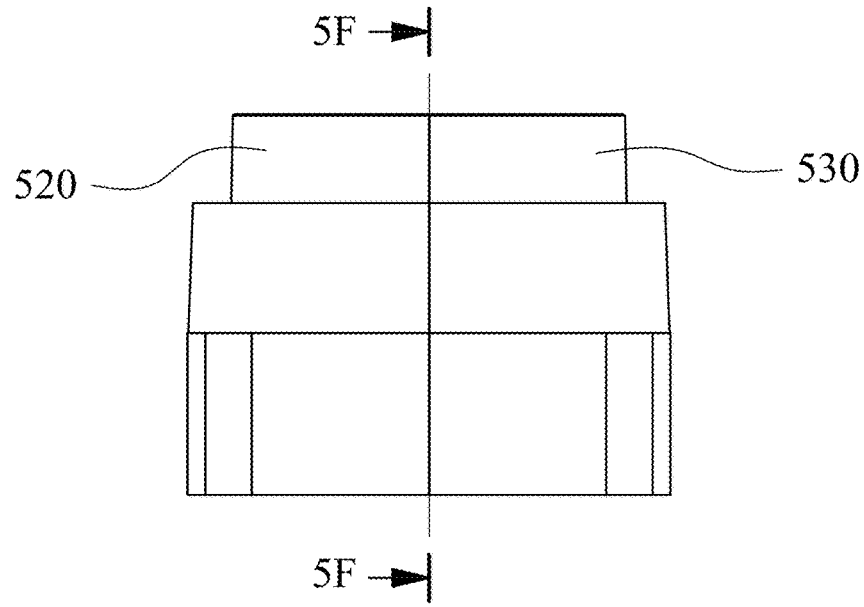
FIG. 5E shows a side view of the coupling between the first molded structure and the second molded structure according to the 5th embodiment in FIG. 5A.
Figure 5F:
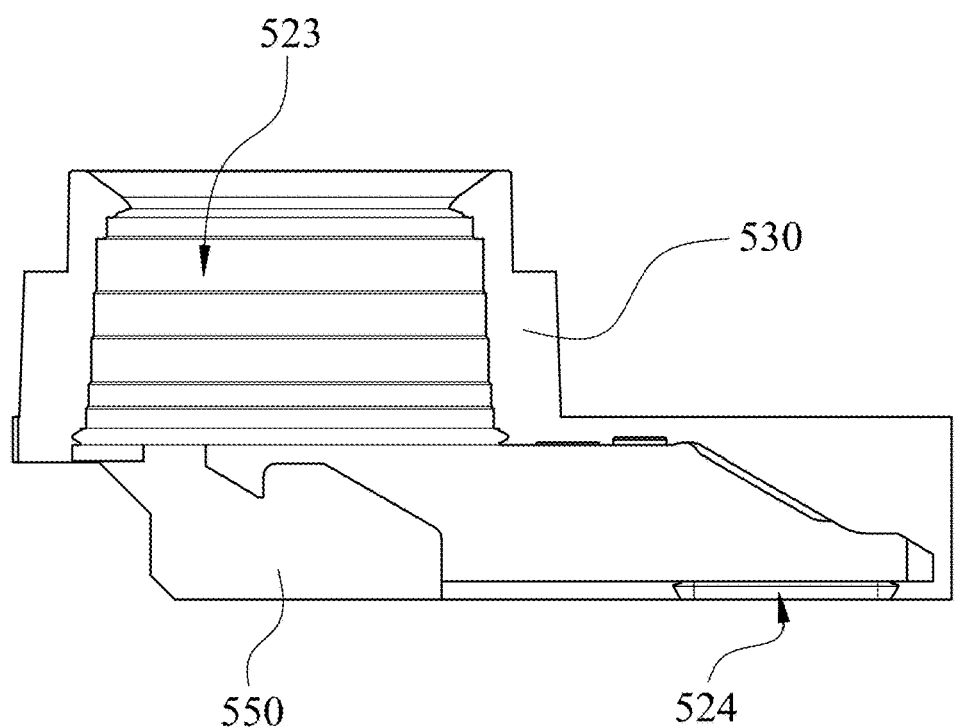
FIG. 5F shows a cross-sectional view of the first molded structure and the second molded structure along a cutting line 5F-5F according to the 5th embodiment in FIG. 5E.
Figure 5G:
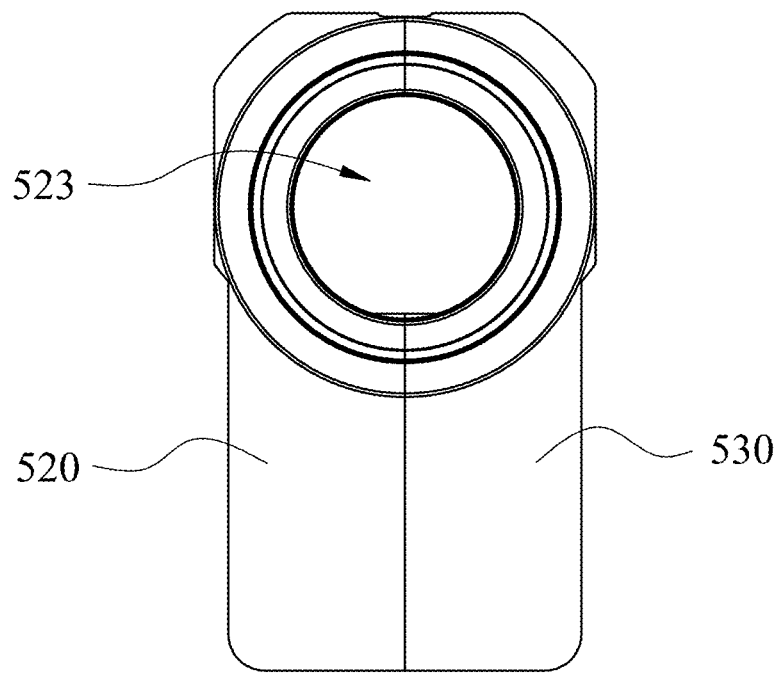
FIG. 5G shows a side view of the first molded structure and the second molded structure according to the 5th embodiment in FIG. 5A.
Figure 5H:
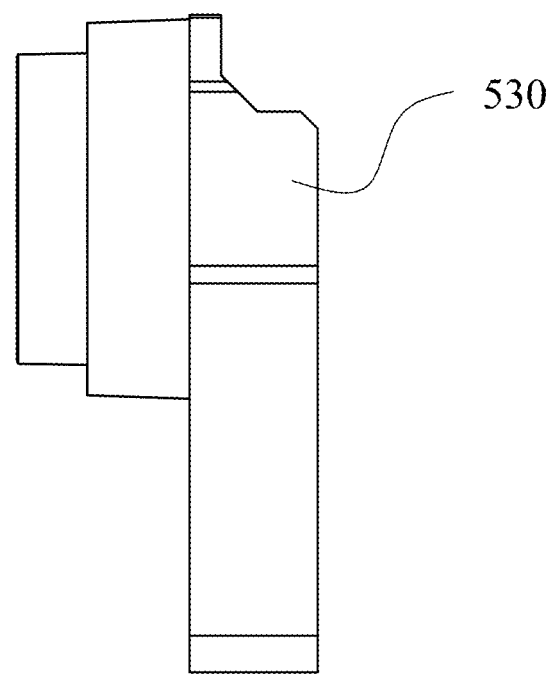
FIG. 5H shows another side view of the first molded structure and the second molded structure according to the 5th embodiment in FIG. 5A.
Figure 5I:
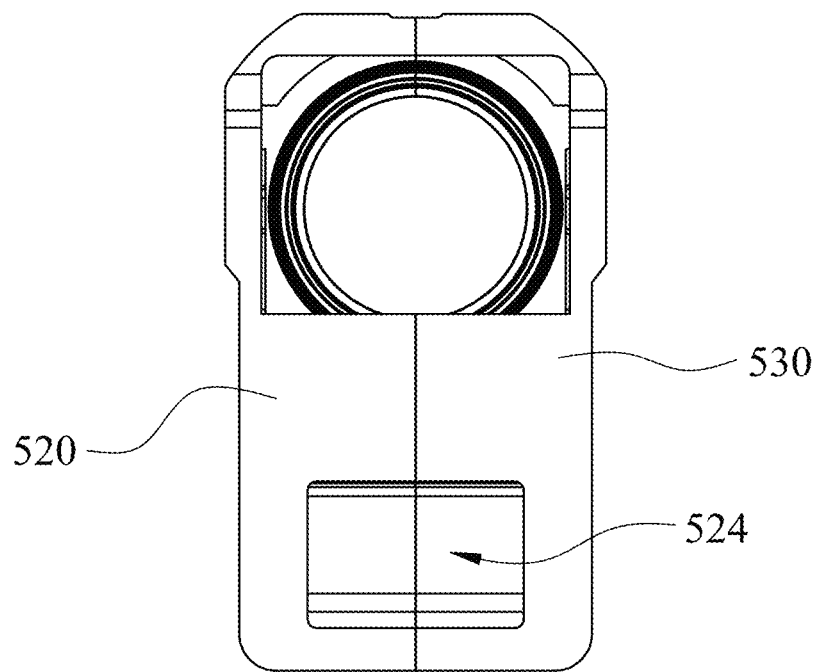
Figure 5J:
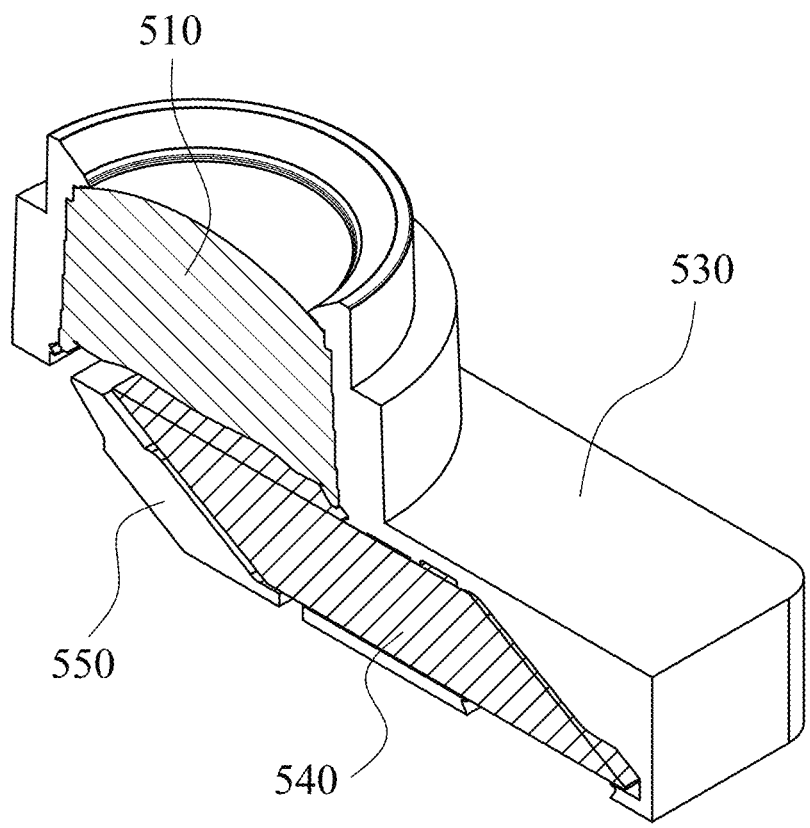

FIG. 5J shows a cross-sectional view of the imaging lens assembly module along a cutting line 5F-5F according to the 5th embodiment in FIG. 5E.

Figure 5K:
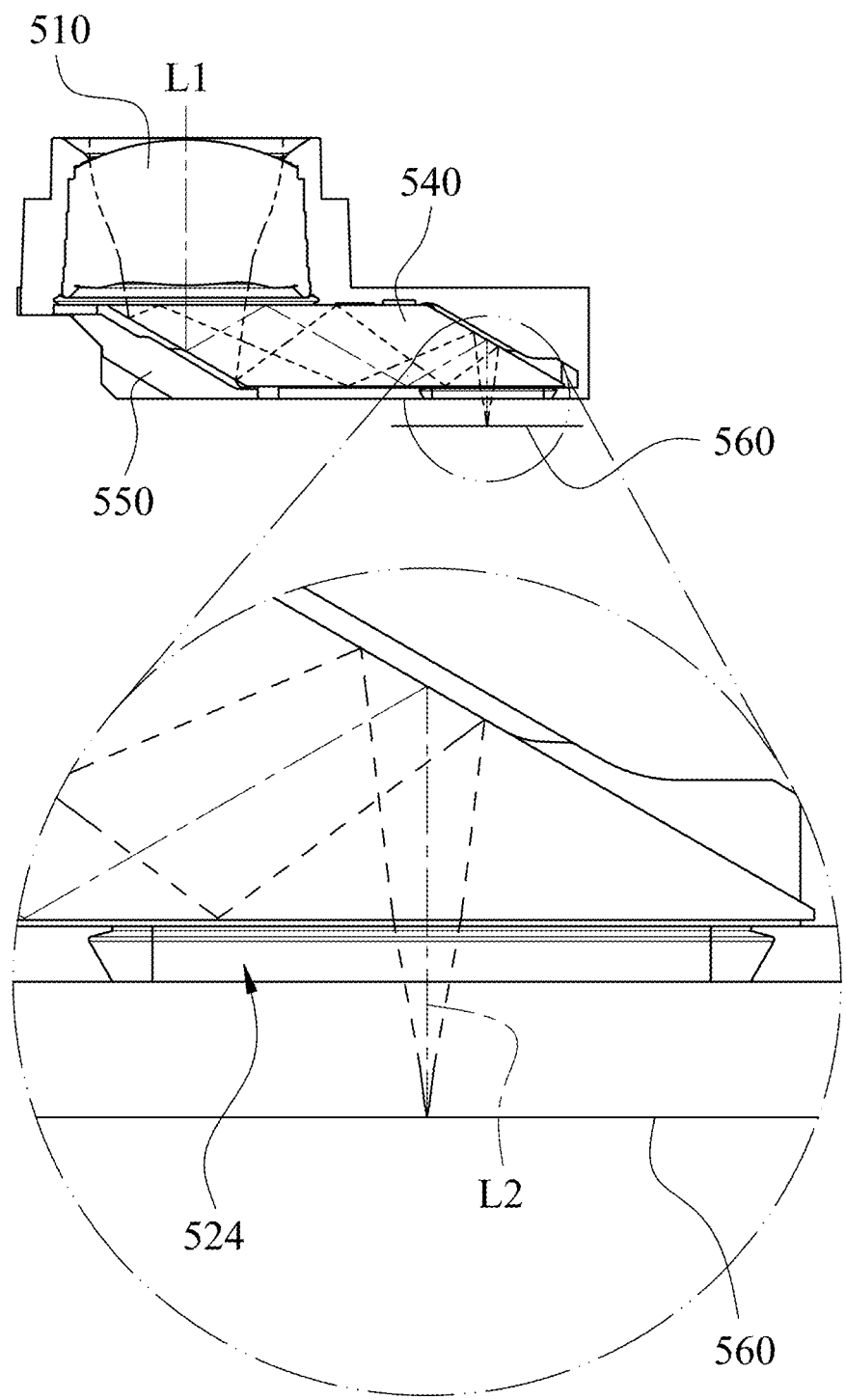

FIG. 5K shows a schematic view of the incident light path and the emergent light path of the light-folding element according to the 5th embodiment in FIG. 5A.

Figure 6A:
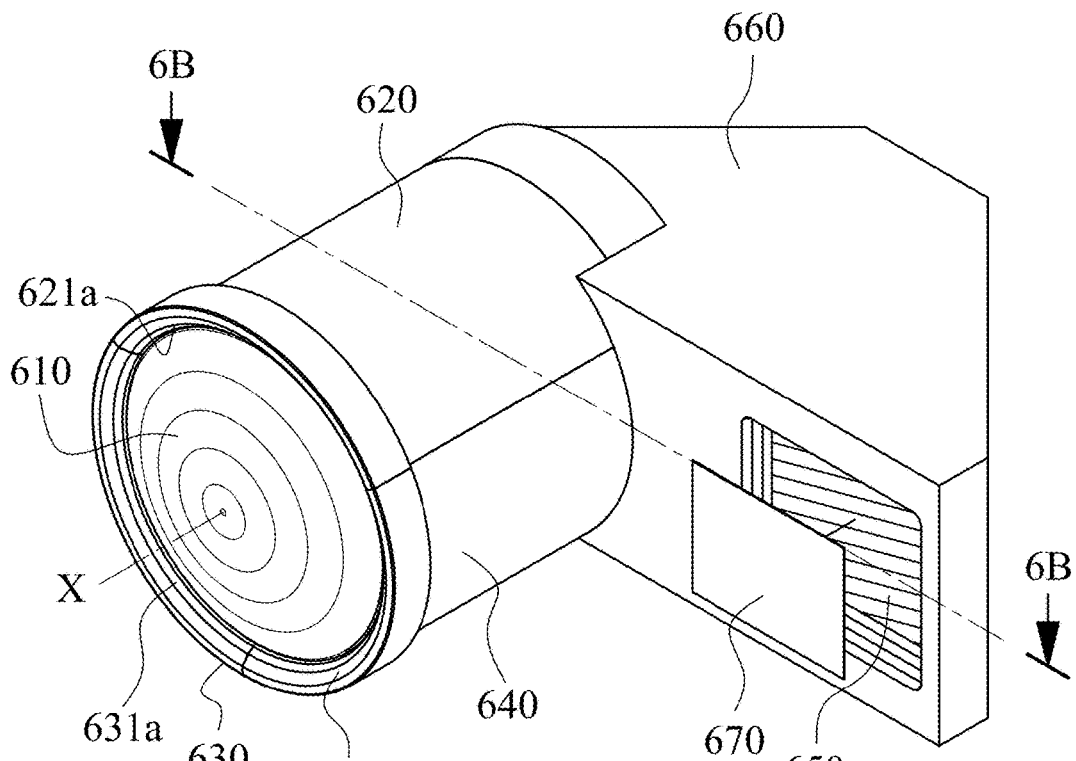

FIG. 6A shows a three-dimensional schematic view of a camera module according to the 6th embodiment of the present disclosure.

Figure 6B:
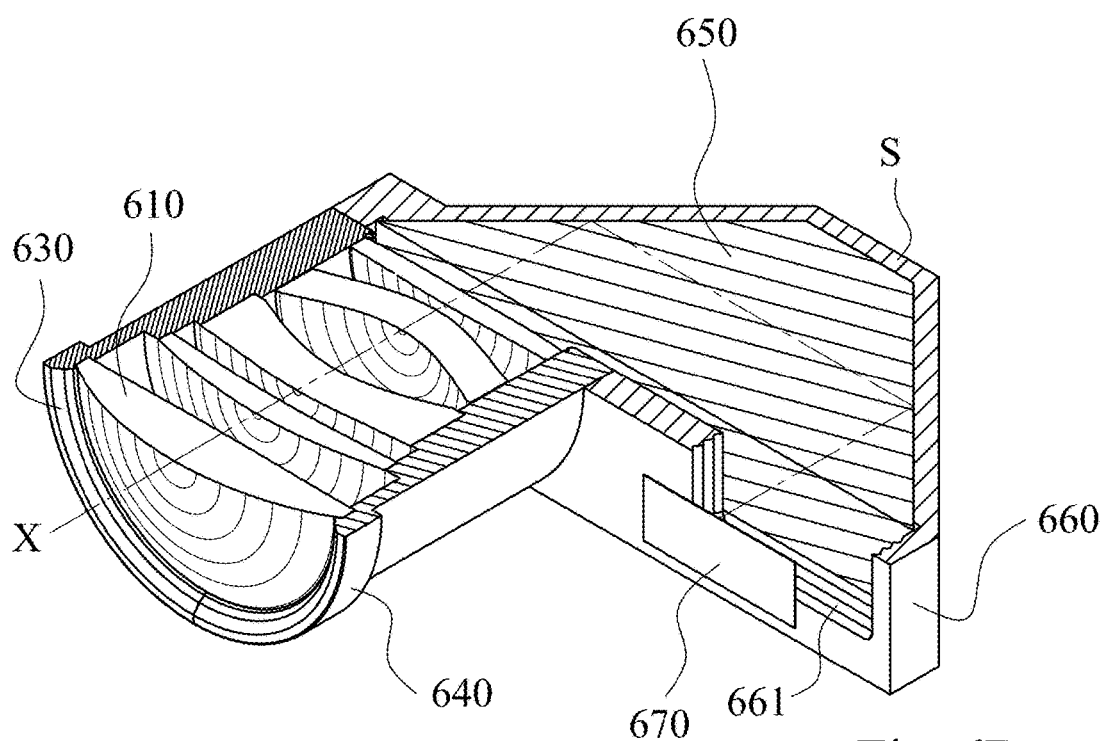

FIG. 6B shows a cross-sectional view of the camera module along a cutting line 6B-6B according to the 6th embodiment in FIG. 6A.

Figure 6C:
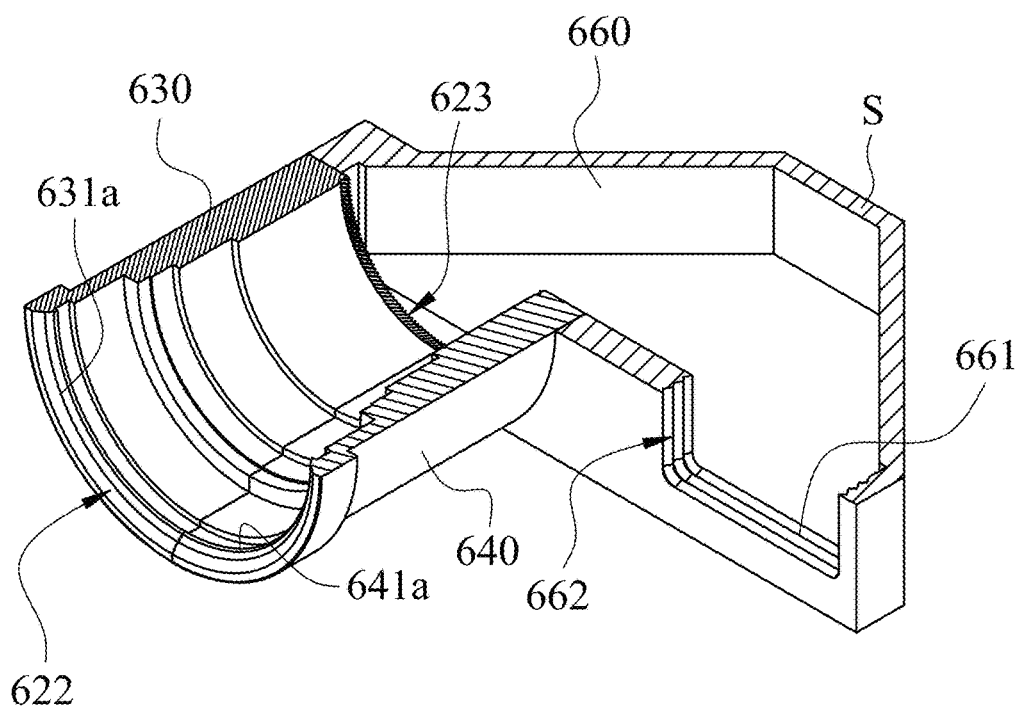

FIG. 6C shows a cross-sectional view of the first molded structure, the second molded structure, the third molded structure and the fourth molded structure along a cutting line 6B-6B according to the 6th embodiment in FIG. 6A.

Figure 6D:
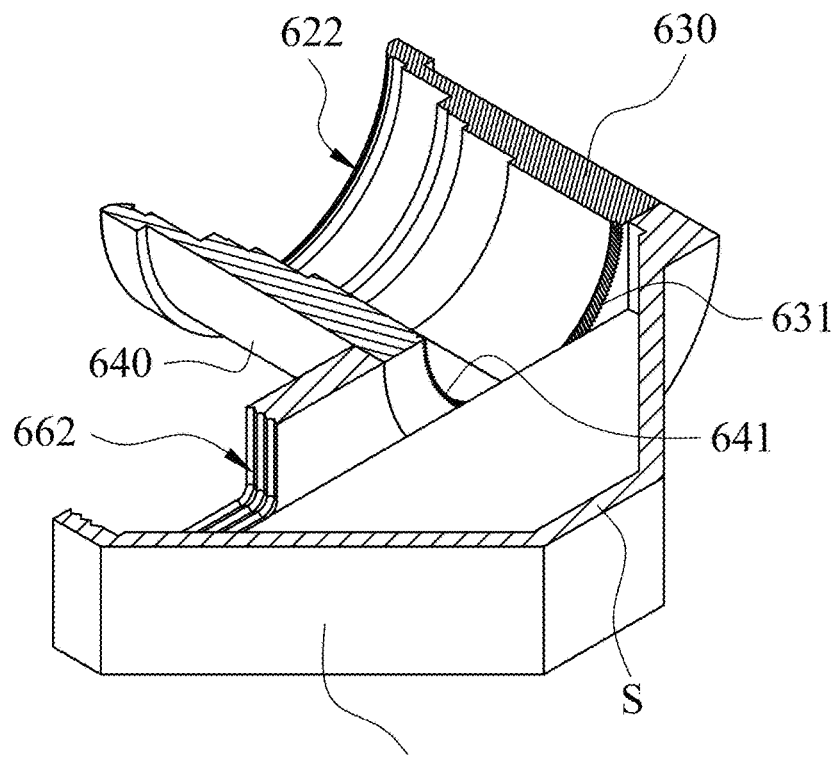

FIG. 6D shows another cross-sectional view of the first molded structure, the second molded structure, the third molded structure and the fourth molded structure along a cutting line 6B-6B according to the 6th embodiment in FIG. 6A.

Figure 6E:
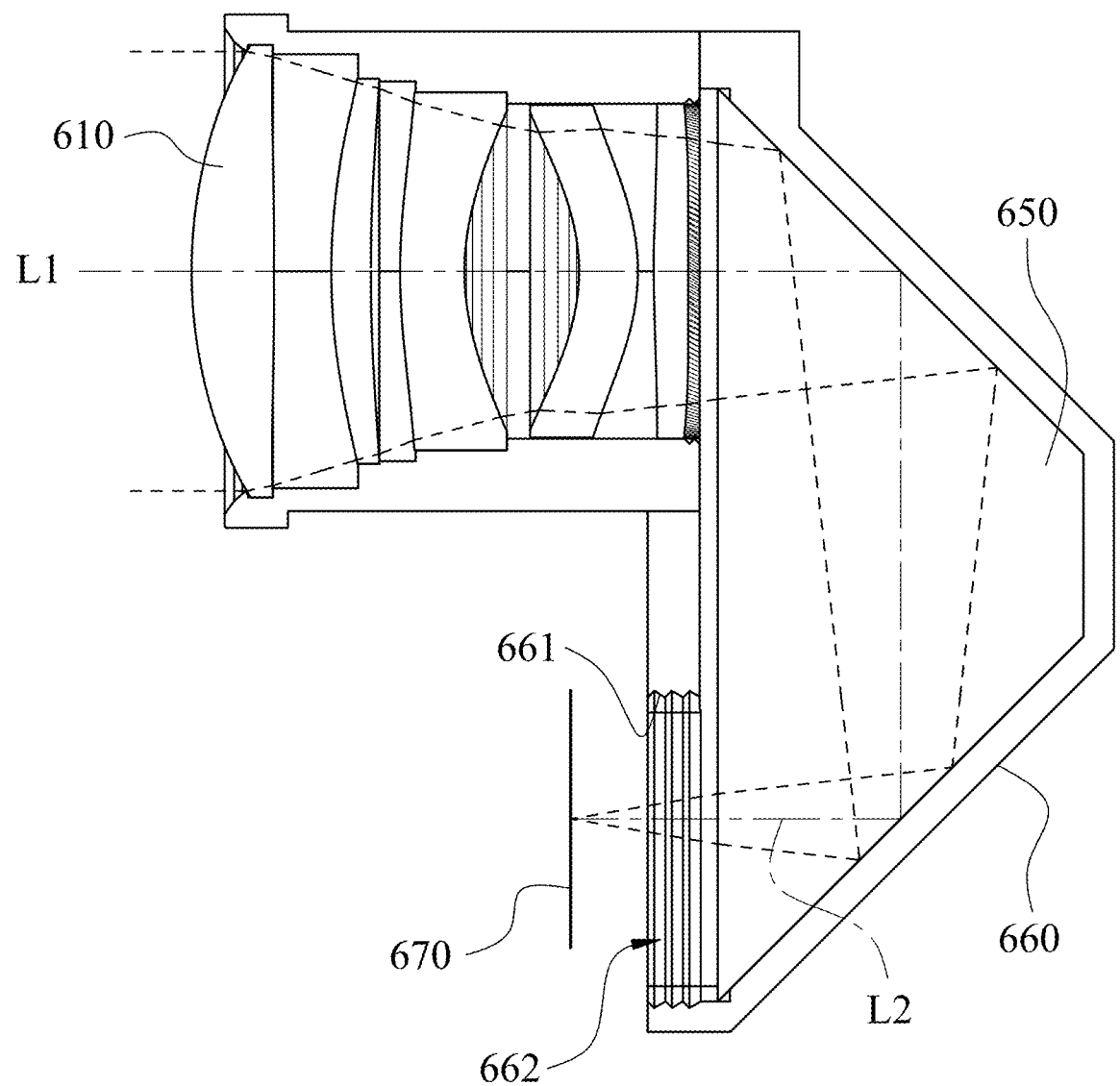

FIG. 6E shows a schematic view of the incident light path and the emergent light path of the light-folding element according to the 6th embodiment in FIG. 6A.

Figure 6F:
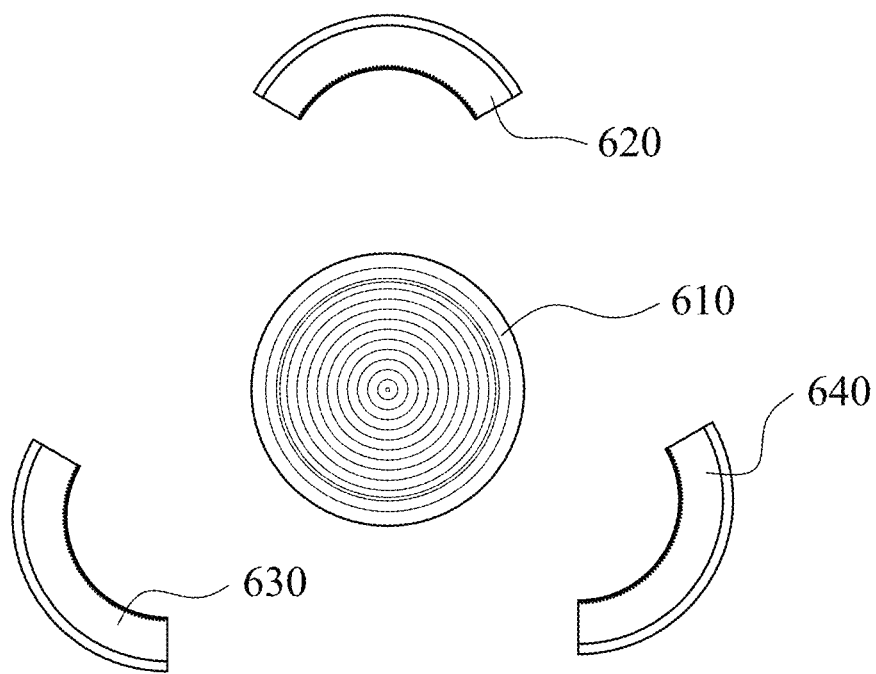

FIG. 6F shows an exploded side view of the imaging lens element set, the first molded structure, the second molded structure and the third molded structure according to the 6th embodiment in FIG. 6A.

Figure 6G:
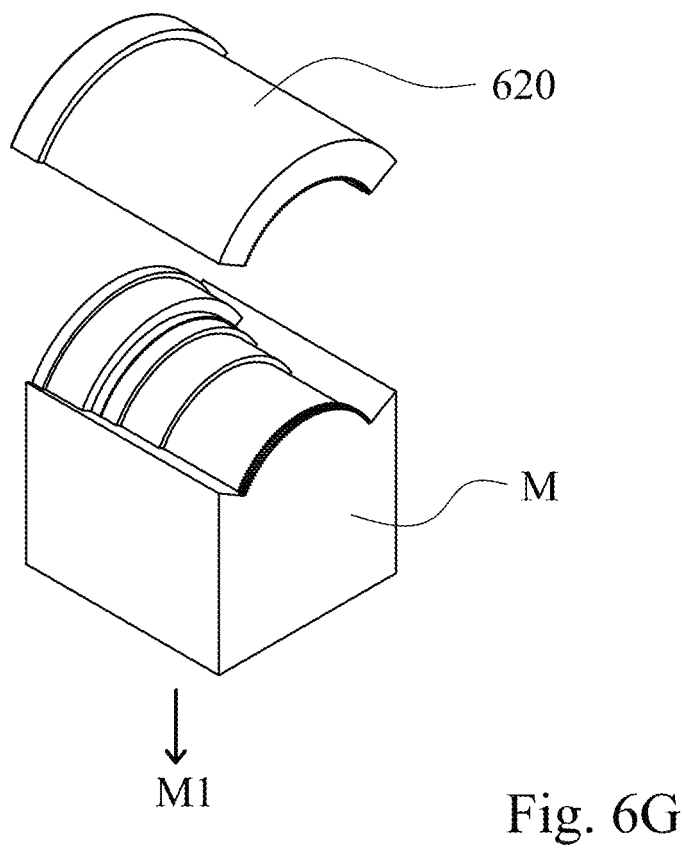

FIG. 6G shows a schematic view of the first molded structure and a mold according to the 6th embodiment in FIG. 6F.

Figure 6H:
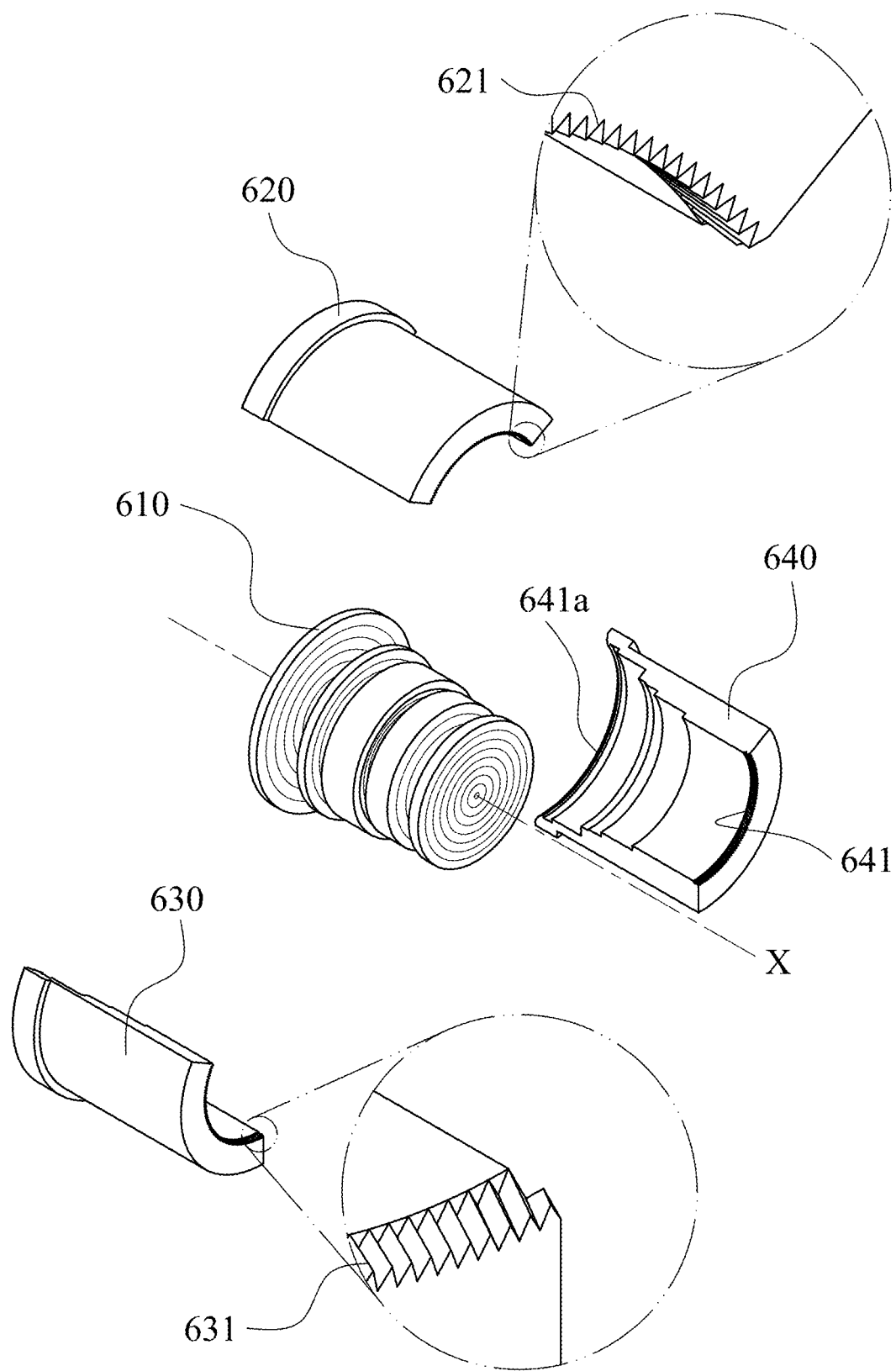

FIG. 6H shows an exploded view of the imaging lens element set, the first molded structure, the second molded structure and the third molded structure according to the 6th embodiment in FIG. 6F.

Figure 6I:
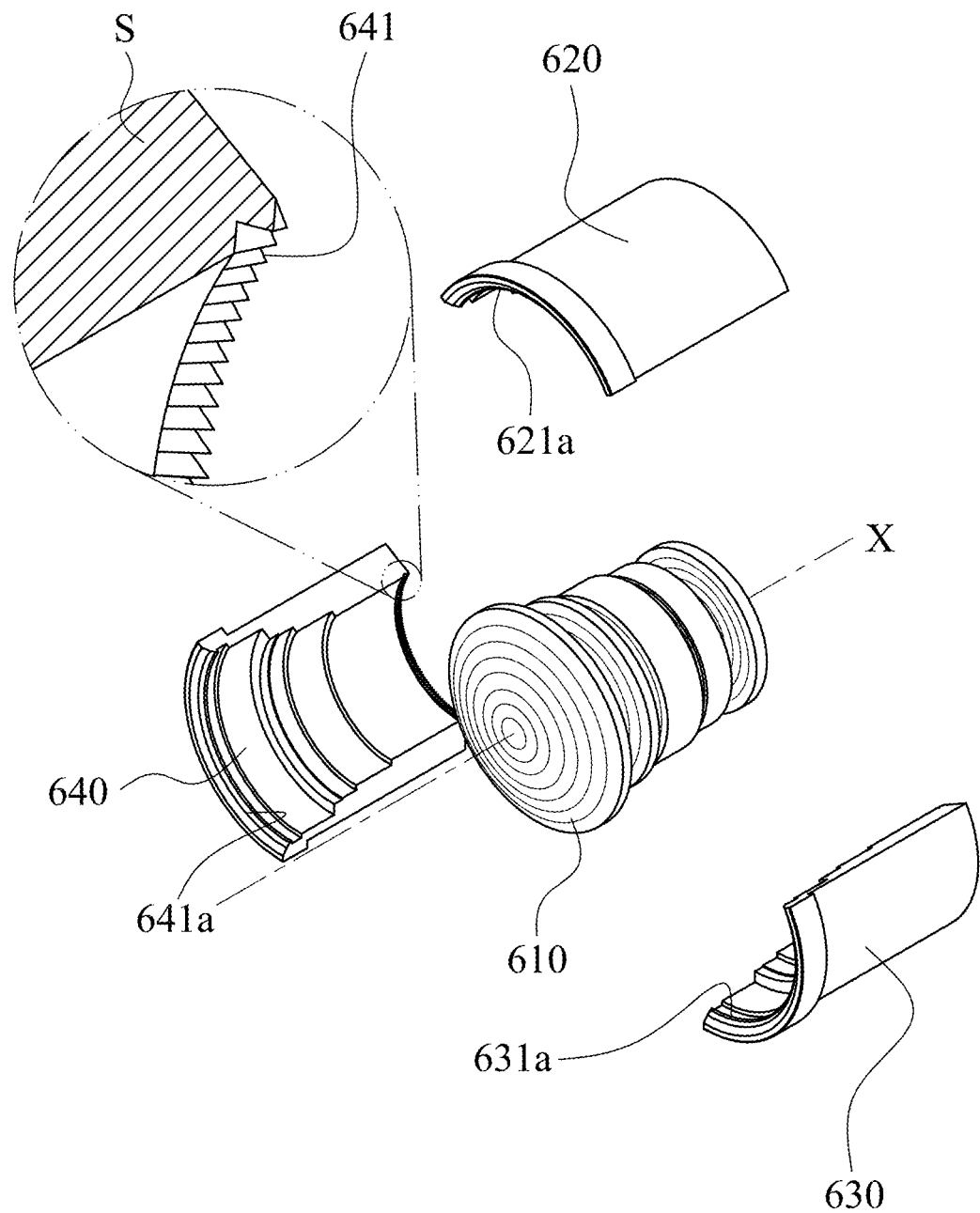

FIG. 6I shows another exploded view of the imaging lens element set, the first molded structure, the second molded structure and the third molded structure according to the 6th embodiment in FIG. 6F.

Figure 6J:
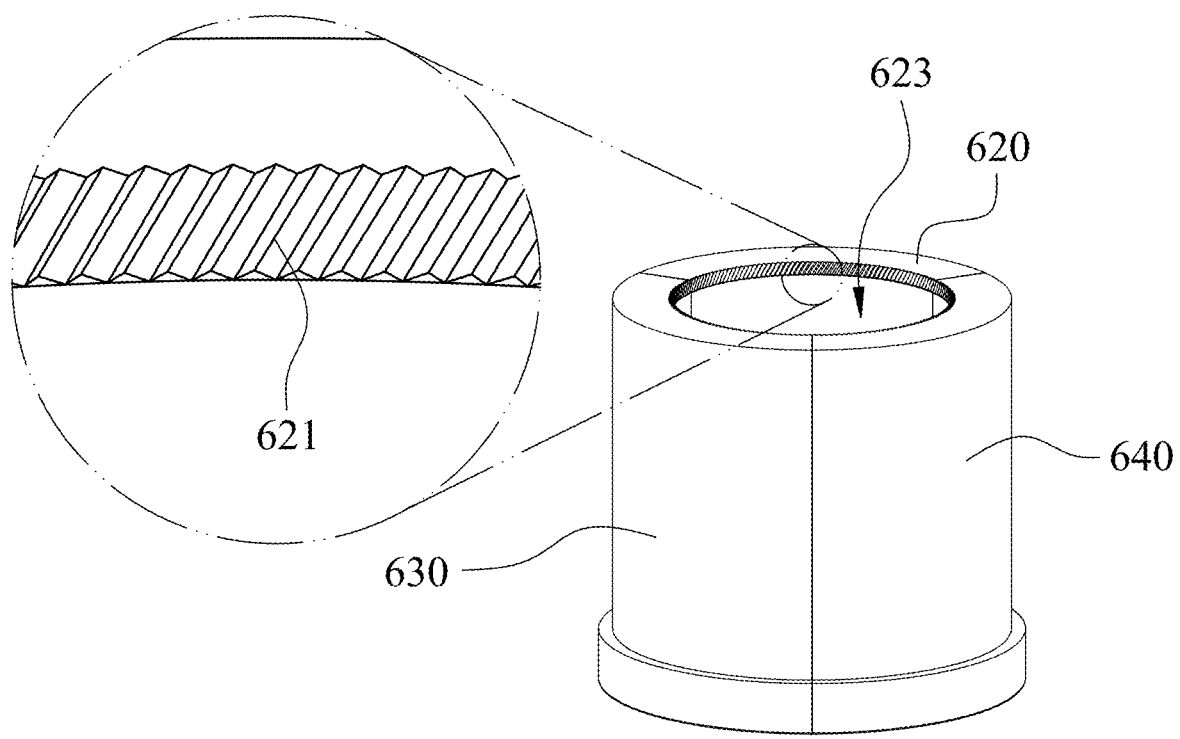

FIG. 6J shows a schematic view of the combination of the first molded structure, the second molded structure and the third molded structure according to the 6th embodiment in FIG. 6F.

Figure 6K:
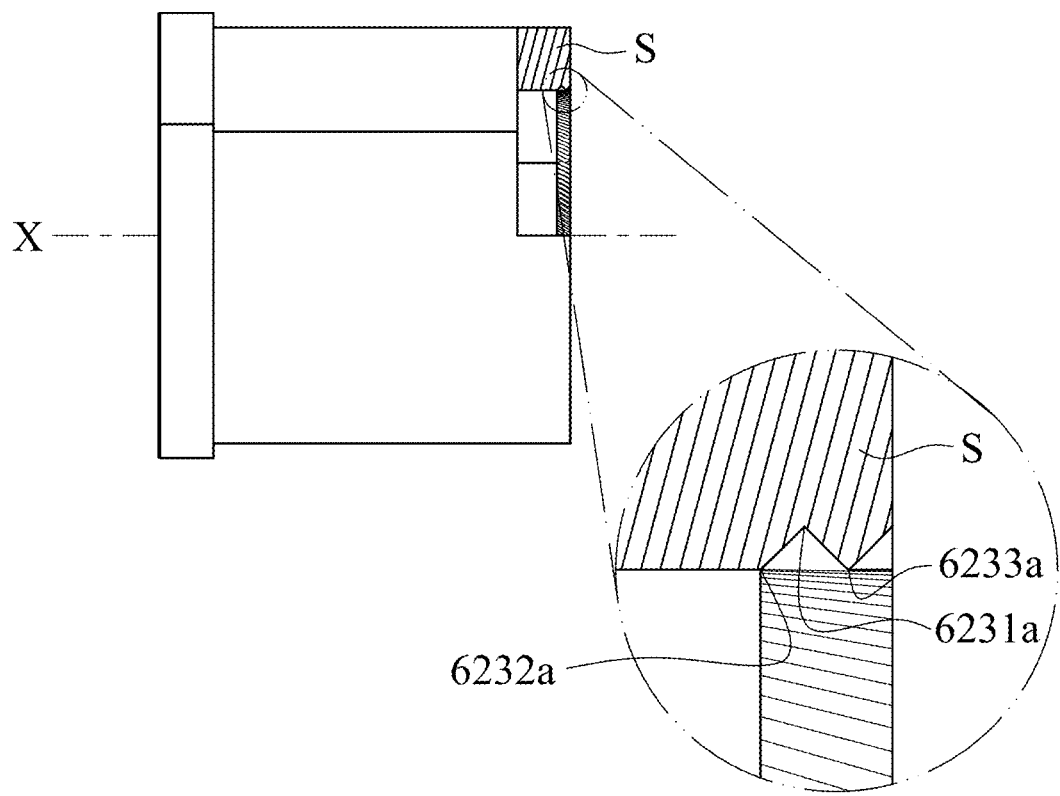

FIG. 6K shows a partial cross-sectional view of the imaging lens element se, the first molded structure, the second molded structure and the third molded structure of the 1st example according to the 6th embodiment in FIG. 6J.

Figure 6L:
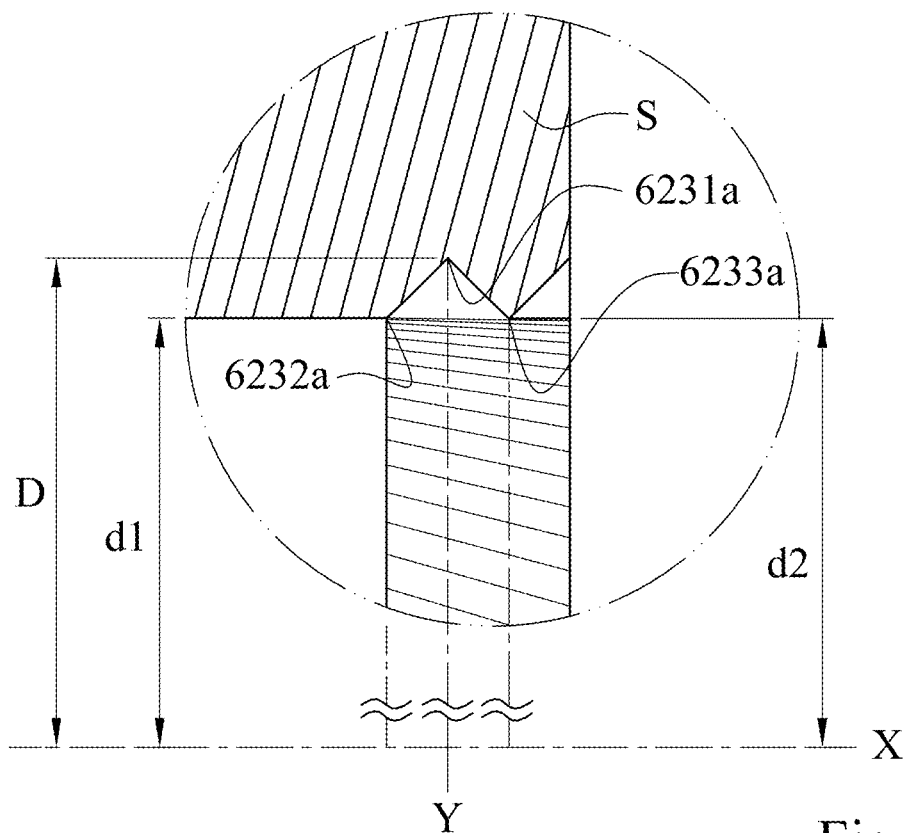

FIG. 6L shows a schematic view of parameters of the third light passing hole of the 1st example according to the 6th embodiment in FIG. 6K.

Figure 6M:
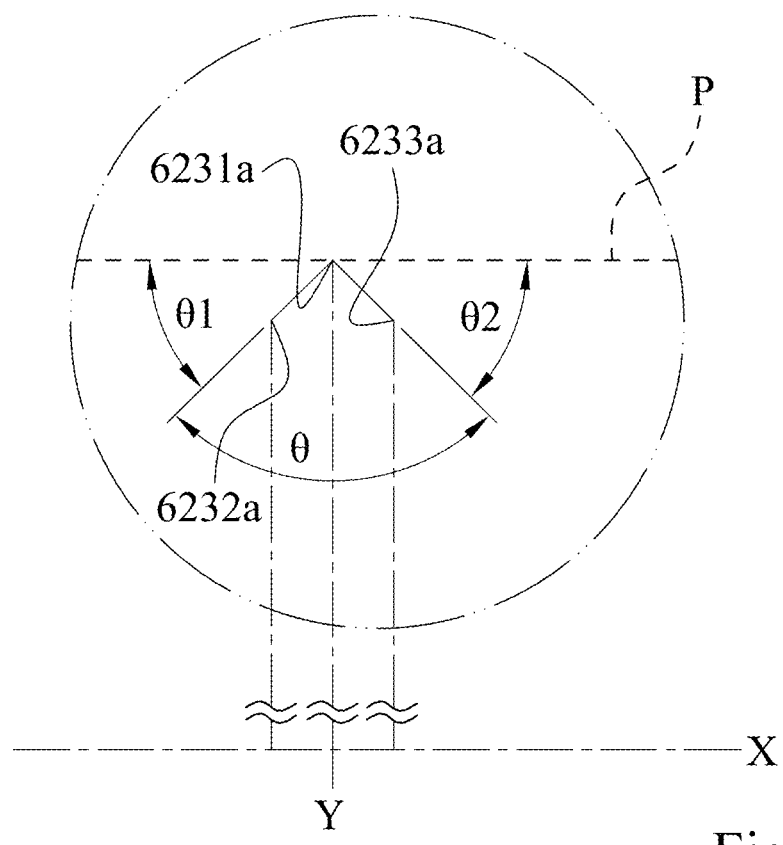

FIG. 6M shows another schematic view of parameters of the third light passing hole of the 1st example according to the 6th embodiment in FIG. 6K.

Figure 6N:
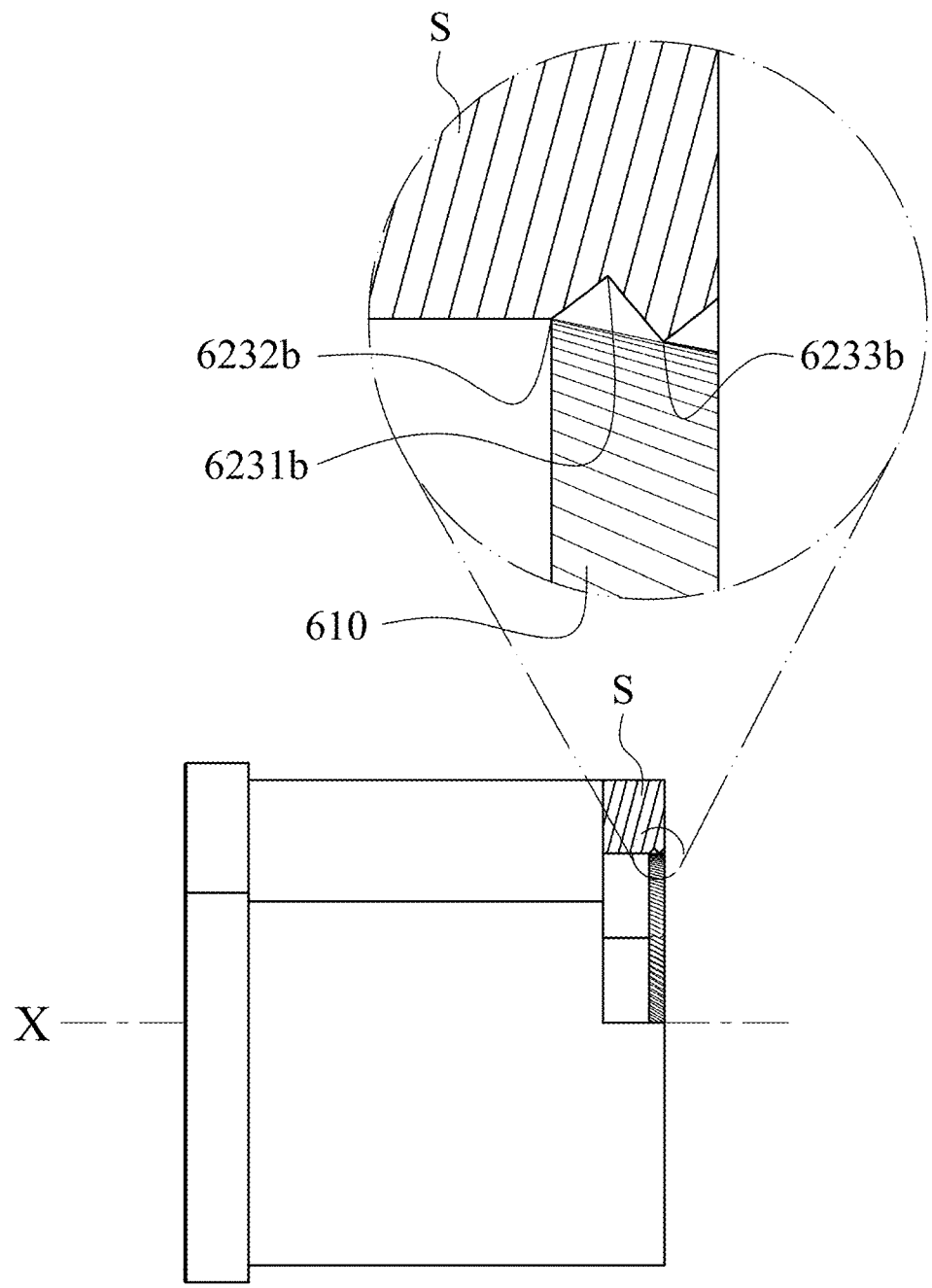

FIG. 6N shows a partial cross-sectional view of the imaging lens element set, the first molded structure, the second molded structure and the third molded structure of the 2nd example according to the 6th embodiment in FIG. 6J.

Figure 6O:
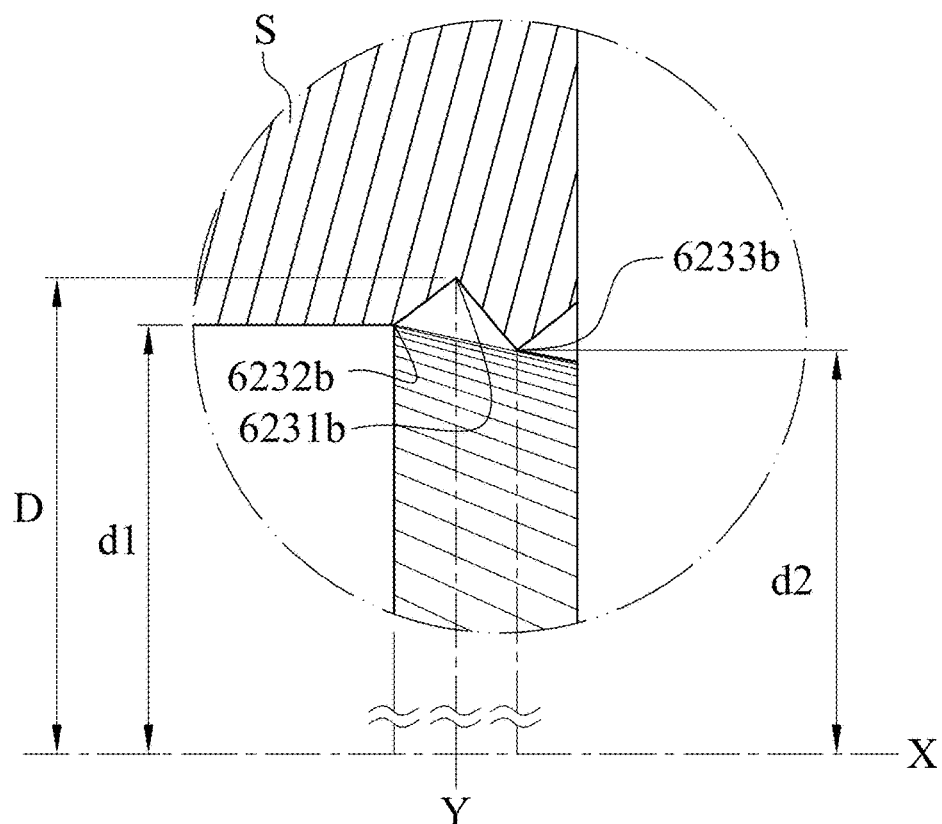

FIG. 6O shows a schematic view of parameters of the third light passing hole of the 2nd example according to the 6th embodiment in FIG. 6N.

Figure 6P:
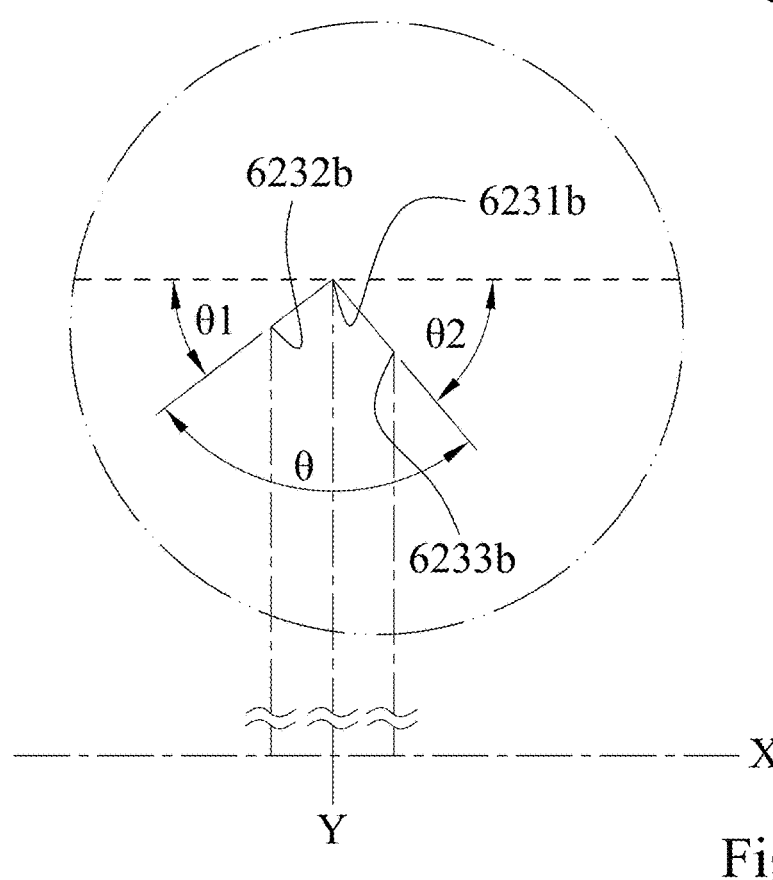

FIG. 6P shows another schematic view of parameters of the third light passing hole of the 2nd example according to the 6th embodiment in FIG. 6N.

Figure 7A:
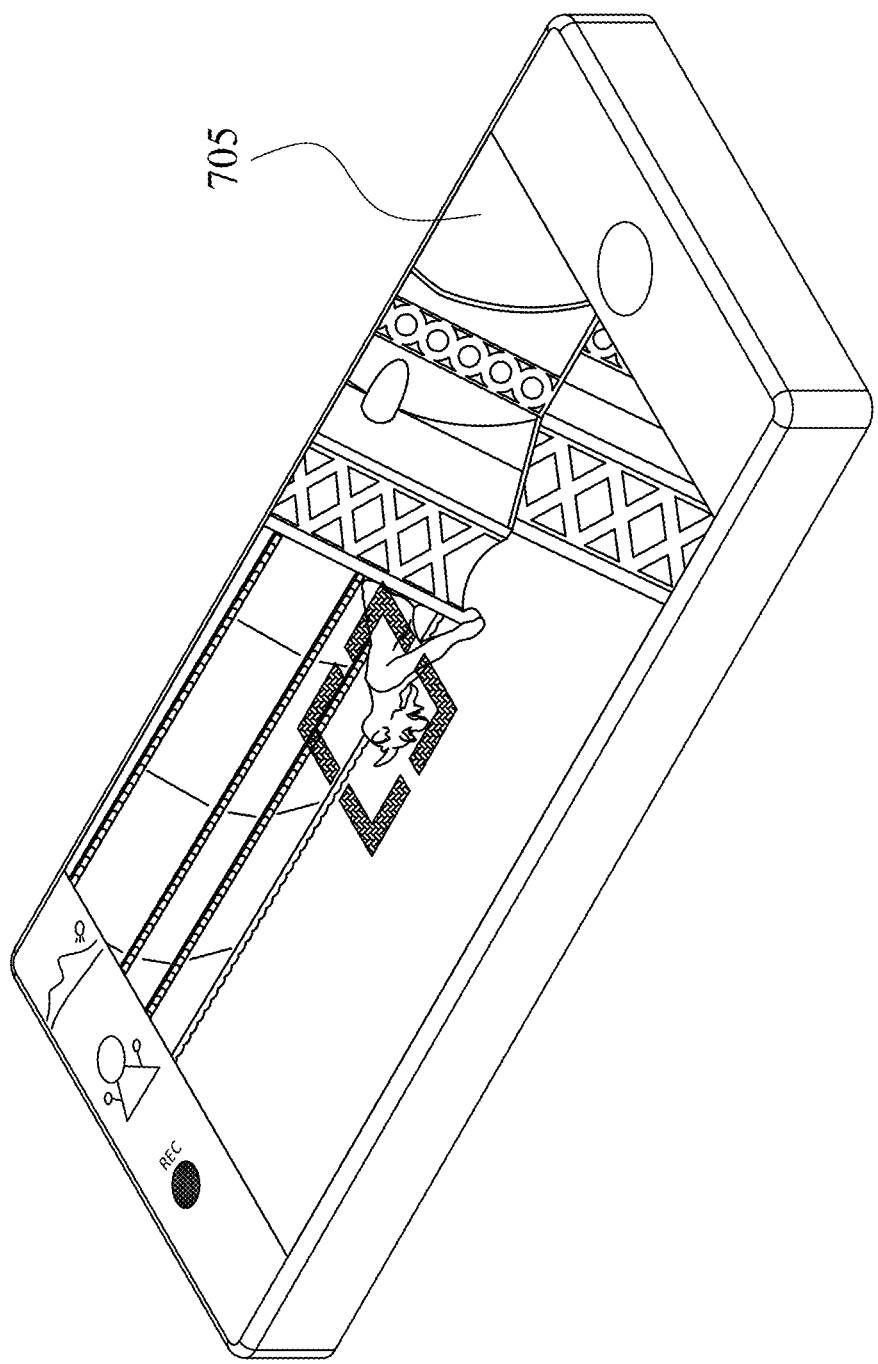

FIG. 7A shows a schematic view of an electronic device according to the 7th embodiment of the present disclosure.

Figure 7B:
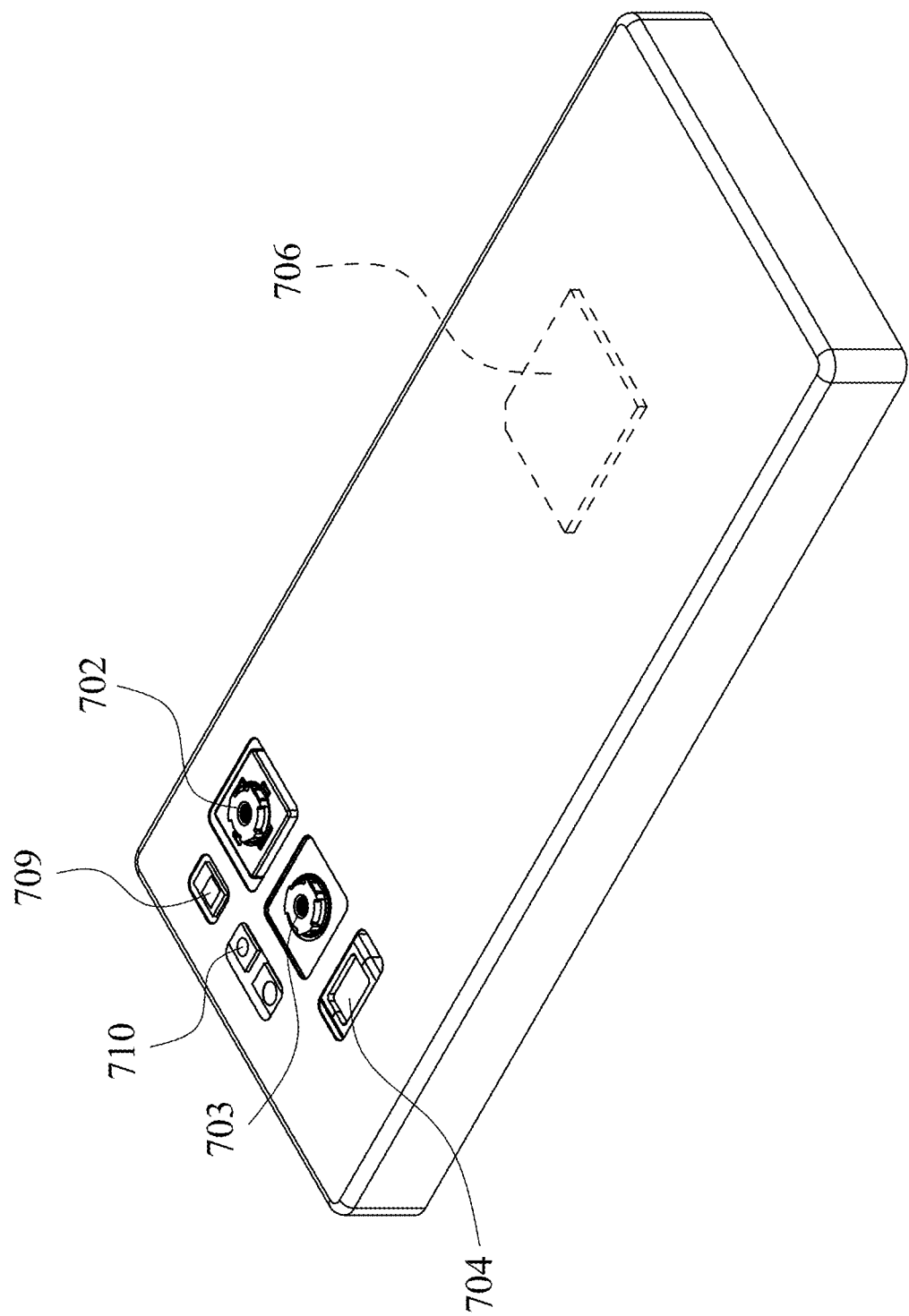

FIG. 7B shows another schematic view of the electronic device according to the 7th embodiment in FIG. 7A.

Figure 7C:
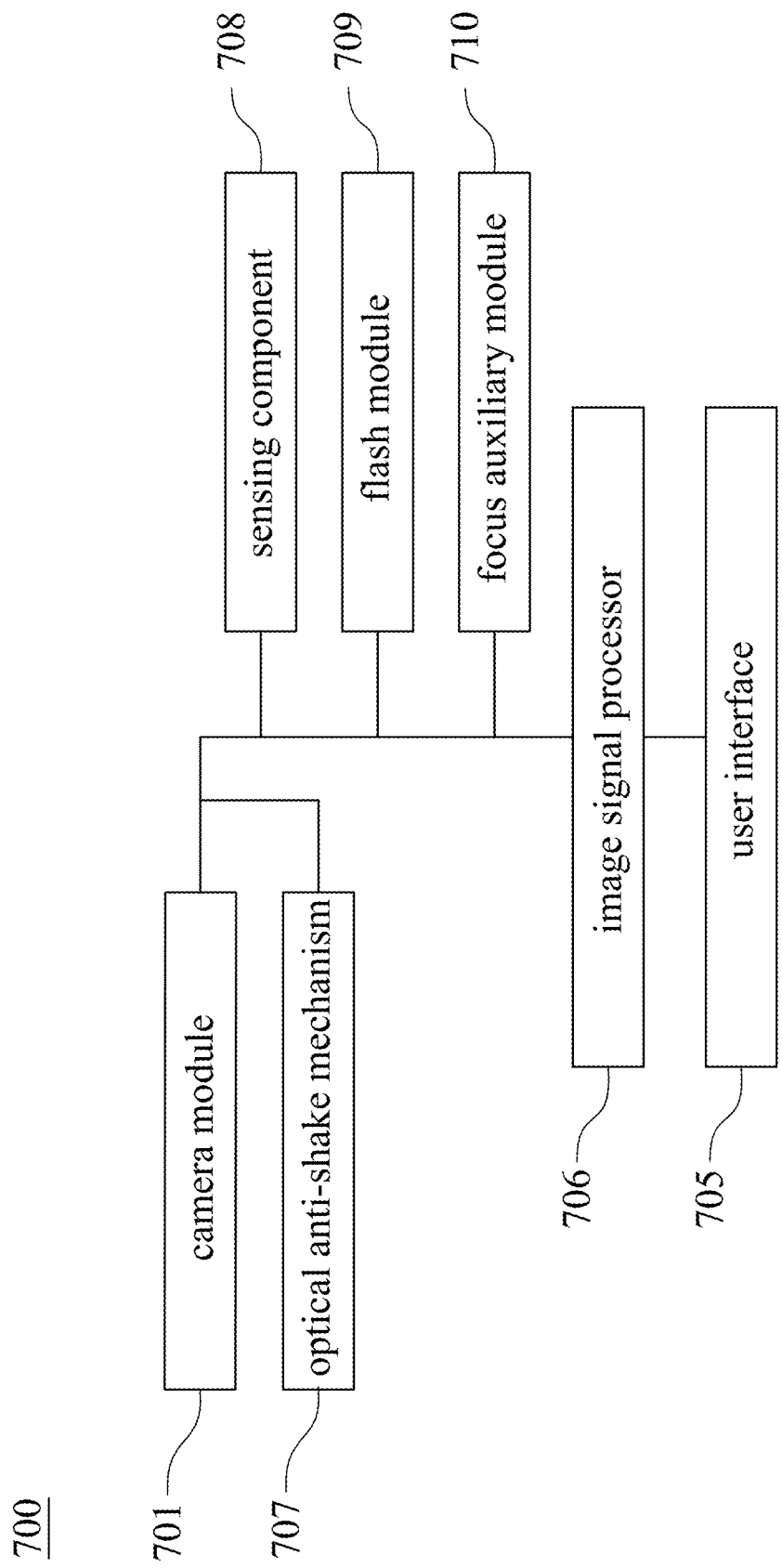

FIG. 7C shows a block diagram of the electronic device according to the 7th embodiment in FIG. 7A.

Figure 7D:
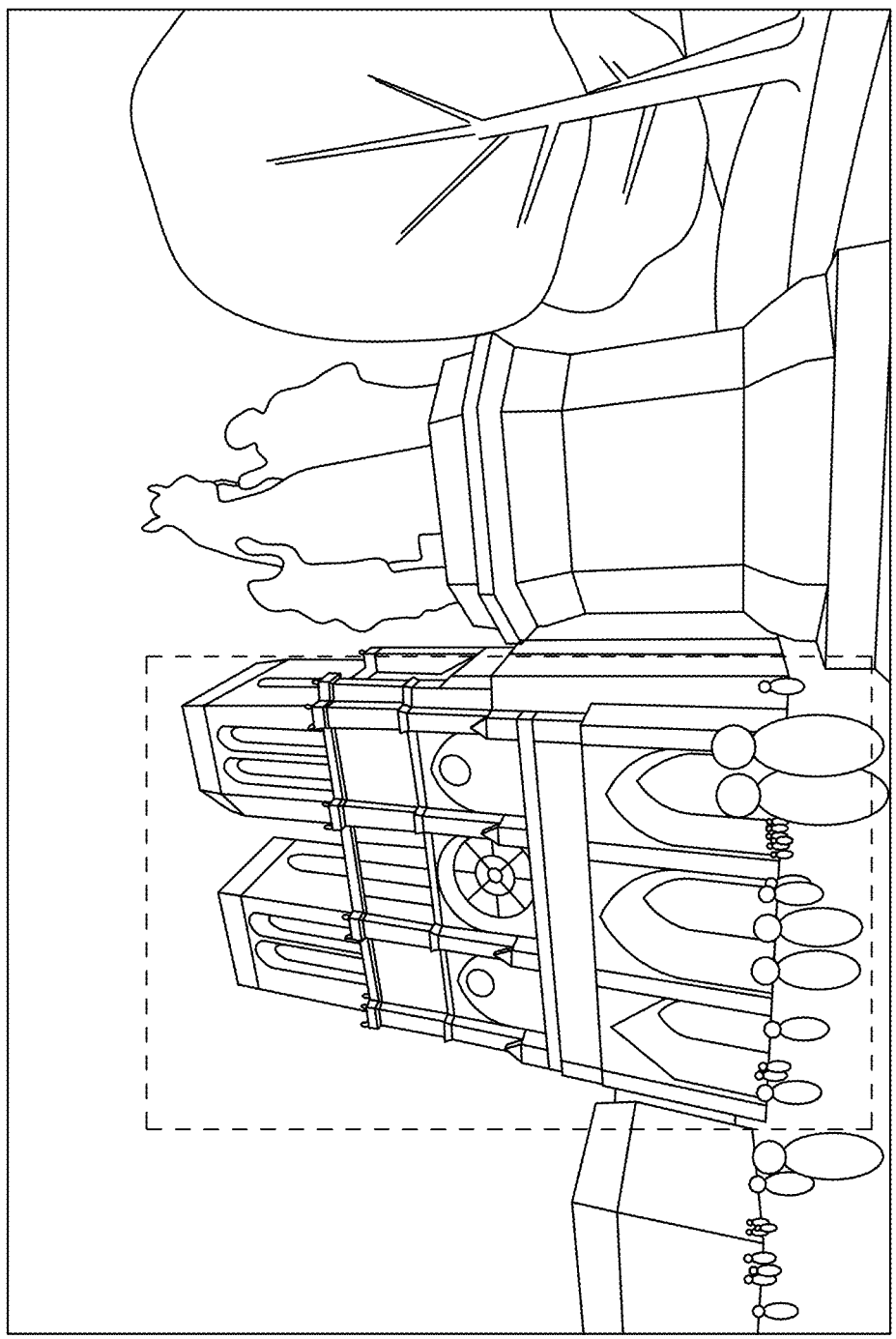

FIG. 7D is a schematic view of an image captured by the ultra-wide angle camera module according to the 7th embodiment in FIG. 7A.

Figure 7E:
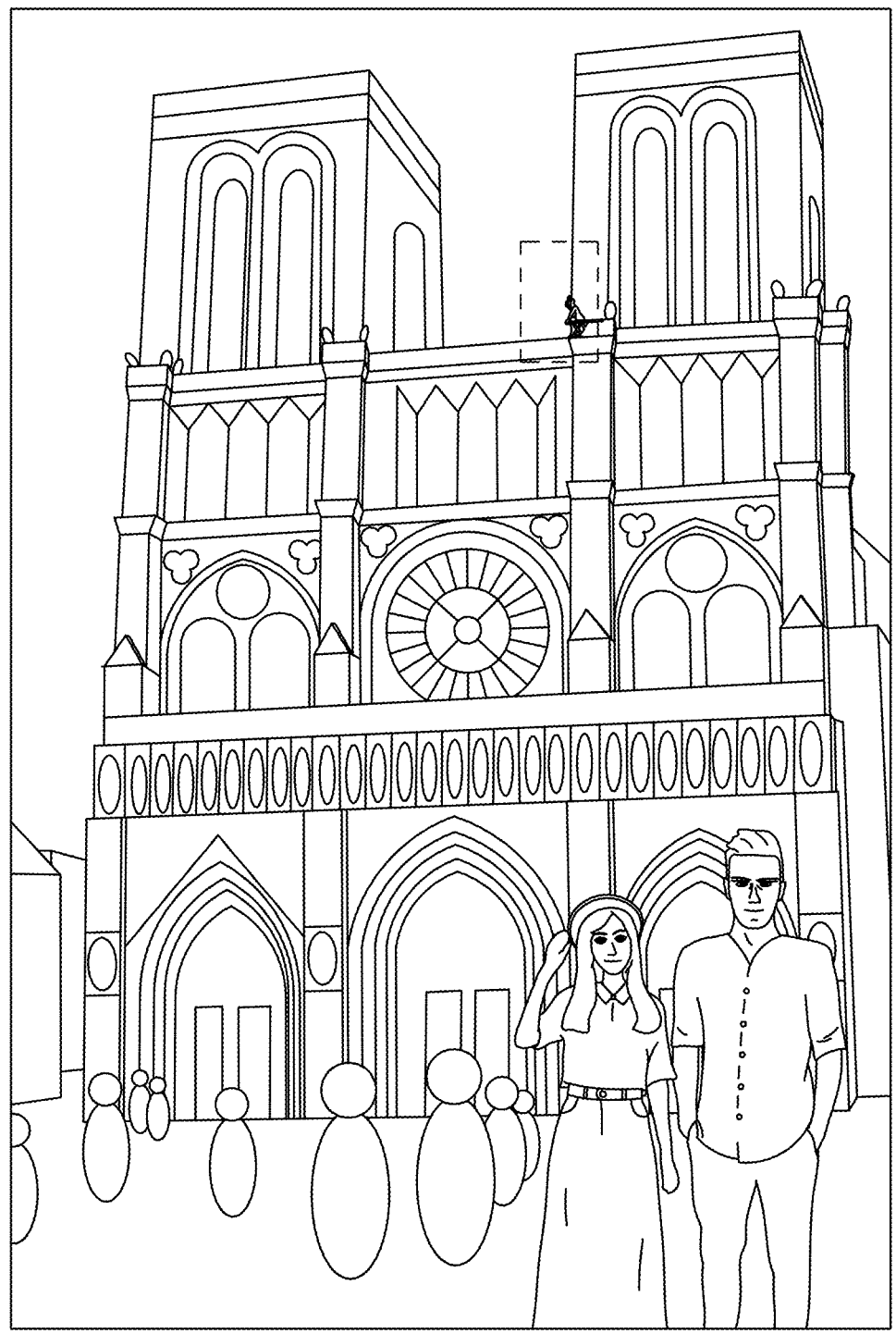

FIG. 7E is a schematic view of an image captured by the high-pixel camera module according to the 7th embodiment in FIG. 7A.

Figure 7F:
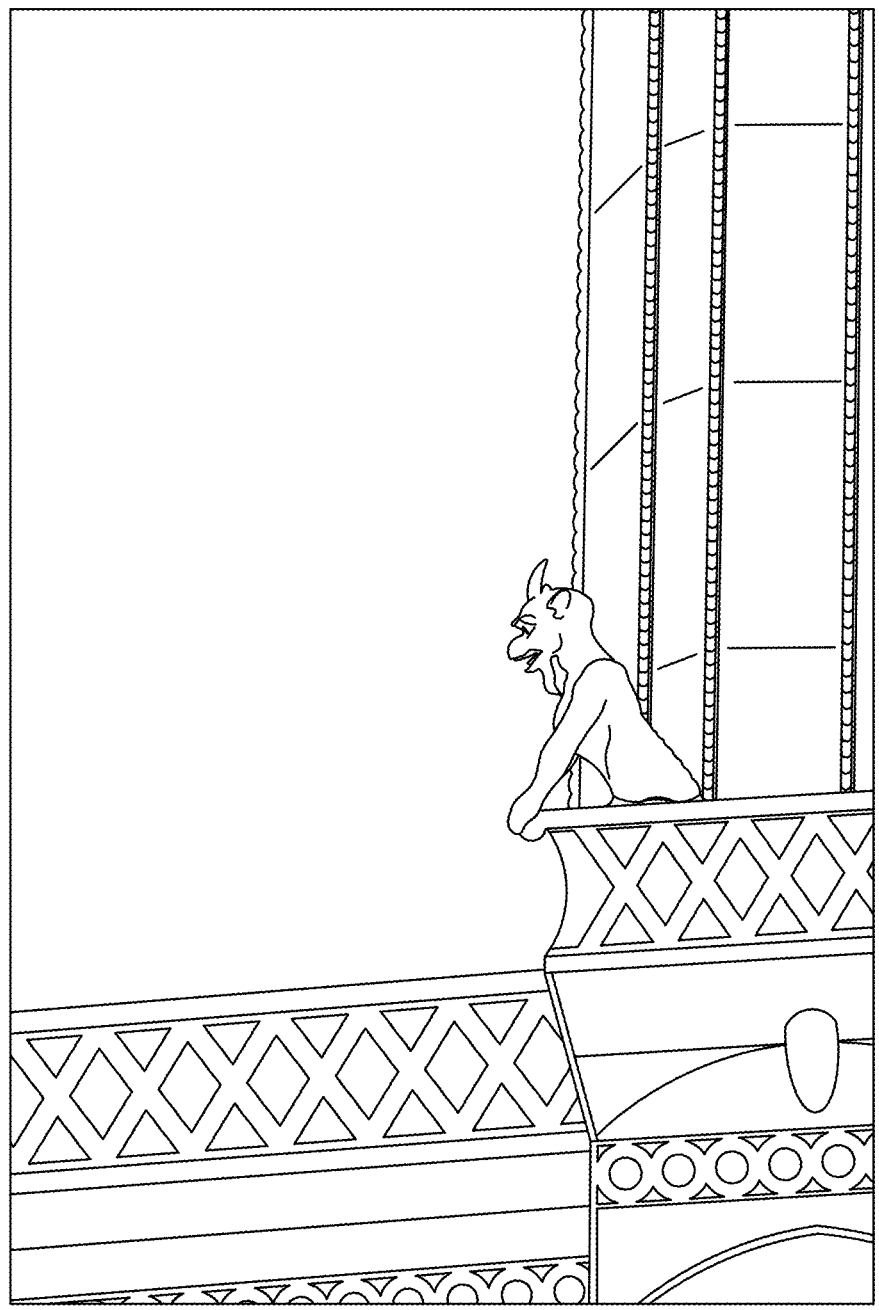

FIG. 7F is a schematic view of an image captured by the telephoto camera module according to the 7th embodiment in FIG. 7A.

DETAILED DESCRIPTION

The present disclosure provides a camera module which includes an imaging lens assembly module or an imaging lens assembly driving module. The camera module can further include a lens carrier, a first molded structure and a second molded structure. The lens carrier can define an optical axis. The first molded structure is coupled to the second molded structure for forming an inner space or at least one of the first molded structure and the second molded structure is for forming an inner space. Hence, the lens carrier or other elements can be accommodated in the inner space. The first molded structure can be disposed correspondingly to the lens carrier or other elements. The first molded structure is coupled to the second molded structure for forming a light passing hole which has a light blocking structure. Via design of the light passing hole, when non-imaging light from a large angle passes through the light passing hole, the light passing hole having the light blocking structure can change an original path of non-imaging light to prevent non-imaging light from entering an imaging lens assembly or an image surface. Hence, it is favorable for improving the imaging quality.

The imaging lens assembly driving module can include the aforementioned lens carrier, the aforementioned first molded structure, the aforementioned second molded structure, a driving mechanism and a mechanical member. The second molded structure can be coupled to the first molded structure for forming the inner space, and the lens carrier can be accommodated in the inner space. The driving mechanism is for driving the lens carrier to move along the optical axis. The mechanical member is for connecting the lens carrier and the first molded structure to each other. The second molded structure can be coupled to the first molded structure by point glue adhesion or design of plastic element engagement, but the present disclosure is not limited thereto.

A number of molded structures can be more than two, and it can be three, four or five, and labels of the molded structures such as the first molded structure only describe different molded structures, and the present disclosure is not limited to the number and the labels thereof.

The first molded structure and the second molded structure can include a first light blocking structure and a second light blocking structure, respectively. The first molded structure is coupled to the second molded structure so that the first light blocking structure and the second light blocking structure are disposed correspondingly to each other for forming the light passing hole. A cross section of the light passing hole which passes through the optical axis includes a valley point, a first crest point and a second crest point. The valley point is a farthest point away from the optical axis in the cross section. The first crest point is a closest point to the optical axis in the cross section. The second crest point is a closest point to the optical axis in another side relative to the first crest point based on a perpendicular line from the valley point to the optical axis. When a distance between the valley point and the optical axis is D, a distance between the first crest point and the optical axis is d1, and a distance between the second crest point and the optical axis is d2, the following conditions can be satisfied: $0.1<d1/D<0.95$; and $0.1<d2/D<0.95$. Via the configuration of the first molded structure and the second molded structure, a molded product which is detachable can be provide so as to achieve the more various and sophisticated light blocking structure by design of molding. Besides, the inner space and the light passing hole can be formed simultaneously so as to decrease manufacturing cost. Moreover, the light passing hole formed by the coupling between the first molded structure and the second molded structure can further provide allowance of optical design on the light blocking structure.

A light passing hole can be formed by at least one of the first molded structure and the second molded structure and include a light blocking structure. A cross section of the light passing hole which passes through the optical axis includes a valley point, a first crest point and a second crest point. The valley point is a farthest point away from the optical axis in the cross section. The first crest point is a closest point to the optical axis in the cross section. The second crest point is a closest point to the optical axis in another side relative to the first crest point based on a perpendicular line from the valley point to the optical axis. When a distance between the valley point and the optical axis is D, a distance between the first crest point and the optical axis is d1, and a distance between the second crest point and the optical axis is d2, the following conditions can be satisfied: $0.1<d1/D<d2/D$, and $0.9<d2/D<1.0$. Via elastic demolding, at least one of the first molded structure and the second molded structure can form the light passing hole in shape of a closed ring without coupling. The light blocking structure of the light passing hole can be a light blocking structure with concave-convex shape. During the process of molding, the more sophisticated molding products can be achieved by design of molding because of elasticity of plastic material. Via the light blocking structure with concave-convex shape, the non-imaging light can be reflected so as to decrease the intensity of the non-imaging light.

When the distance between the valley point and the optical axis is D, the distance between the first crest point and the optical axis is d1, and the distance between the second crest point and the optical axis is d2, the following conditions can be satisfied: $0.5<d1/D<0.91$; and $0.5<d2/$ D<0.91. Via the better configuration ratio of the valley point, the first crest point and the second crest point, the light blocking structure is more suitable for elastic demolding so as to reduce manufacturing cost of design of molding. Furthermore, when an elastic drafting ratio defined by the cross section of the light passing hole is EDR, and the following conditions can be satisfied: EDR=[(D−d1)/D]× 100%, and 0%<EDR<15%. Hence, the light passing hole can be formed by elastic demolding.

The optical axis can pass through the light passing hole so that the lens carrier and the light passing hole are configured coaxially. Via the configuration of the lens carrier and the light passing hole, coaxiality between the lens carrier and the light passing hole can be maintained so as to prevent the light passing hole from the light excluding non-imaging light. Hence, the imaging quality can be improved.

The light passing hole can surround the optical axis and be in shape of a closed ring. Hence, the continuity of the disposition of the first light blocking structure and the second light blocking structure corresponding to each other can be ensured so as to maintain the higher efficiency of light blocking.

The mechanical member can connect the lens carrier and the first molded structure to each other by magnetic force, gravity or Lorentz force, but the present disclosure is not limited thereto. In other words, a molded structure connected to the lens carrier via the mechanical member is defined as the first molded structure.

The mechanical member can include at least one ferromagnetic element, and the ferromagnetic element is corresponding to the driving mechanism. Via the configuration of the ferromagnetic element, the mechanical member can connect the lens carrier and the first molded structure by magnetic force so as to stabilize the connection of the lens carrier, the first molded structure and the driving mechanism. Thus, an abnormal displacement of elements can be prevented during the operation of the imaging lens assembly driving module, and the driving efficiency of magnetic force can be optimized. Hence, the stability of focusing can be improved.

The imaging lens assembly driving module can further include at least one light-folding element. The light-folding element is for folding imaging light from an incident light path of the light-folding element into an emergent light of the light-folding element, and the light-folding element defines another optical axis. Via the light-folding element, the more ideal configuration of the imaging lens assembly driving module can be achieved so that a light path with a long focal length can be accommodated in the inner space. Hence, the feasibility of the micro lens assembly can be provided.

The inner space can be formed by the first molded structure, and the light-folding element is accommodated in the inner space. Via the light passing hole disposed on at least one of an object side and an image side of the light-folding element, non-imaging light can be effectively blocked. Hence, clarity of image can be maintained.

When an included angle θ is formed between a line joining the valley point and the first crest point and a line joining the valley point and the second crest point, an included angle θ1 is formed between the line joining the valley point and the first crest point and a line parallel to the optical axis, and an included angle θ2 is formed between the line joining the valley point and the second crest point and the line parallel to the optical axis, the outline of the light passing hole formed by the disposition of the first light blocking structure and the second light blocking structure corresponding to each other can be defined. Moreover, the following condition can be satisfied: θ+θ1+θ2=180 degrees. The better range of the included angles can be provided for non-imaging light reflecting in the included angle θ. Furthermore, the following conditions can be satisfied: 5 degrees<θ1<157 degrees; and 5 degrees<θ2<157 degrees. Via the configuration of the included angles θ1 and θ2, an opening formed by the valley point, the first crest point and the second crest point can expand gradually towards the optical axis. Hence, it is favorable for changing an original path of non-imaging light.

The imaging lens assembly module can include the aforementioned lens carrier. The lens carrier includes an imaging lens element set, a light-folding element, a first molded structure and a second molded structure. The imaging lens element set can define the optical axis. The light-folding element is for folding an imaging light from an incident light path of the light-folding element into an emergent light path of the light-folding element. The first molded structure is disposed correspondingly to the light-folding element or the imaging lens element set and includes a first light blocking structure. The second molded structure can be disposed correspondingly to the imaging lens element set, and is coupled to the first molded structure for forming an inner space. At least one of the lens carrier and the light-folding element is accommodated in the inner space, and the second molded structure includes a second light blocking structure. The first molded structure is coupled to the second molded structure so that the first light blocking structure and the second light blocking structure are disposed correspondingly to each other for forming a first light passing hole.

The first molded structure can further include a third light blocking structure, the second molded structure can further include a fourth light blocking structure, and the first molded structure is coupled to the second molded structure so that the third light blocking structure is disposed correspondingly to the fourth light blocking structure for forming a second light passing hole. Hence, one lens carrier can include more than two light passing holes so as to correspond to the more sophisticated optical design and decrease assembling tolerance.

Specifically, the light-folding element can be a prism or a mirror, but the present disclosure is not limited thereto. The light-folding element can fold the light path of imaging light by at least one reflecting surface therein. A number of times of folding increases as a number of reflecting surfaces in the light-folding element. Via the configuration of the light-folding element, periscope type imaging lens assembly can be manufactured. Hence, the requirement of a light path with long focal length can be satisfied.

The incident light path of the light-folding element can pass through the first light passing hole; the emergent light path of the light-folding element can pass through the second light passing hole. Thus, a light blocking requirement of the emergent light path can be satisfied. Hence, the generation of stray light can be reduced.

The lens carrier can further include a third molded structure. The third molded structure is coupled to the first molded structure and the second molded structure for forming the inner space. At least one of the imaging lens element set and the light-folding element is accommodated in the inner space. Via the configuration of the first molded structure, the second molded structure and the third molded structure, the lens carrier can be a detachable molded product so as to reduce the difficulty of demolding. Hence, the yield rate of the products can be improved.

The third molded structure can include a third light blocking structure. The first molded structure and the second molded structure are coupled to the third molded structure so that the first light blocking structure, the second light blocking structure and the third light blocking structure are disposed correspondingly to each other for forming a third light passing hole. Via a molded structure formed by the coupling of a plurality of molded structures, it is favorable for corresponding to the design requirement of the more sophisticated light blocking structure.

A cross section of the third light passing hole can pass through the optical axis and include a valley point, a first crest point and a second crest point. The valley point is a farthest point away from the optical axis in the cross section. The first crest point is a closest point to the optical axis in the cross section. The second crest point is a closest point to the optical axis in another side relative to the first crest point based on a perpendicular line from the valley point to the optical axis. When a distance between the valley point and the optical axis is D, a distance between the first crest point and the optical axis is d1, and a distance between the second crest point and the optical axis is d2, the following conditions can be satisfied: $0.94 < d1/D < 1.0$; and $0.94 < d2/D < 1.0$. Via the better configuration ratio of the valley point, the third light passing hole formed by the first light blocking structure, the second light blocking structure and the third light blocking structure can be fitted in different formations. Hence, different requirements of optical design can be satisfied.

The incident light path of the light-folding element can pass through the third light passing hole. Hence, the generation of stray light can be reduced.

Each of the abovementioned features of the camera module can be utilized in various combinations for achieving the corresponding effects.

The present disclosure provides an electronic device. The electronic device includes the aforementioned camera module and an image sensor. The image sensor is corresponding to the aforementioned camera module.

According to the above description of the present disclosure, the following specific embodiments are provided for further explanation.

1st Embodiment

Figure 1A:
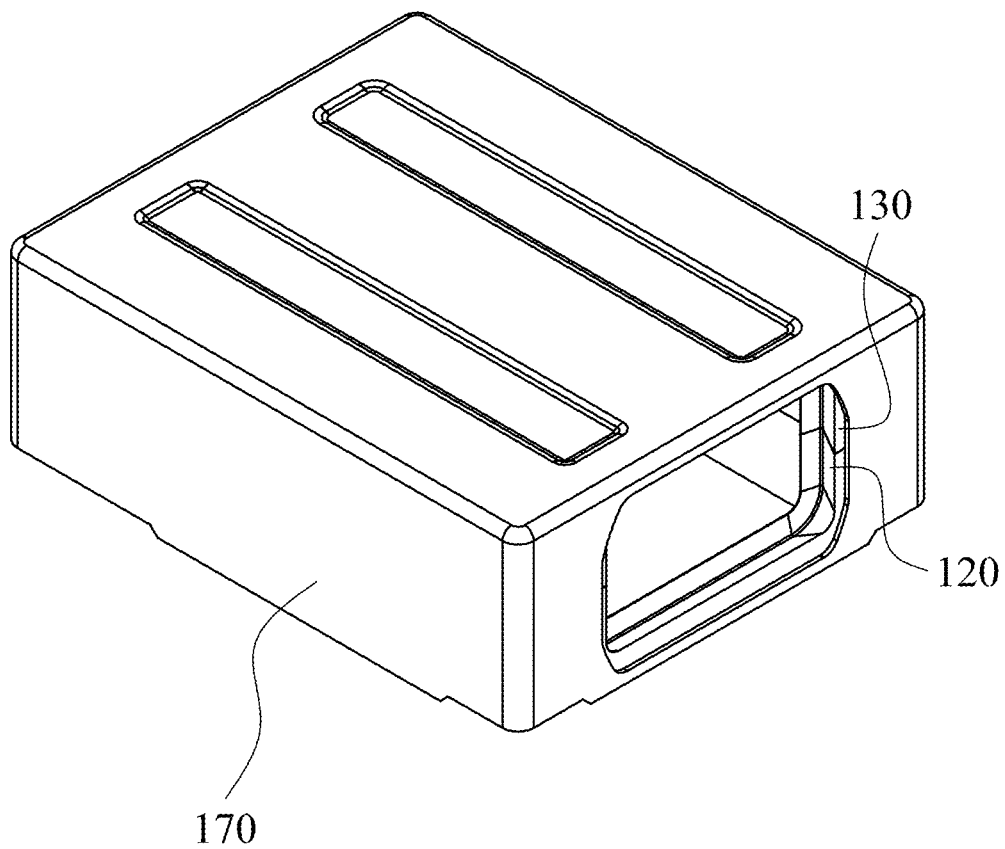
FIG. 1A shows a three-dimensional schematic view of an imaging lens assembly driving module according to the 1st embodiment of the present disclosure.
Figure 1B:
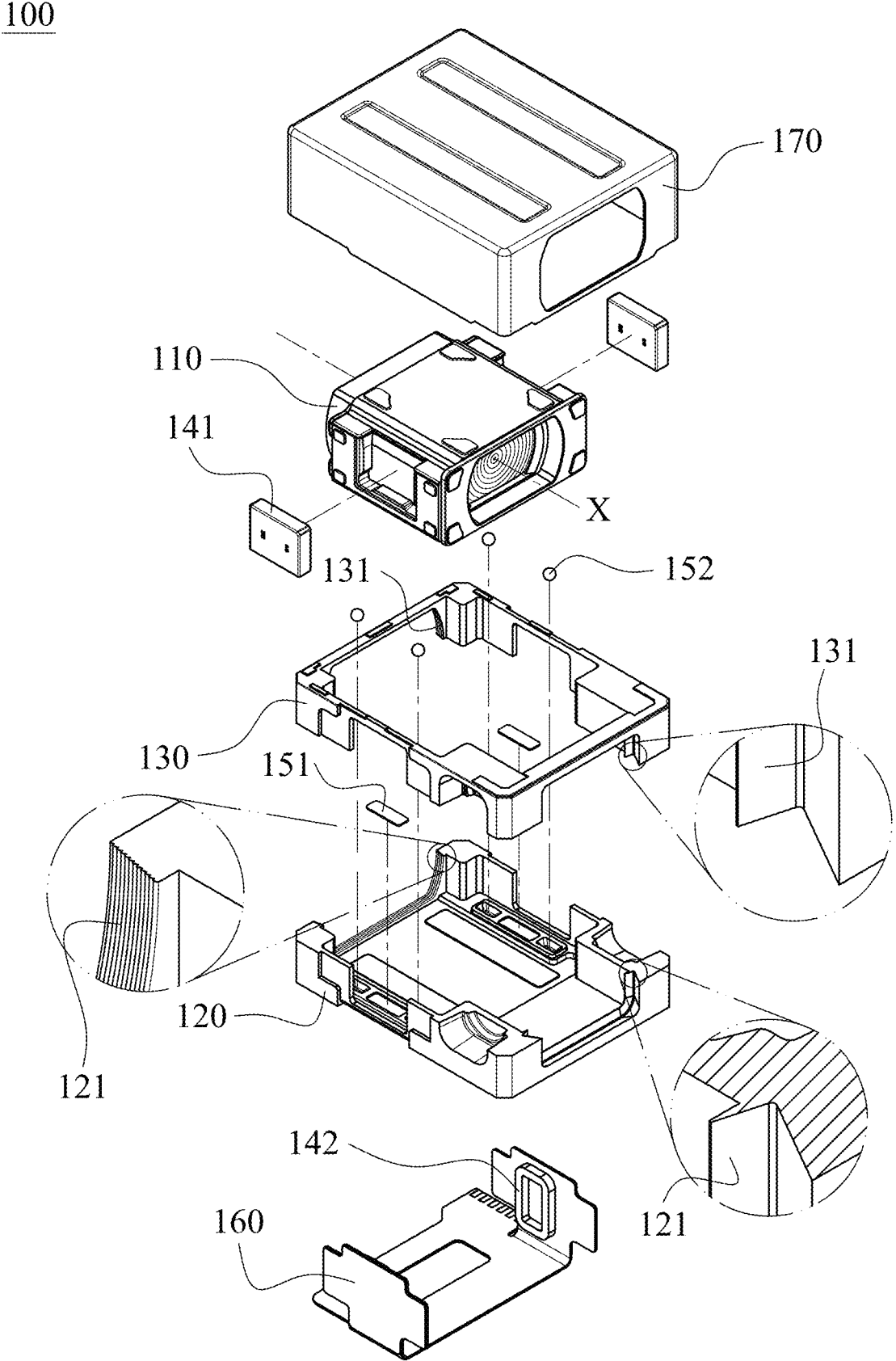
FIG. 1B shows an exploded view of the imaging lens assembly driving module according to the 1st embodiment in FIG. 1A.
Figure 1C:
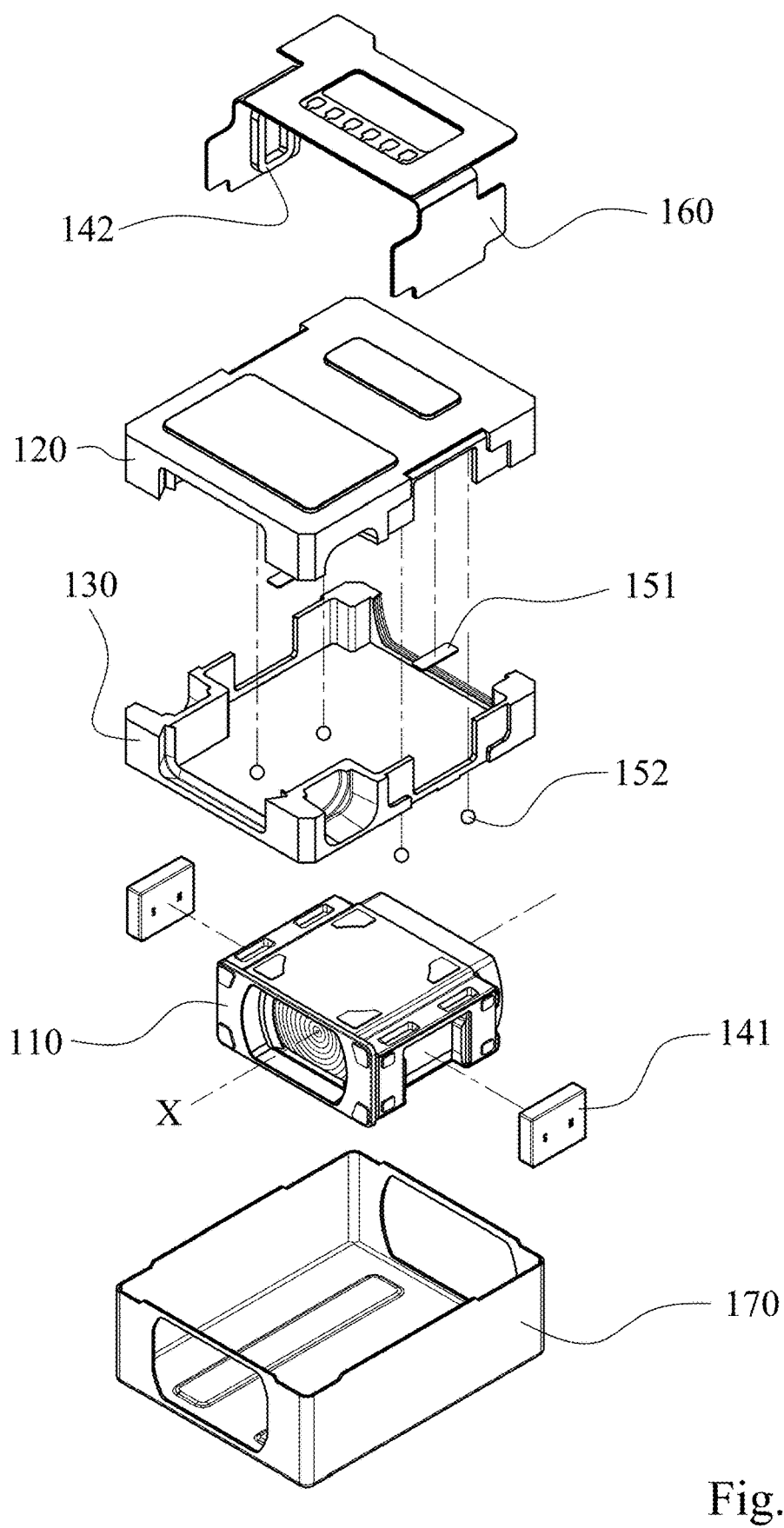
FIG. 1C shows another perspective of the exploded view of the imaging lens assembly driving module according to the 1st embodiment in FIG. 1A.

FIG. 1A shows a three-dimensional schematic view of an imaging lens assembly driving module 100 according to the 1st embodiment of the present disclosure. FIG. 1B shows an exploded view of the imaging lens assembly driving module 100 according to the 1st embodiment in FIG. 1A. FIG. 1C shows another perspective of the exploded view of the imaging lens assembly driving module 100 according to the 1st embodiment in FIG. 1A. In FIGS. 1A-1C, the imaging lens assembly driving module 100 includes a lens carrier 110, a first molded structure 120, a second molded structure 130, a driving mechanism (its reference numeral is omitted), a mechanical member (its reference numeral is omitted), a flexible circuit board 160 and a top cover 170.

The lens carrier 110 defines an optical axis X. The first molded structure 120 is disposed correspondingly to the lens carrier 110 and includes a first light blocking structure 121. The second molded structure 130 is coupled to the first molded structure 120 for forming an inner space 122 (shown in FIG. 1D), the lens carrier 110 can be accommodated in the inner space 122, and the second molded structure 130 includes a second light blocking structure 131. The driving mechanism is for driving the lens carrier 110 to move along the optical axis X. The mechanical member is for connecting the lens carrier 110 and the first molded structure 120 to each other. The flexible circuit board 160 is covered in the top cover 170, and the lens carrier 110, the first molded structure 120, the second molded structure 130, the driving mechanism and the mechanical member are accommodated in the top cover 170.

Specifically, the driving mechanism can include at least one driving magnet 141 and at least one driving coil 142. In the 1st embodiment, a number of each of the driving magnet 141 and the driving coil 142 is two. The two driving magnets 141 are disposed on two outer sides of the lens carrier 110, respectively. The two driving coils 142 are disposed on two inner sides of the flexible circuit board 160, respectively. The two driving magnets 141 are corresponding to the two driving coils 142, respectively, but the present disclosure is not limited thereto. Hence, via the relative corresponding between the driving magnets 141 and the driving coils 142, the lens carrier 110 can be moved for focusing.

In FIGS. 1B and 1C, the mechanical member can include at least one ferromagnetic element 151, and the ferromagnetic element 151 is corresponding to the driving mechanism. In the 1st embodiment, a number of the ferromagnetic element 151 is two, and the two ferromagnetic elements 151 are disposed in the first molded structure 120 and corresponding to the two driving magnets 141, respectively, but the present disclosure is not limited thereto. Since the driving magnets 141 are disposed on the lens carrier 110 via the configuration of the ferromagnetic elements 151, the mechanical member can connect the lens carrier 110 and the first molded structure 120 by magnetic force so as to improve the stability of focusing during the operation of the imaging lens assembly driving module 100. In addition, the mechanical member can further include a plurality of rolling balls 152, and the rolling balls 152 are disposed between the lens carrier 110 and the first molded structure 120. Specifically, in the 1st embodiment, a number of the rolling balls 152 is four, but the present disclosure is not limited thereto. The configuration of the rolling balls 152 can further stabilize the movement of the lens carrier 110 along the optical axis X so as to improve the stability of focusing.

Figure 1D:
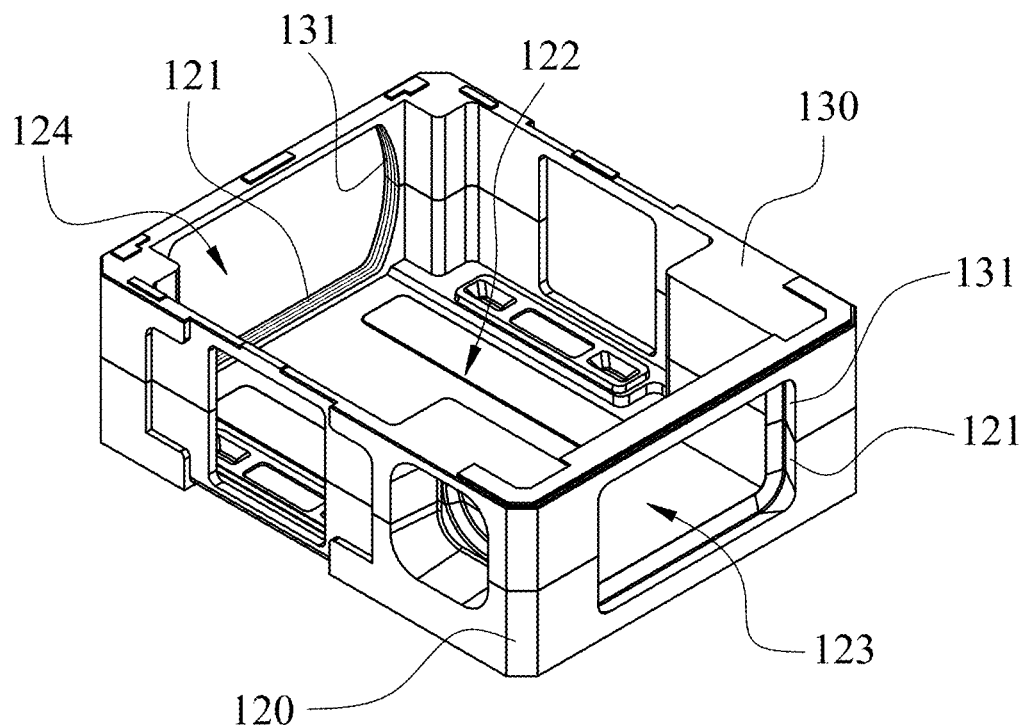
FIG. 1D shows a schematic view of a coupling between the first molded structure and the second molded structure according to the 1st embodiment in FIG. 1A.
Figure 1E:
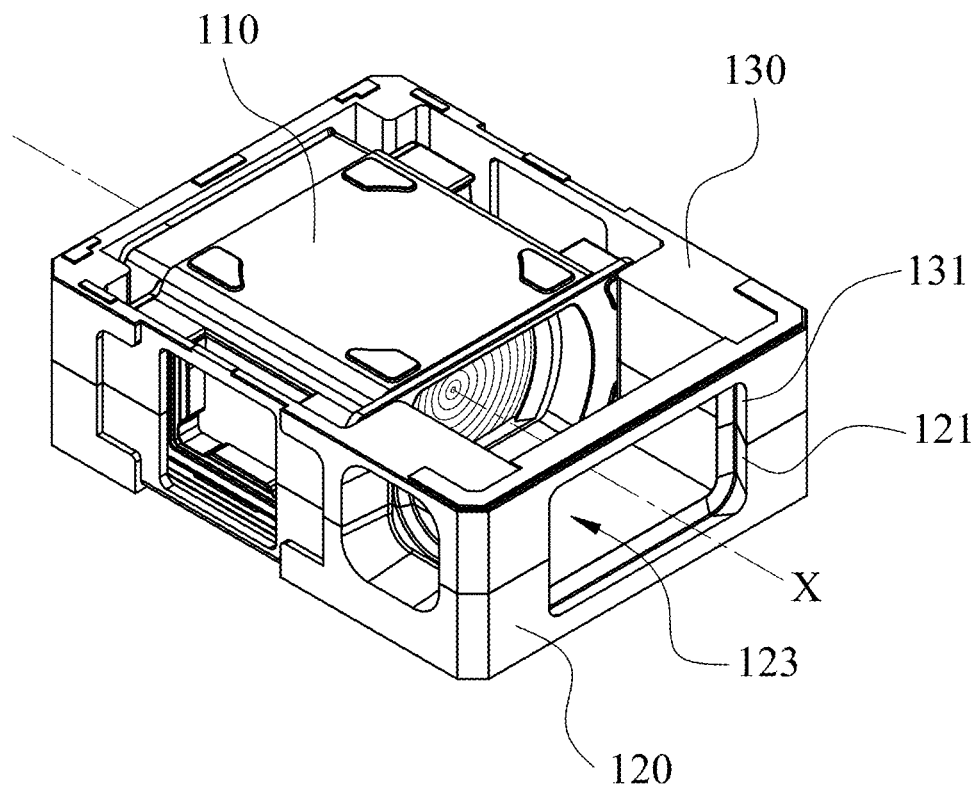
FIG. 1E shows a schematic view of the combination of the lens carrier, the first molded structure and the second molded structure according to the 1st embodiment in FIG. 1A.

FIG. 1D shows a schematic view of a coupling between the first molded structure 120 and the second molded structure 130 according to the 1st embodiment in FIG. 1A. FIG. 1E shows a schematic view of the combination of the lens carrier 110, the first molded structure 120 and the second molded structure 130 according to the 1st embodiment in FIG. 1A. In FIGS. 1B-1E, the first molded structure 120 is coupled to the second molded structure 130 so that the first light blocking structure 121 and the second light blocking structure 131 are disposed correspondingly to each other for forming light passing holes 123, 124. In detail, the first molded structure 120 can be coupled to the second molded structure 130 by point glue adhesion or design of plastic element engagement, but the present disclosure is not limited thereto. Via design of the light passing holes 123, 124, when non-imaging light from a large angle passes through the light passing holes 123, 124 which are formed by the first light blocking structure 121 and the second light blocking structure 131, the light passing holes 123, 124 can change an original path of non-imaging light to prevent non-imaging light from entering an imaging lens assembly or an image surface. Hence, it is favorable for improving the imaging quality.

In FIG. 1E, the optical axis X can pass through the light passing holes 123, 124 so that the lens carrier 110 and the light passing holes 123, 124 are configured coaxially. Therefore, coaxiality between the lens carrier 110 and the light passing holes 123, 124 can be maintained so as to prevent the light passing holes 123, 124 from blocking the light excluding non-imaging light. Hence, the imaging quality can be improved. Moreover, each of the light passing holes 123, 124 can surround the optical axis X and be in shape of a closed ring. Hence, the continuity of the disposition of the first light blocking structure 121 and the second light blocking structure 131 corresponding to each other can be ensured so as to maintain the higher efficiency of light blocking. Specifically, the first light blocking structure 121 and the second light blocking structure 131 are connected symmetrically to each other so that each of the light passing holes 123, 124 are maintained in the shape of a continuous and closed ring hole.

Figure 1F:
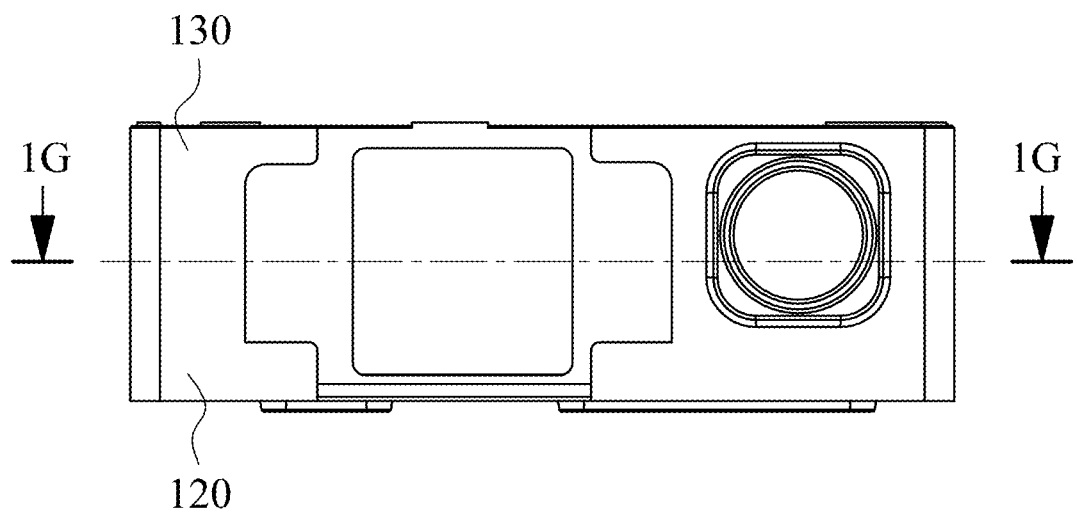
FIG. 1F shows a side view of the coupling between the first molded structure and the second molded structure according to the 1st embodiment in FIG. 1A.
Figure 1G:
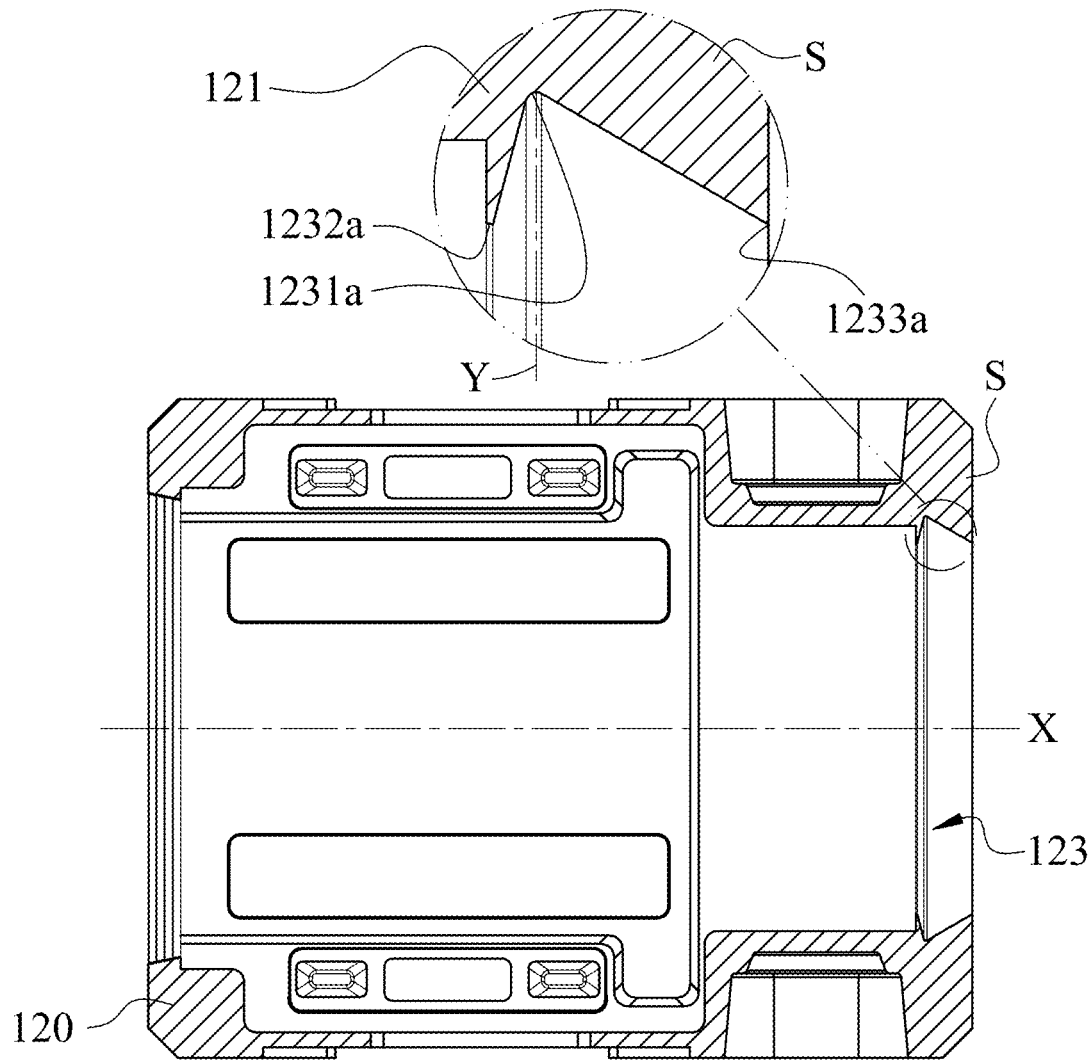
FIG. 1G shows a cross-sectional view of the first molded structure and the second molded structure along a cutting line 1G-1G according to the 1st embodiment in FIG. 1F.

FIG. 1F shows a side view of the coupling between the first molded structure 120 and the second molded structure 130 according to the 1st embodiment in FIG. 1A. FIG. 1G shows a cross-sectional view of the first molded structure 120 and the second molded structure 130 along a cutting line 1G-1G according to the 1st embodiment in FIG. 1F. It has to be specified that the light passing hole 123 formed by the first light blocking structure 121 and the second light blocking structure 131 in the 1st embodiment can provide three different structures of the light passing hole 123 of the 1st example, the 2nd example and the 3rd example according to different requirements of optical design. To be simplified, the light passing hole 123 of the 1st example, the 2nd example and the 3rd example according to the 1st embodiment are labeled as the same, and the other elements and the configuration thereof of the 1st example, the 2nd example and the 3rd example according to the 1st embodiment are the same, and it will not be described herein. Moreover, in the 1st embodiment, a structure of the light passing hole 124 formed by the first light blocking structure 121 and the second light blocking structure 131 can be the same as the light passing hole 123 or a light passing hole 223 (shown in FIG. 2B) in the 2nd embodiment, but the present disclosure is not limited thereto. The detail structure of the light passing hole 223 is described in the 2nd embodiment, and it will not be described herein.

In FIG. 1G, in the 1st example of the 1st embodiment, a cross section of the light passing hole 123 which passes through the optical axis X includes a valley point 1231a, a first crest point 1232a and a second crest point 1233a. Specifically, the aforementioned cross section is an interface of coupling between the first molded structure 120 and the second molded structure 130, but the present disclosure is not limited thereto. The valley point 1231a is a farthest point away from the optical axis X in the cross section. The first crest point 1232a is a closest point to the optical axis X in the cross section. The second crest point 1233a is a closest point to the optical axis X in another side relative to the first crest point 1232a based on a perpendicular line Y from the valley point 1231a to the optical axis X. Specifically, the valley point 1231a, the first crest point 1232a and the second crest point 1233a are the points in the cross section of a light blocking structure formed by the first light blocking structure 121 and the second light blocking structure 131 in FIG. 1G.

Figure 1H:
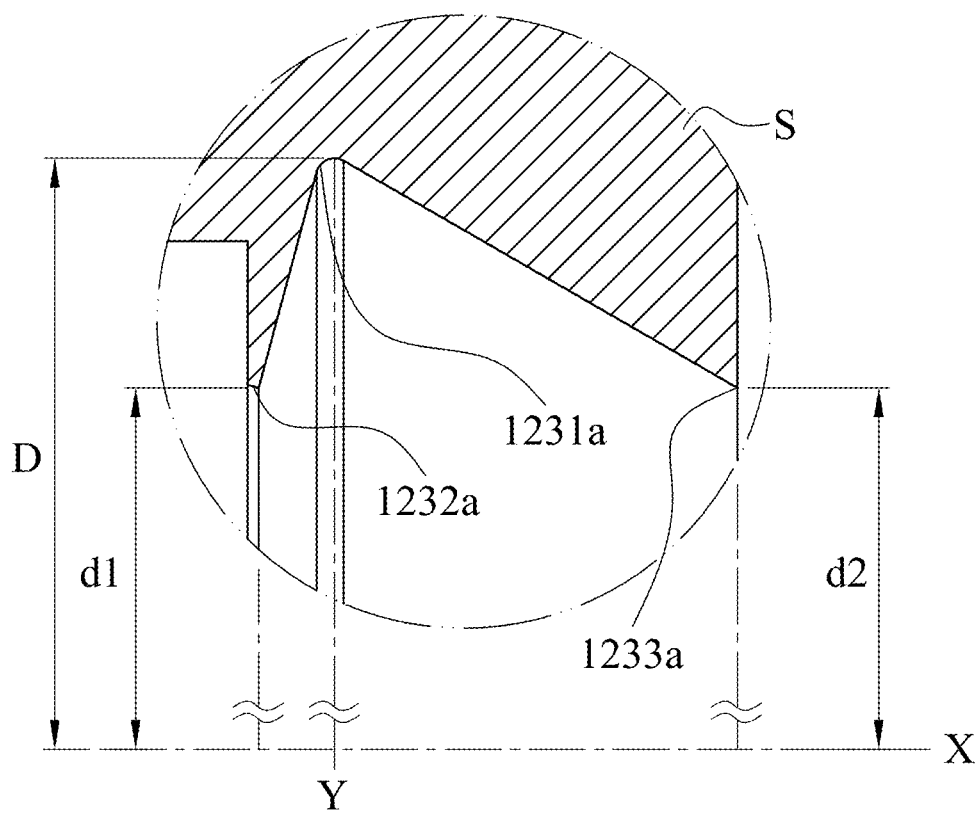
FIG. 1H shows a schematic view of parameters of the light passing hole of the 1st example according to the 1st embodiment in FIG. 1G.
Figure 1I:
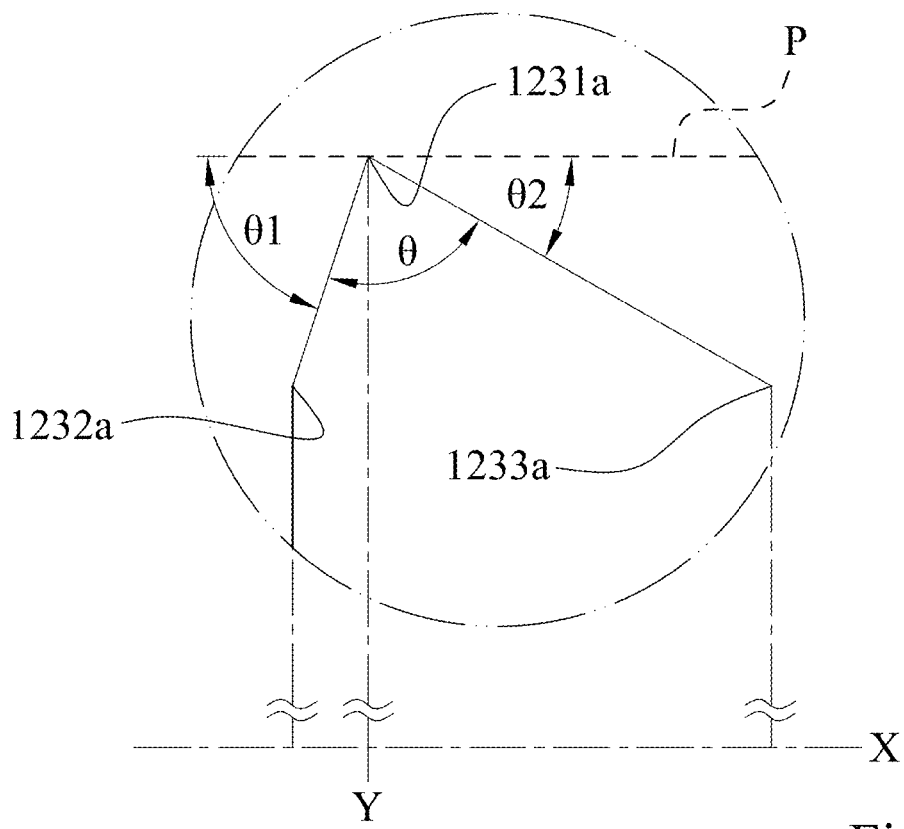
FIG. 1I shows another schematic view of parameters of the light passing hole of the 1st example according to the 1st embodiment in FIG. 1G.

FIG. 1H shows a schematic view of parameters of the light passing hole 123 of the 1st example according to the 1st embodiment in FIG. 1G. FIG. 1I shows another schematic view of parameters of the light passing hole 123 of the 1st example according to the 1st embodiment in FIG. 1G. In FIGS. 1H and 1I, when a distance between the valley point 1231a and the optical axis is D, a distance between the first crest point 1232a and the optical axis X is d1, and a distance between the second crest point 1233a and the optical axis X is d2, an included angle θ is formed between a line joining the valley point 1231a and the first crest point 1232a and a line joining the valley point 1231a and the second crest point 1233a, an included angle θ1 is formed between the line joining the valley point 1231a and the first crest point 1232a and a line P parallel to the optical axis X, and an included angle θ2 is formed between the line joining the valley point 1231a and the second crest point 1233a and the line P parallel to the optical axis X, and an elastic drafting ratio defined by the cross section of the light passing hole 123 is EDR (EDR=[(D−d1)/D]×100%), the aforementioned parameters can be satisfied in the following Table 1.

TABLE 1

| the 1st example of the 1st embodiment | | | |
|---|---|---|---|
| D (mm) | 5.03 | θ (degree) | 78.5 |
| d1 (mm) | 4.4 | θ1 (degree) | 71.8 |
| d2 (mm) | 4.4 | θ2 (degree) | 29.7 |
| d1/D | 0.875 | EDR (%) | 12.5 |
| d2/D | 0.875 | | |

Figure 1J:
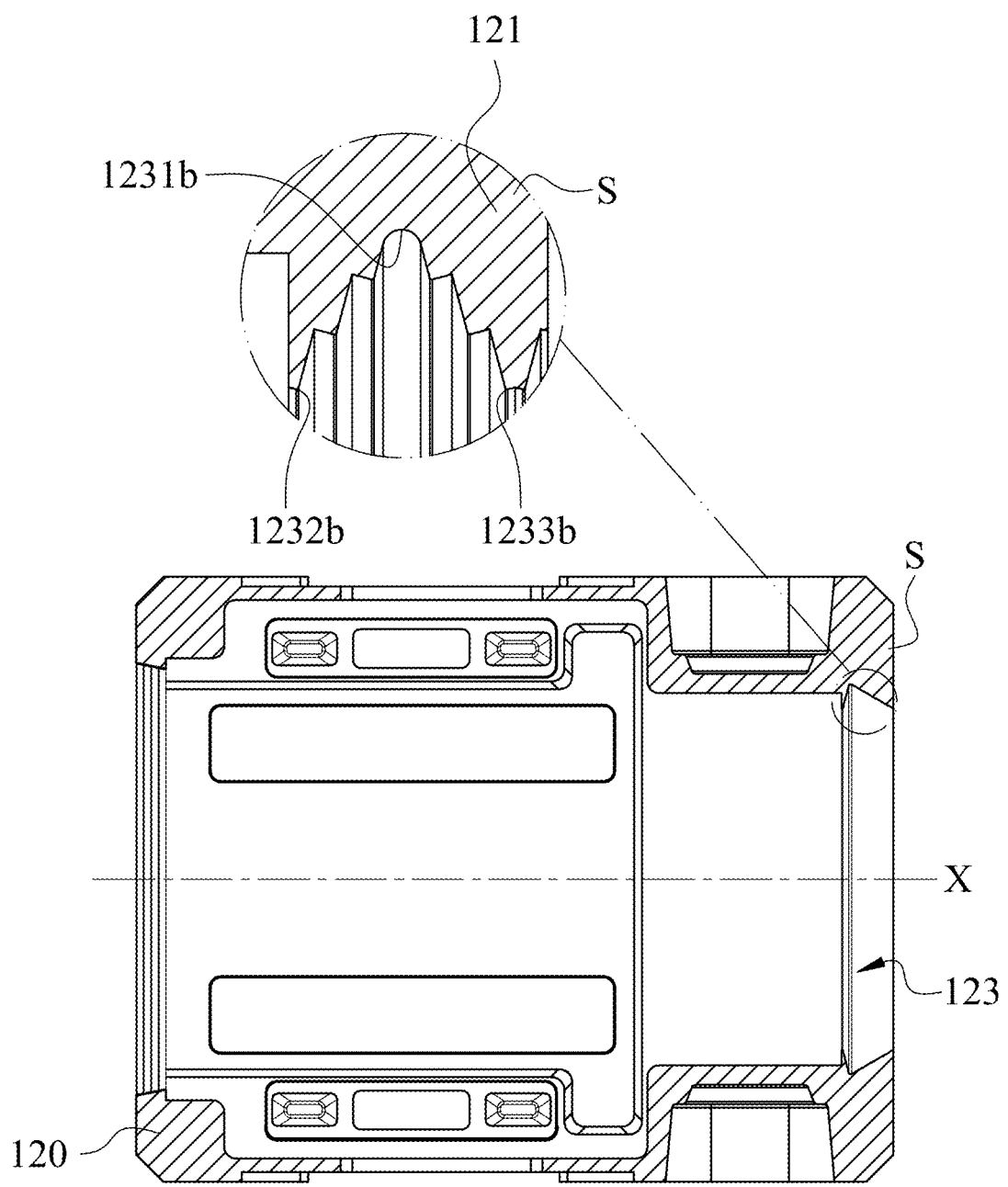
FIG. 1J shows a cross-sectional view of the first molded structure and the second molded structure of the 2nd example along the cutting line 1G-1G according to the 1st embodiment in FIG. 1F.

FIG. 1J shows a cross-sectional view of the first molded structure 120 and the second molded structure 130 of the 2nd example along the cutting line 1G-1G according to the 1st embodiment in FIG. 1F. In FIG. 1J, in the 2nd example of the 1st embodiment, a cross section of the light passing hole 123 which passes through the optical axis X includes a valley point 1231b, a first crest point 1232b and a second crest point 1233b. Specifically, the aforementioned cross section is an interface of coupling between the first molded structure 120 and the second molded structure 130, but the present disclosure is not limited thereto. The valley point 1231b is a farthest point away from the optical axis X in the cross section. The first crest point 1232b is a closest point to the optical axis X in the cross section. The second crest point 1233b is a closest point to the optical axis X in another side relative to the first crest point 1232b based on a perpendicular line Y (shown in FIG. 1K) from the valley point 1231b to the optical axis X.

Figure 1K:
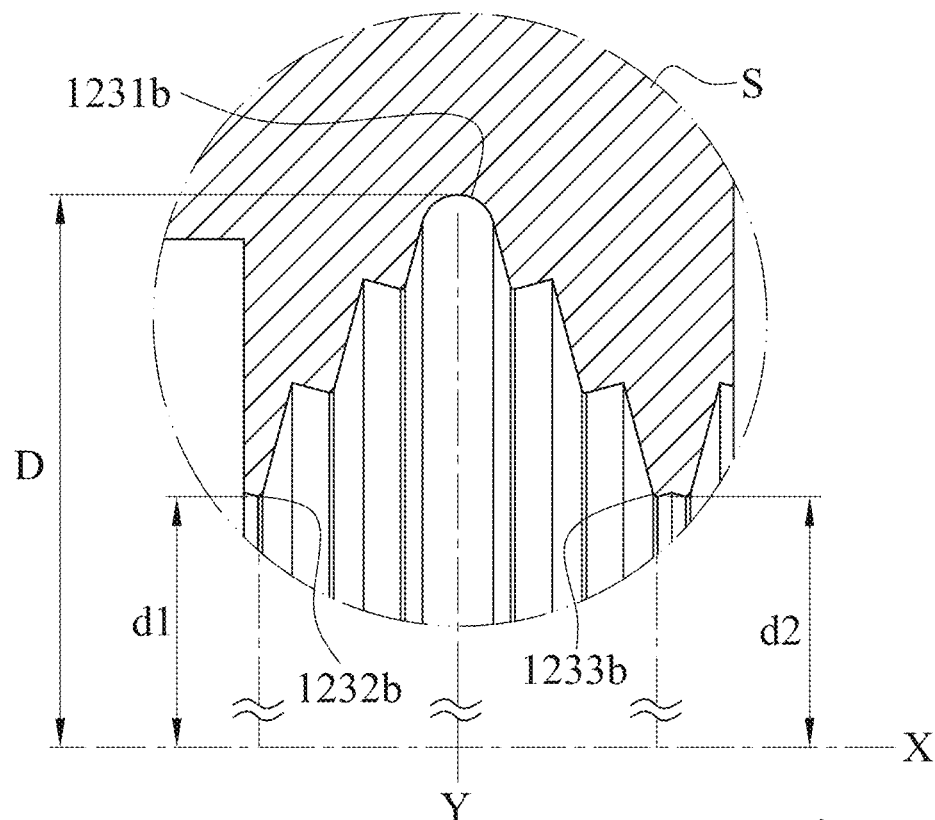
FIG. 1K shows a schematic view of parameters of the light passing hole of the 2nd example according to the 1st embodiment in FIG. 1J.
Figure 1L:
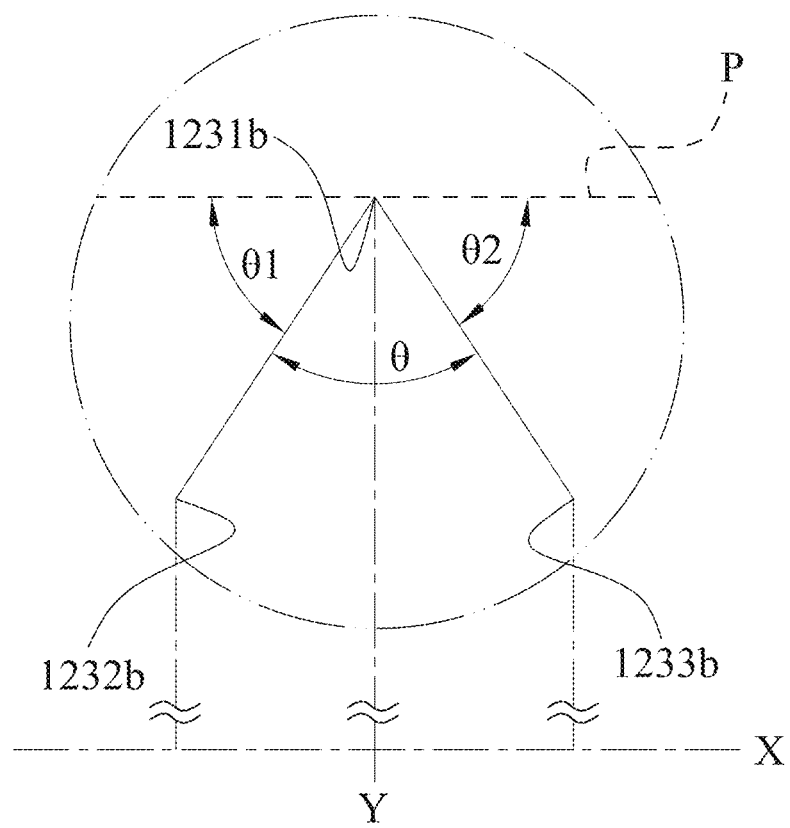
FIG. 1L shows another schematic view of parameters of the light passing hole of the 2nd example according to the 1st embodiment in FIG. 1J.

FIG. 1K shows a schematic view of parameters of the light passing hole 123 of the 2nd example according to the 1st embodiment in FIG. 1J. FIG. 1L shows another schematic view of parameters of the light passing hole 123 of the 2nd example according to the 1st embodiment in FIG. 1J. In FIGS. 1K and 1L, when a distance between the valley point 1231b and the optical axis X is D, a distance between the first crest point 1232b and the optical axis X is d1, and a distance between the second crest point 1233b and the optical axis X is d2, an included angle θ is formed between a line joining the valley point 1231b and the first crest point 1232b and a line joining the valley point 1231b and the second crest point 1233b, an included angle θ1 is formed between the line joining the valley point 1231b and the first crest point 1232b and a line P parallel to the optical axis X, and an included angle θ2 is formed between the line joining the valley point 1231b and the second crest point 1233b and the line P parallel to the optical axis X, and an elastic drafting ratio defined by the cross section of the light passing hole 123 is EDR (EDR=[(D−d1)/D]×100%), the aforementioned parameters can be satisfied in the following Table 2.

TABLE 2

| the 2nd example of the 1st embodiment | | | |
|---|---|---|---|
| D (mm) | 4.92 | θ (degree) | 66.6 |
| d1 (mm) | 4.1 | θ1 (degree) | 56.7 |
| d2 (mm) | 4.1 | θ2 (degree) | 56.7 |
| d1/D | 0.833 | EDR (%) | 16.7 |
| d2/D | 0.833 | | |

Figure 1M:
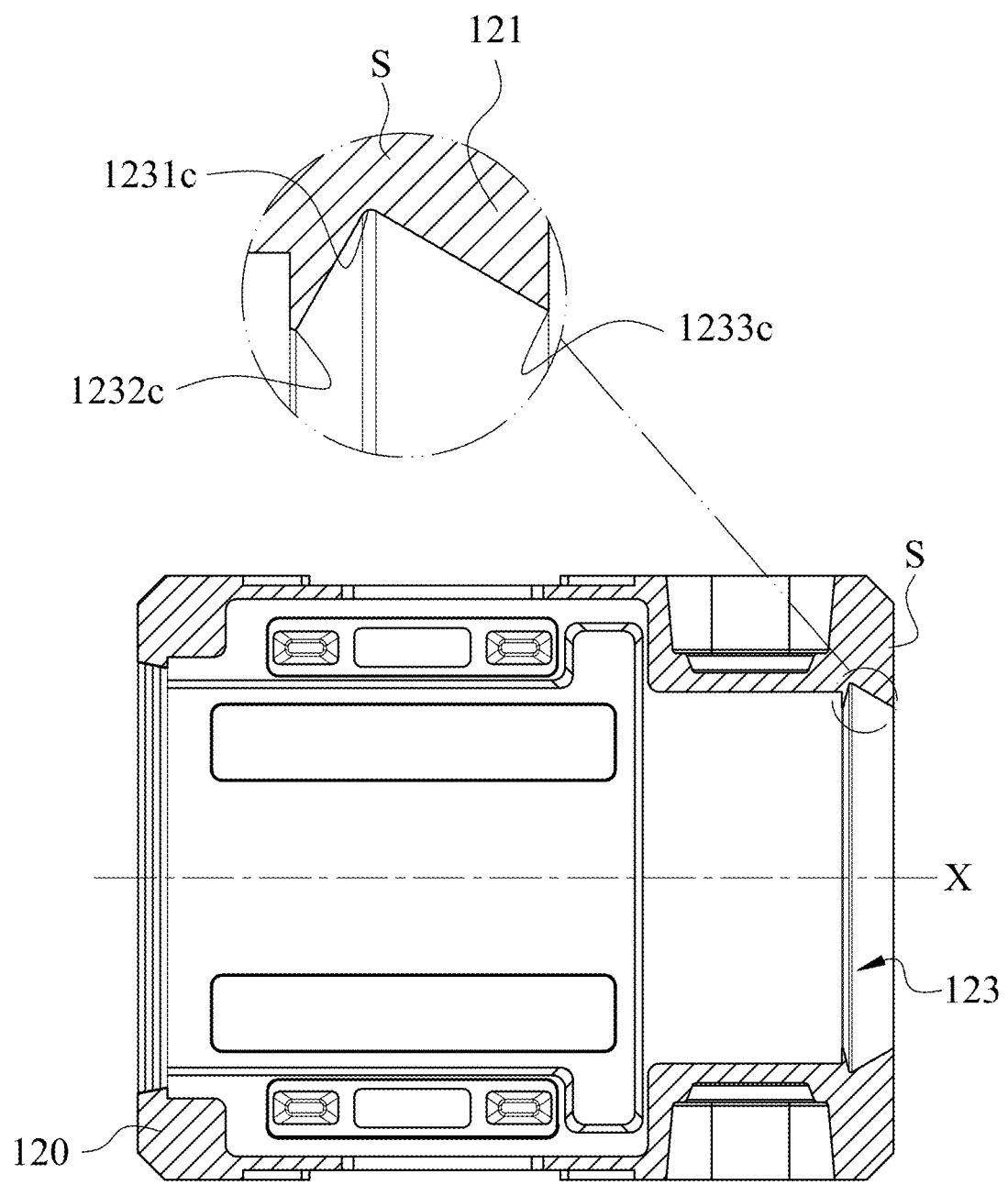
FIG. 1M shows a cross-sectional view of the first molded structure and the second molded structure of the 3rd example along the cutting line 1G-1G according to the 1st embodiment in FIG. 1F.

FIG. 1M shows a cross-sectional view of the first molded structure 120 and the second molded structure 130 of the 3rd example along the cutting line 1G-1G according to the 1st embodiment in FIG. 1F. In FIG. 1M, in the 3rd example of the 1st embodiment, a cross section of the light passing hole 123 which passes through the optical axis X includes a valley point 1231c, a first crest point 1232c and a second crest point 1233c. Specifically, the aforementioned cross section is an interface of coupling between the first molded structure 120 and the second molded structure 130, but the present disclosure is not limited thereto. The valley point 1231c is a farthest point away from the optical axis X in the cross section. The first crest point 1232c is a closest point to the optical axis X in the cross section. The second crest point 1233c is a closest point to the optical axis X in another side relative to the first crest point 1232c based on a perpendicular line Y (shown in FIG. 1N) from the valley point 1231b to the optical axis X.

Figure 1N:
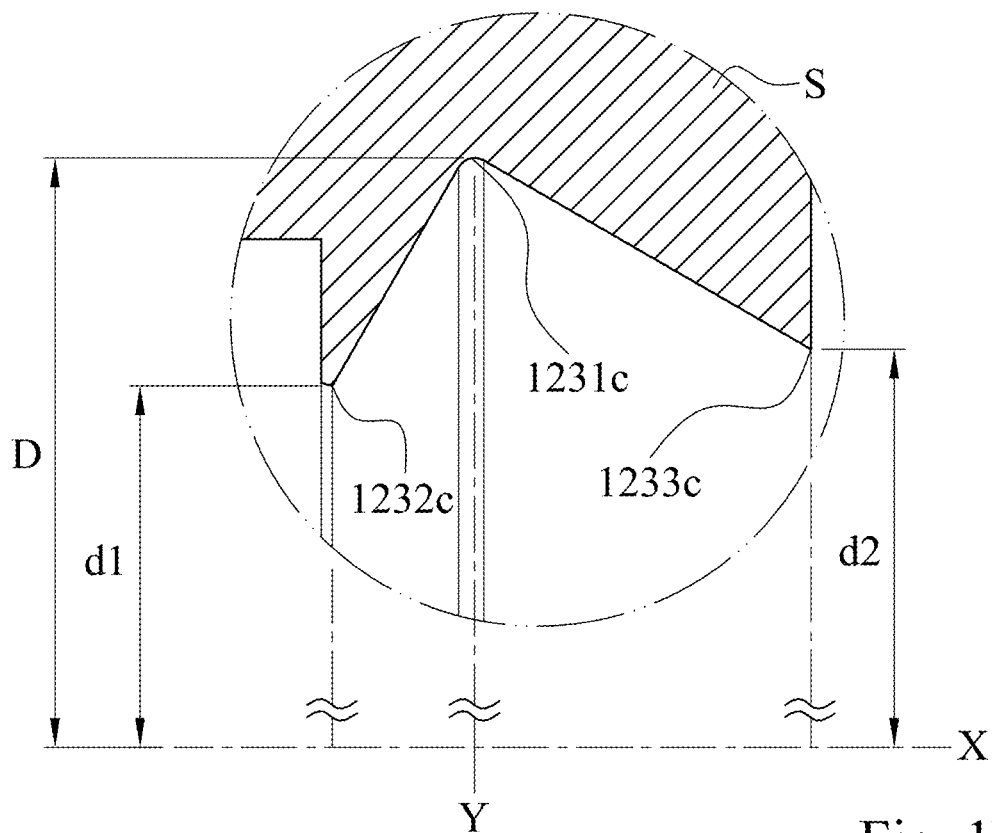
FIG. 1N shows a schematic view of parameters of the light passing hole of the 3rd example according to the 1st embodiment in FIG. 1M.
Figure 1O:
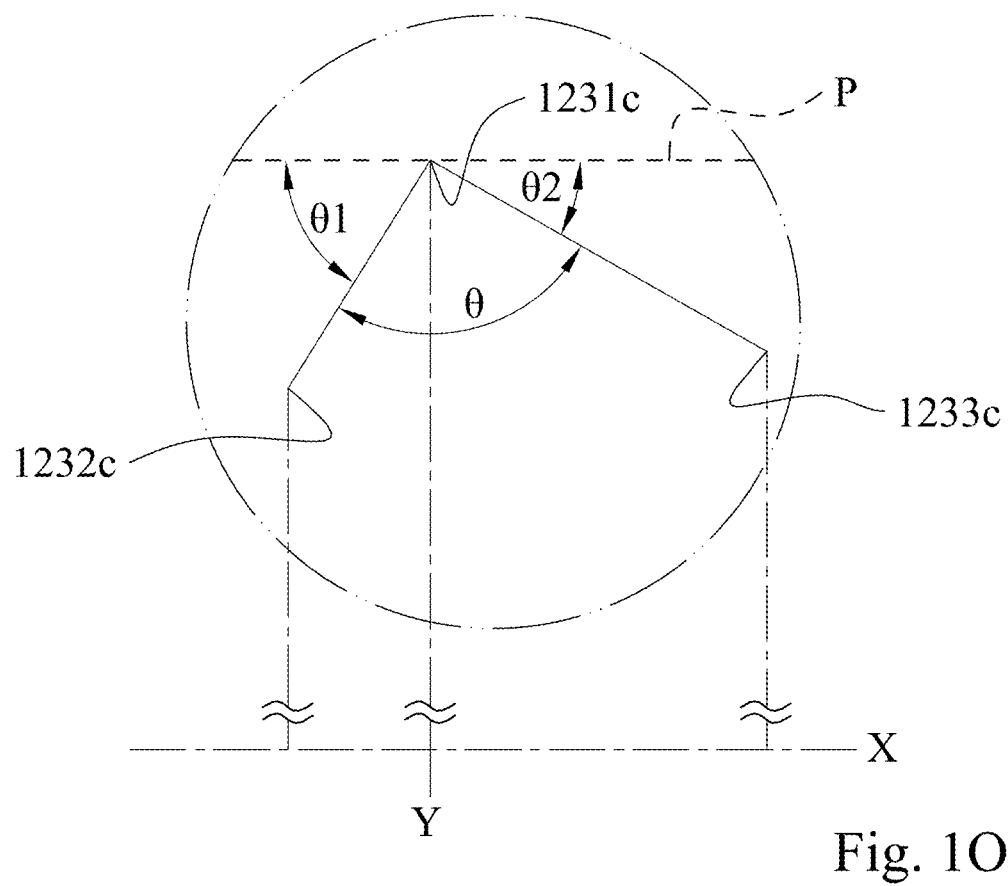
FIG. 1O shows another schematic view of parameters of the light passing hole of the 3rd example according to the 1st embodiment in FIG. 1M.

FIG. 1N shows a schematic view of parameters of the light passing hole 123 of the 3rd example according to the 1st embodiment in FIG. 1M. FIG. 1O shows another schematic view of parameters of the light passing hole 123 of the 3rd example according to the 1st embodiment in FIG. 1M. In FIGS. 1N and 1O, when a distance between the valley point 1231c and the optical axis X is D, a distance between the first crest point 1232c and the optical axis X is d1, and a distance between the second crest point 1233c and the optical axis X is d2, an included angle θ is formed between a line joining the valley point 1231c and the first crest point 1232c and a line joining the valley point 1231c and the second crest point 1233c, an included angle θ1 is formed between the line joining the valley point 1231c and the first crest point 1232c and a line P parallel to the optical axis X, and an included angle θ2 is formed between the line joining the valley point 1231c and the second crest point 1233c and the line P parallel to the optical axis X, and an elastic drafting ratio defined by the cross section of the light passing hole 123 is EDR (EDR=[(D−d1)/D]×100%), the aforementioned parameters can be satisfied in the following table 3.

TABLE 3

| the 3rd example of the 1 embodiment | | | |
|---|---|---|---|
| D (mm) | 5.02 | θ (degree) | 92.3 |
| d1 (mm) | 4.4 | θ1 (degree) | 58.1 |
| d2 (mm) | 4.5 | θ2 (degree) | 29.6 |
| d1/D | 0.876 | EDR (%) | 12.4 |
| d2/D | 0.896 | | |

2nd Embodiment

Figure 2A:
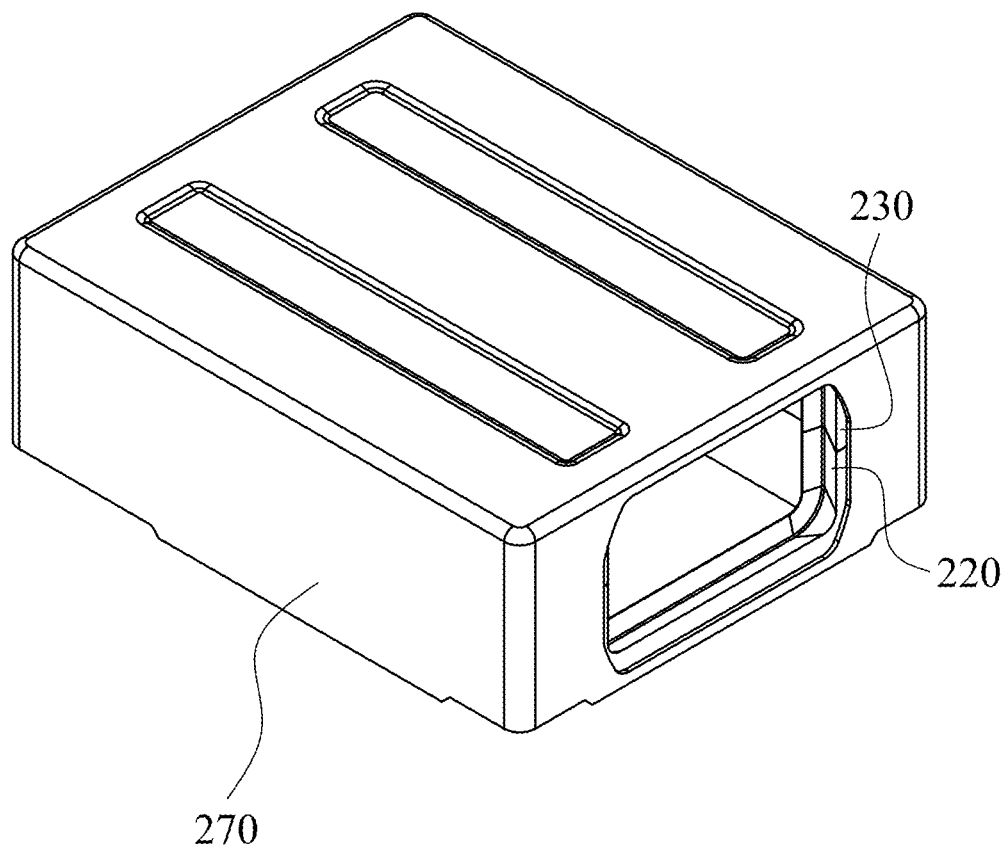
FIG. 2A shows a three-dimensional schematic view of an imaging lens assembly driving module according to the 2nd embodiment of the present disclosure.
Figure 2B:
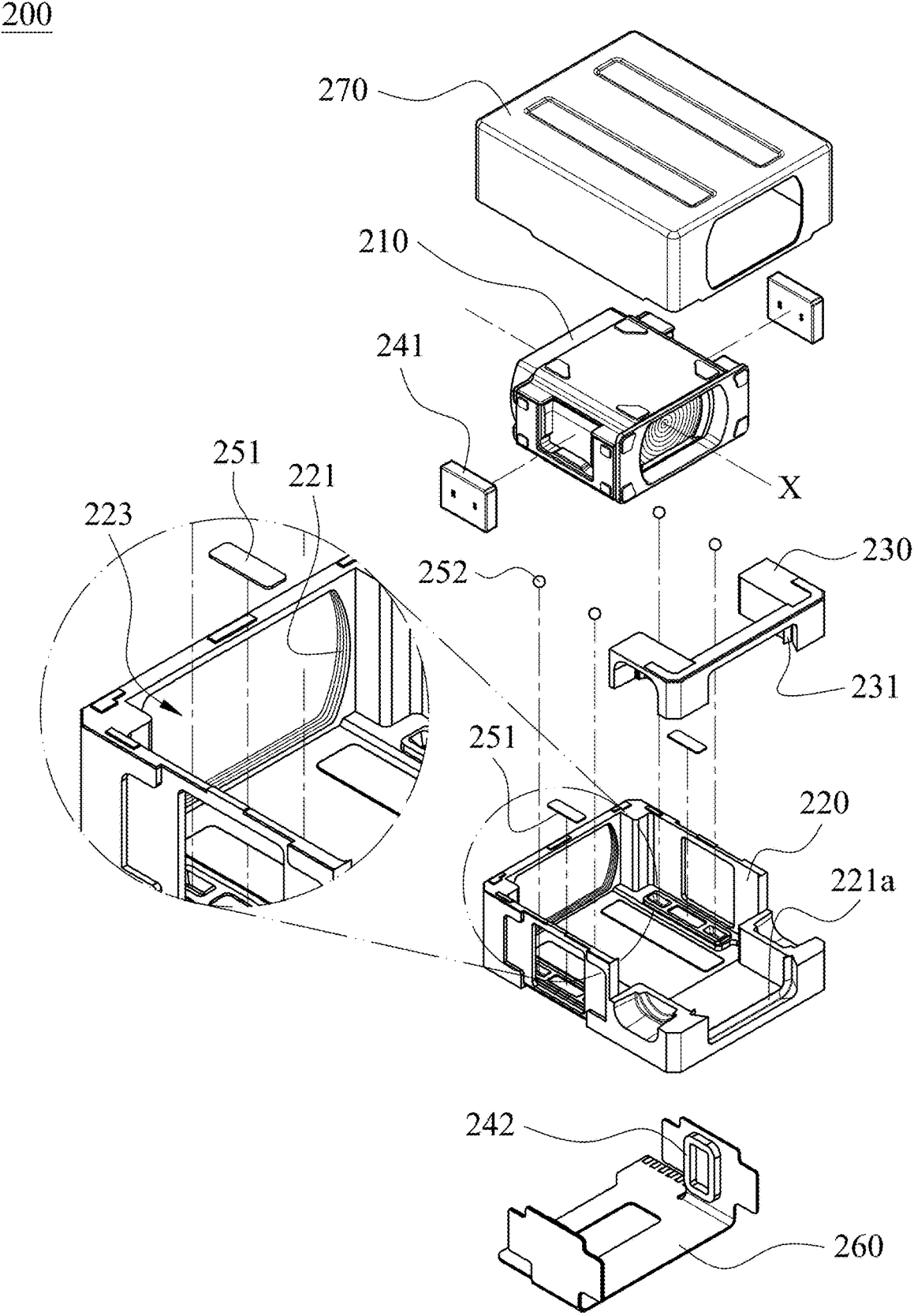
FIG. 2B shows an exploded view of the imaging lens assembly driving module according to the 2nd embodiment in FIG. 2A.
Figure 2C:
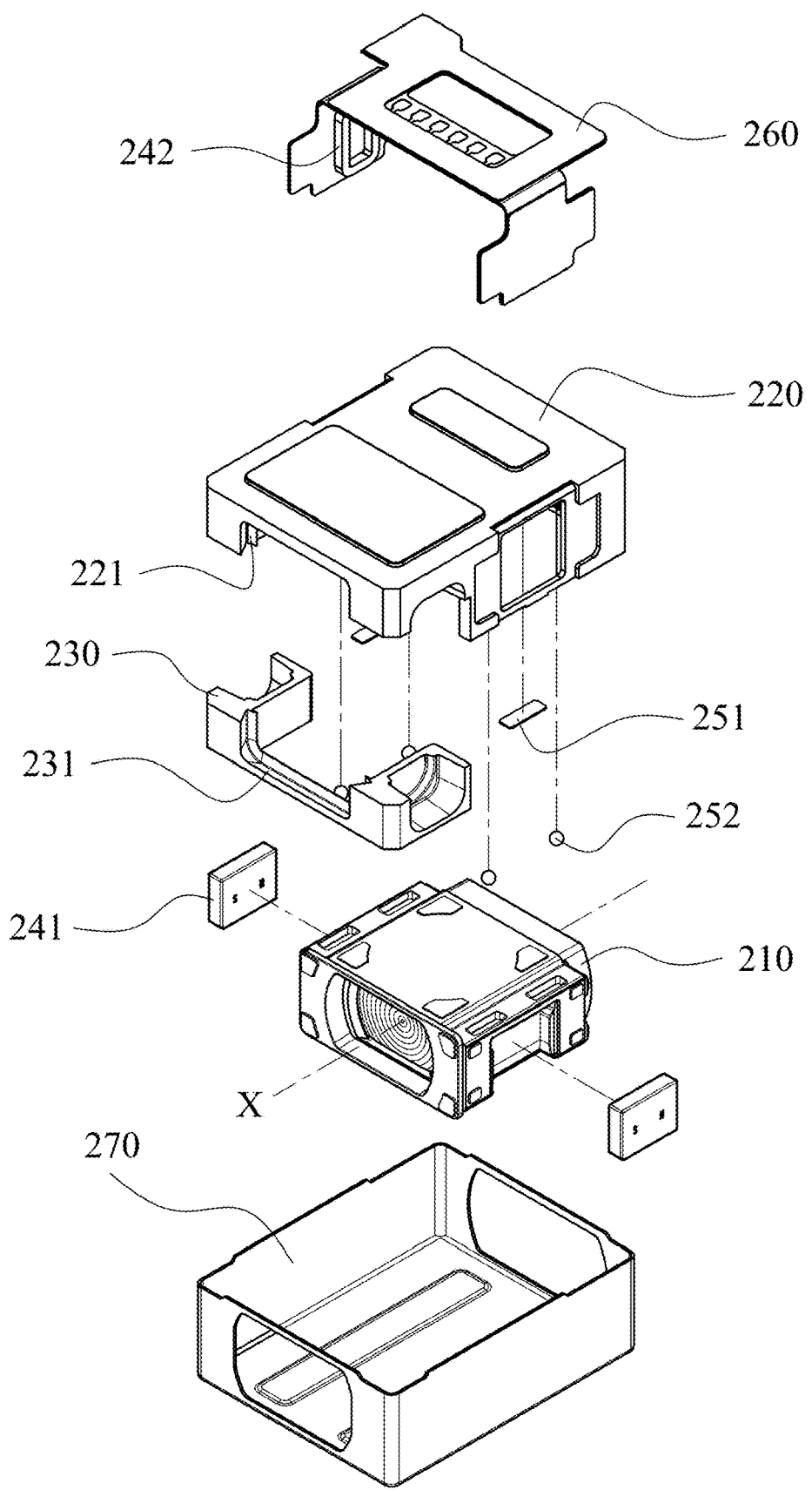
FIG. 2C shows another perspective of the exploded view of the imaging lens assembly driving module according to the 2nd embodiment in FIG. 2A.

FIG. 2A shows a three-dimensional schematic view of an imaging lens assembly driving module 200 according to the 2nd embodiment of the present disclosure. FIG. 2B shows an exploded view of the imaging lens assembly driving module 200 according to the 2nd embodiment in FIG. 2A. FIG. 2C shows another perspective of the exploded view of the imaging lens assembly driving module 200 according to the 2nd embodiment in FIG. 2A. In FIGS. 2A-2C, an imaging lens assembly driving module 200 includes a lens carrier 210, a first molded structure 220, a second molded structure 230, a driving mechanism (its reference numeral is omitted), a mechanical member (its reference numeral is omitted), a flexible circuit board 260 and a top cover 270.

The lens carrier 210 defines an optical axis X. The first molded structure 220 is disposed correspondingly to the lens carrier 210. The second molded structure 230 is coupled to the first molded structure 220 for forming an inner space 222 (shown in FIG. 2G), and the lens carrier 210 can be accommodated in the inner space 222. The driving mechanism is for driving the lens carrier 210 to move along the optical axis X. The mechanical member is for connecting the lens carrier 210 and the first molded structure 220 to each other. The flexible circuit board 260 is covered in the top cover 270, and the lens carrier 210, the first molded structure 220, the second molded structure 230, the driving mechanism and the mechanical member are accommodated in the top cover 270.

Specifically, the driving mechanism can include at least one driving magnet 241 and at least one driving coil 242. In the 2nd embodiment, a number of each of the driving magnet 241 and the driving coil 242 is two. The two driving magnets 241 are disposed on two outer sides of the lens carrier 210, respectively. The two driving coils 242 are disposed on two inner sides of the flexible circuit board 260, respectively. The two driving magnets 241 are corresponding to the two driving coils 242, respectively, but the present disclosure is not limited thereto. Hence, via the relative corresponding between the driving magnets 241 and the driving coils 242, the lens carrier 210 can be moved for focusing.

In FIGS. 2B and 2C, the mechanical member can include at least one ferromagnetic element 251, and the ferromagnetic element 251 is corresponding to the driving mechanism. In the 2nd embodiment, a number of the ferromagnetic element 251 is two, and the two ferromagnetic elements 251 are disposed in the first molded structure 220 and corresponding to the two driving magnets 241, respectively, but the present disclosure is not limited thereto. Since the driving magnets 241 are disposed on the lens carrier 210 via the configuration of the ferromagnetic elements 251, the mechanical member can connect the lens carrier 210 and the first molded structure 220 by magnetic force so as to improve the stability of focusing during the operation of the imaging lens assembly driving module 200. In addition, the mechanical member can further include a plurality of rolling balls 252, and the rolling balls 252 are disposed between the lens carrier 210 and the first molded structure 220. Specifically, in the 2nd embodiment, a number of the rolling balls 252 is four, but the present disclosure is not limited thereto. The configuration of the rolling balls 252 can further stabilize the movement of the lens carrier 210 along the optical axis X so as to improve the stability of focusing.

Figure 2D:
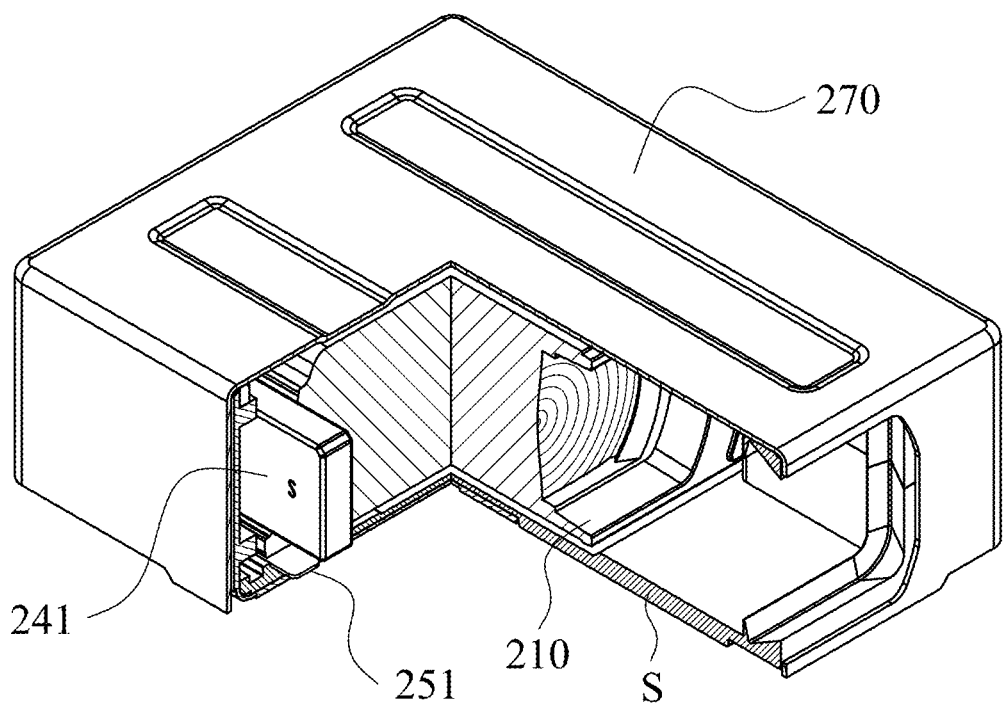
FIG. 2D shows a partial cross-sectional view of the imaging lens assembly driving module according to the 2nd embodiment in FIG. 2A.
Figure 2E:
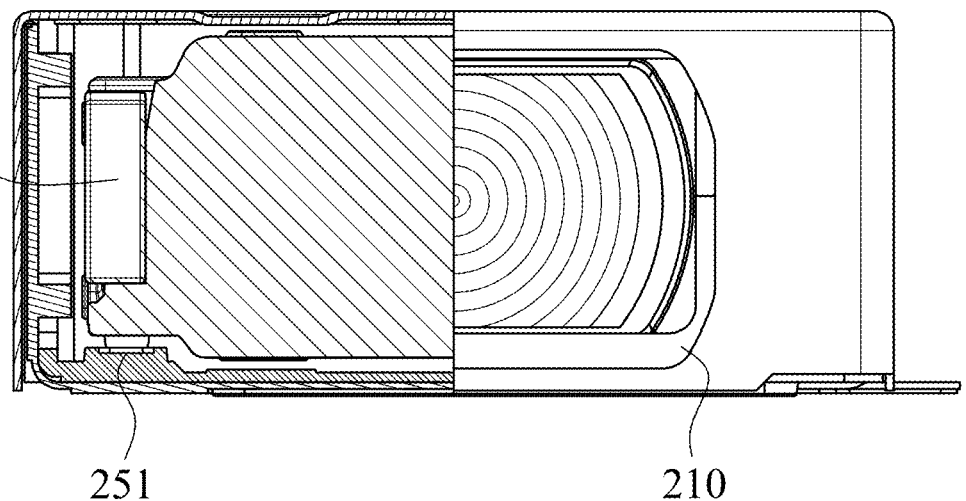
FIG. 2E shows a partial cross-sectional front view of the imaging lens assembly driving module according to the 2nd embodiment in FIG. 2A.

FIG. 2D shows a partial cross-sectional view of the imaging lens assembly driving module 200 according to the 2nd embodiment in FIG. 2A. FIG. 2E shows a partial cross-sectional front view of the imaging lens assembly driving module 200 according to the 2nd embodiment in FIG. 2A. In FIGS. 2D and 2E, the ferromagnetic elements 251 are disposed correspondingly to the driving magnets 241 of the driving mechanism. In detail, a part of each of two outer sides of the lens carrier 210 is clamped between each of the two ferromagnetic elements 251 and each of the two driving magnets 241, respectively. Hence, stability of movement of the lens carrier 210 can be improved.

Figure 2F:
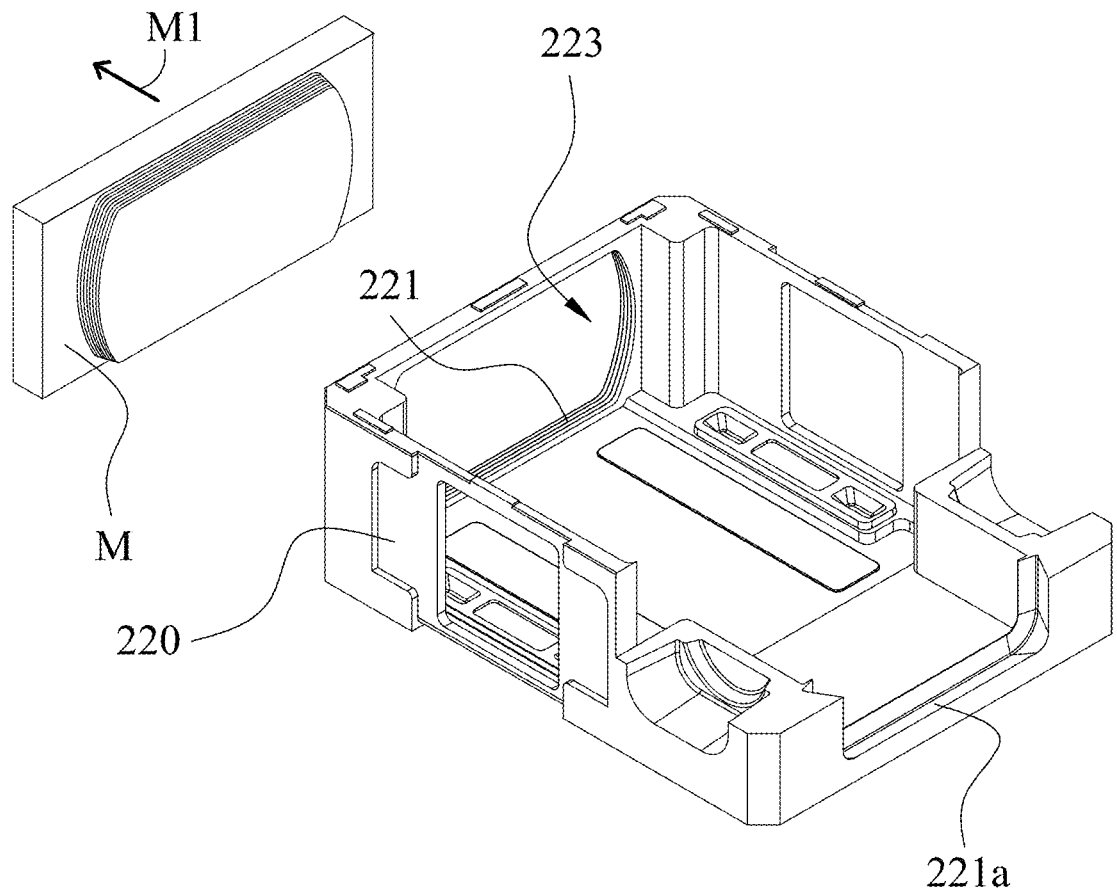
FIG. 2F shows a schematic view of the first molded structure and a mold according to the 2nd embodiment in FIG. 2A.

FIG. 2F shows a schematic view of the first molded structure 220 and a mold M according to the 2nd embodiment in FIG. 2A. In the imaging lens assembly driving module of the present disclosure, a light passing hole can be formed by at least one of the first molded structure and the second molded structure and include a light blocking structure, and the light passing hole is corresponding to the light blocking structure. Specifically, in the 2nd embodiment, a light passing hole 223 can be formed by the first molded structure 220 and includes a light blocking structure 221, and the light passing hole 223 is corresponding to the light blocking structure 221. In processing, the light passing hole 223 can be formed by the first molded structure 220 via elastic demolding from a mold M, and the mold M can be removed from the first molded structure 220 along a removing direction M1. Moreover, the light blocking structure 221 corresponding to the light passing hole 223 can be the light blocking structure 221 with concave-convex shape, but the present disclosure is not limited thereto. During the process of molding, the more sophisticated molding products can be achieved by design of molding because of elasticity of plastic material. Via the light blocking structure with concave-convex shape, the non-imaging light can be reflected so as to decrease the intensity of the non-imaging light.

Figure 2G:
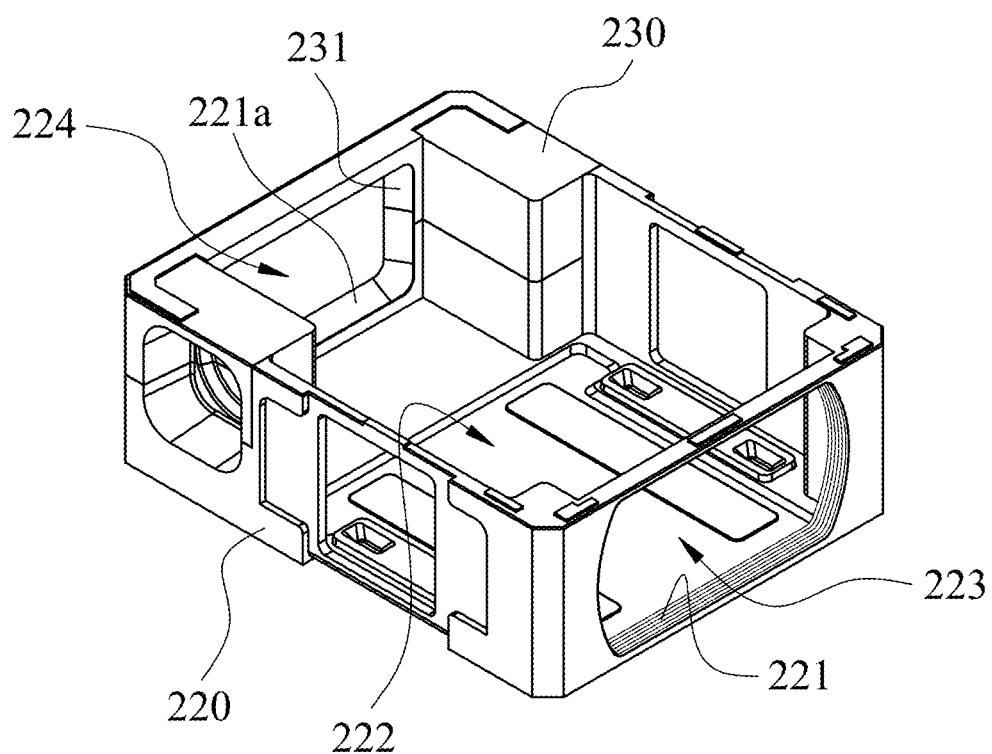
FIG. 2G shows a schematic view of a coupling between the first molded structure and the second molded structure according to the 2nd embodiment in FIG. 2A.
Figure 2H:
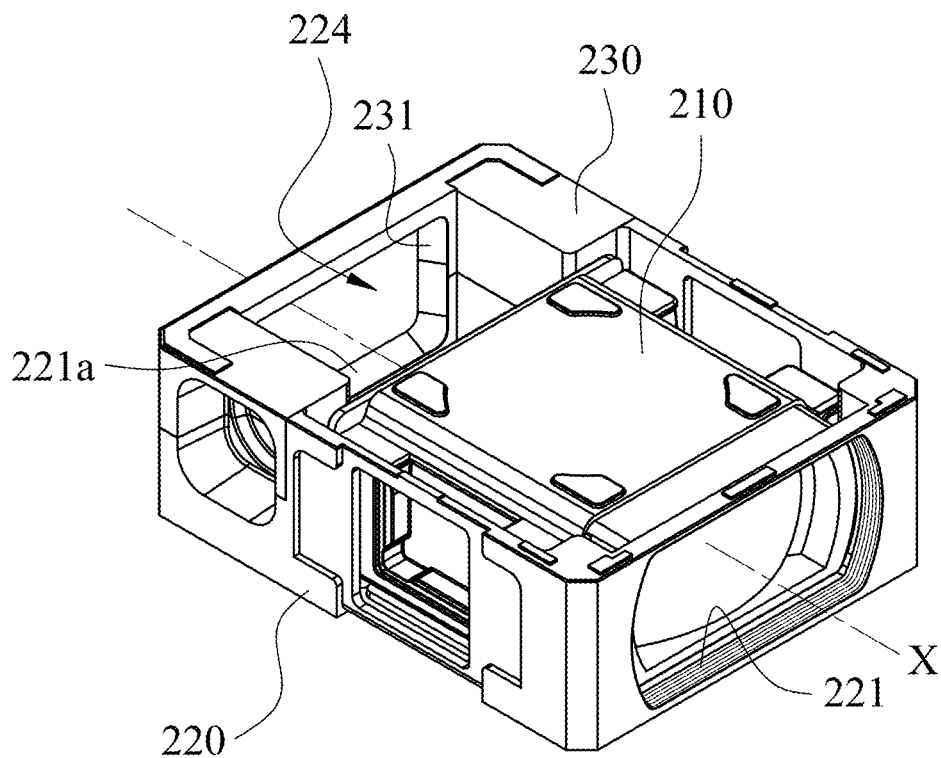
FIG. 2H shows a schematic view of the combination of the lens carrier, the first molded structure and the second molded structure according to the 2nd embodiment in FIG. 2A

FIG. 2G shows a schematic view of a coupling between the first molded structure 220 and the second molded structure 230 according to the 2nd embodiment in FIG. 2A. FIG. 2H shows a schematic view of the combination of the lens carrier 210, the first molded structure 220 and the second molded structure 230 according to the 2nd embodiment in FIG. 2A. In FIGS. 2B, 2C, 2F, 2G and 2H, the first molded structure 220 can include a first light blocking structure 221a, and the second molded structure 230 can include a second light blocking structure 231. The first molded structure 220 is coupled to the second molded structure 230 so that the first light blocking structure 221a and the second light blocking structure 231 are disposed correspondingly to each other for forming a light passing hole 224. In detail, the first molded structure 220 can be coupled to the second molded structure 230 by point glue adhesion or design of plastic element engagement, but the present disclosure is not limited thereto. Specifically, a structure of the light passing hole 224 can be the same as the structure of the light passing hole 123 of the 1st embodiment, and it will not be described again herein. The optical axis X can pass through the light passing holes 223, 224 so that the lens carrier 210 and the light passing holes 223, 224 are configured coaxially. Therefore, coaxiality between the lens carrier 210 and the light passing holes 223, 224 can be maintained so as to prevent the light passing holes 223, 224 from blocking the light excluding non-imaging light. Hence, the imaging quality can be improved. Moreover, each of the light passing holes 223, 224 can surround the optical axis X and be in shape of a closed ring. Hence, the continuity of the disposition of the first light blocking structure 221a and the second light blocking structure 231 corresponding to each other can be ensured so as to maintain the higher efficiency of light blocking.

Figure 2I:
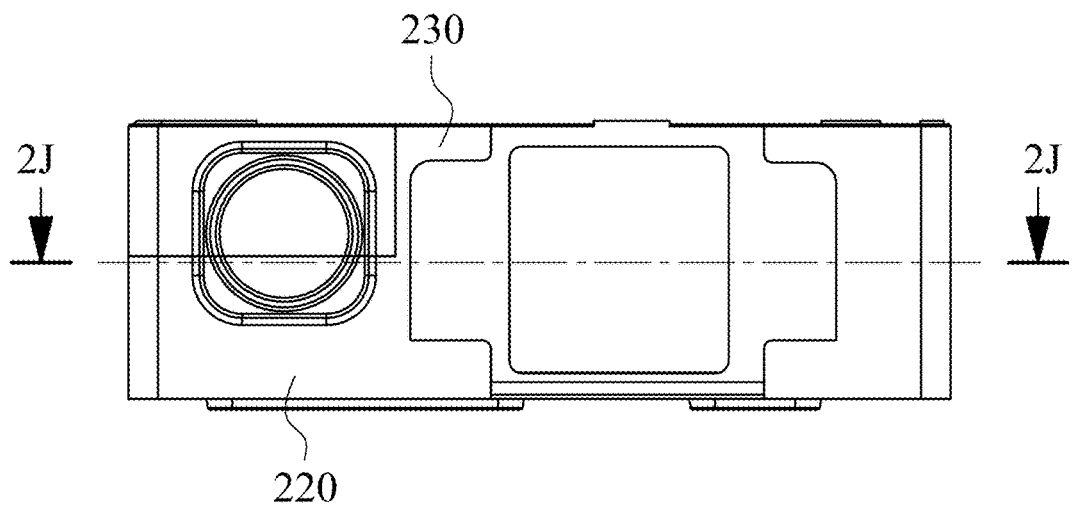
FIG. 2I shows a side view of the coupling between the first molded structure and the second molded structure according to the 2nd embodiment in FIG. 2A.
Figure 2J:
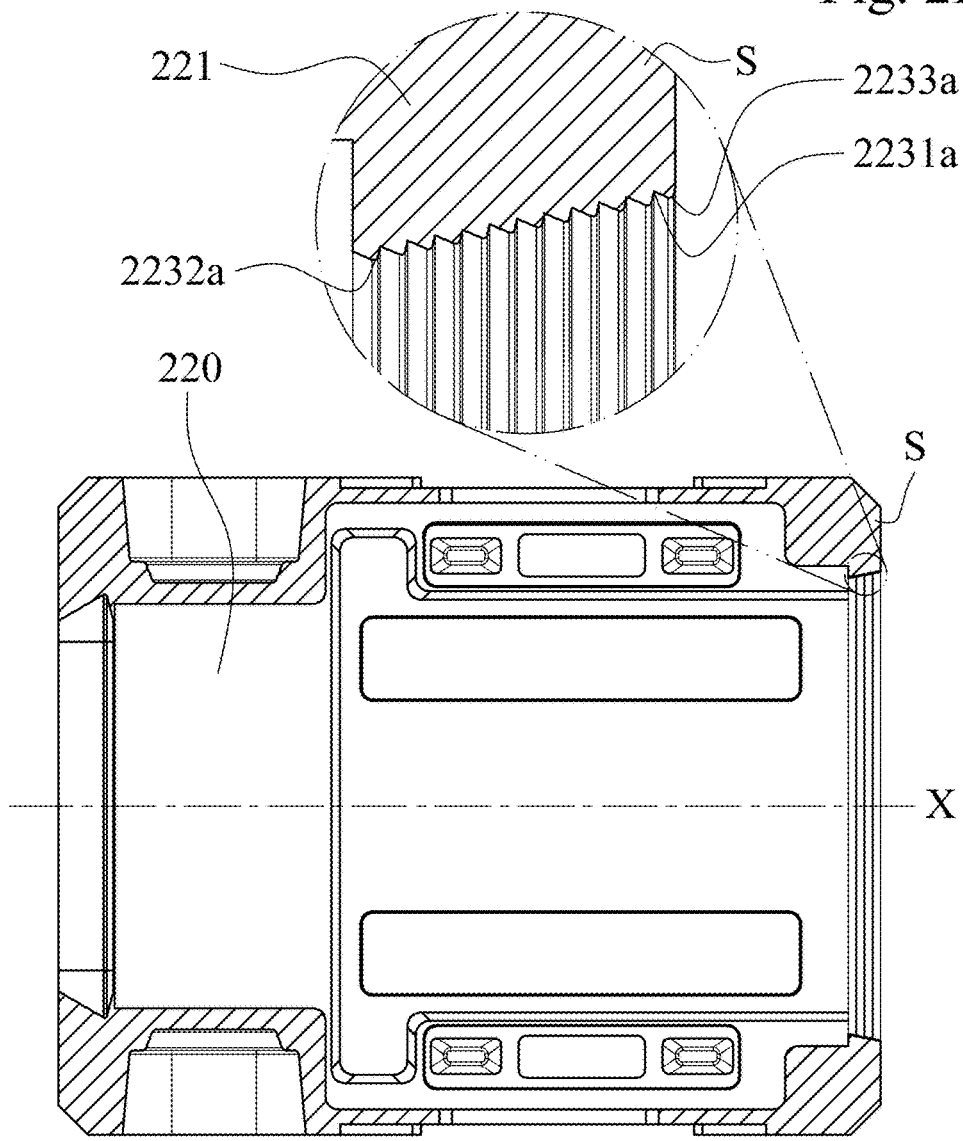
FIG. 2J shows a cross-sectional view of the first molded structure and the second molded structure along a cutting line 2J-2J according to the 2nd embodiment in FIG. 2I.

FIG. 2I shows a side view of the coupling between the first molded structure 220 and the second molded structure 230 according to the 2nd embodiment in FIG. 2A. FIG. 2J shows a cross-sectional view of the first molded structure 220 and the second molded structure 230 along a cutting line 2J-2J according to the 2nd embodiment in FIG. 2I. It has to be specified that the light passing hole 223 formed by the first light blocking structure 221a and the second light blocking structure 231 in the 2nd embodiment can provide three different structures of the light passing hole 223 of the 1st example, the 2nd example and the 3rd example according to different requirements of optical design. To be simplified, the light passing hole 223 of the 1st example, the 2nd example and the 3rd example according to the 2nd embodiment are labeled as the same, and the other elements and the configuration thereof of the 1st example, the 2nd example and the 3rd example according to the 2nd embodiment are the same, and it will not be described herein.

In FIG. 2J, in the 1st example of the 2nd embodiment, a cross section of the light passing hole 223 which passes through the optical axis X includes a valley point 2231a, a first crest point 2232a and a second crest point 2233a. Specifically, the aforementioned cross section is the cross section of the first molded structure 220 along the cutting line 2J-2J, but the present disclosure is not limited thereto. The valley point 2231a is a farthest point away from the optical axis X in the cross section. The first crest point 2232a is a closest point to the optical axis X in the cross section. The second crest point 2233a is a closest point to the optical axis X in another side relative to the first crest point 2232a based on a perpendicular line Y (shown in FIG. 2K) from the valley point 2231a to the optical axis X. Specifically, the valley point 2231a, the first crest point 2232a and the second crest point 2233a are the points in the cross section of the light blocking structure 221 in FIG. 2J.

Figure 2K:
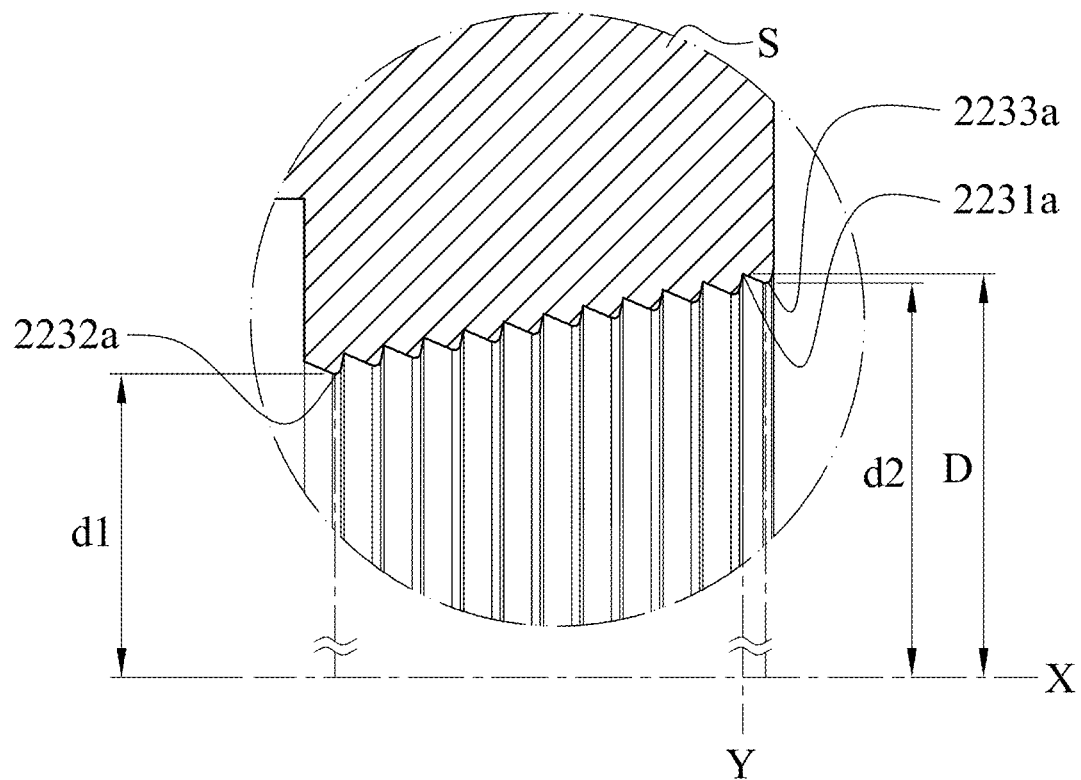
FIG. 2K shows a schematic view of parameters of the light passing hole of the 1st example according to the 2nd embodiment in FIG. 2J.
Figure 2L:
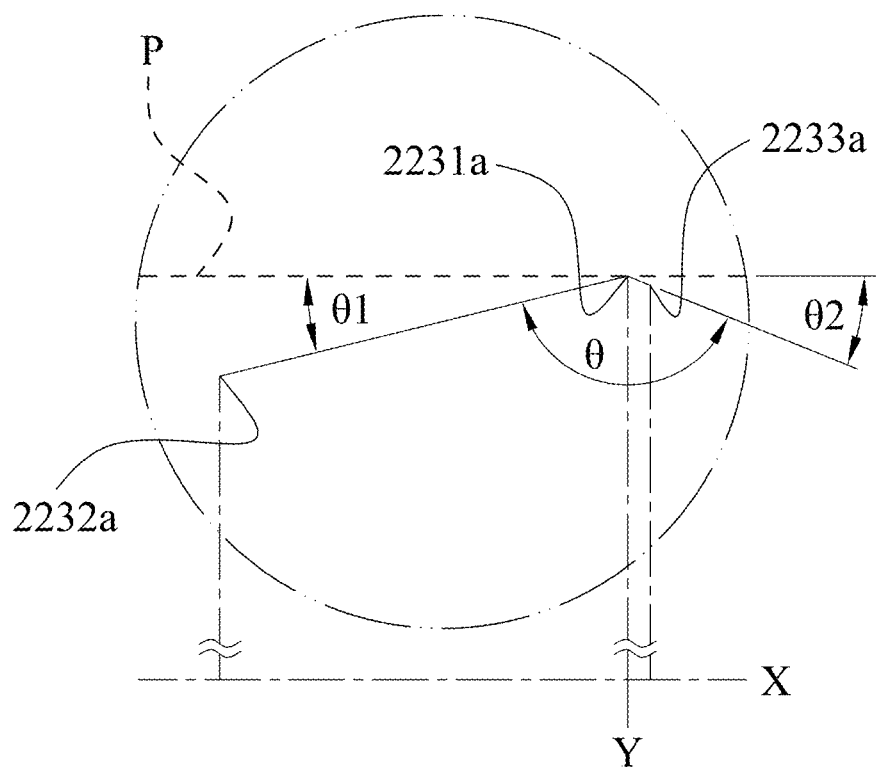
FIG. 2L shows another schematic view of parameters of the light passing hole of the 1st example according to the 2nd embodiment in FIG. 2J.

FIG. 2K shows a schematic view of parameters of the light passing hole 223 of the 1st example according to the 2nd embodiment in FIG. 2J. FIG. 2L shows another schematic view of parameters of the light passing hole 223 of the 1st example according to the 2nd embodiment in FIG. 2J. In FIGS. 2K and 2L, when a distance between the valley point 2231a and the optical axis X is D, a distance between the first crest point 2232a and the optical axis X is d1, and a distance between the second crest point 2233a and the optical axis X is d2, an included angle θ is formed between a line joining the valley point 2231a and the first crest point 2232a and a line joining the valley point 2231a and the second crest point 2233a, an included angle θ1 is formed between the line joining the valley point 2231a and the first crest point 2232a and a line P parallel to the optical axis X, and an included angle θ2 is formed between the line joining the valley point 2231a and the second crest point 2233a and the line P parallel to the optical axis X, and an elastic drafting ratio defined by the cross section of the light passing hole 223 is EDR (EDR=[(D−d1)/D]×100%), the aforementioned parameters can be satisfied in the following Table 4.

TABLE 4

| the 1st example of the 2nd embodiment | | | |
|---|---|---|---|
| D (mm) | 5.58 | θ (degree) | 144.2 |
| d1 (mm) | 5.41 | θ1 (degree) | 13.8 |
| d2 (mm) | 5.56 | θ2 (degree) | 22 |
| d1/D | 0.970 | EDR (%) | 3.0 |
| d2/D | 0.996 | | |

Figure 2M:
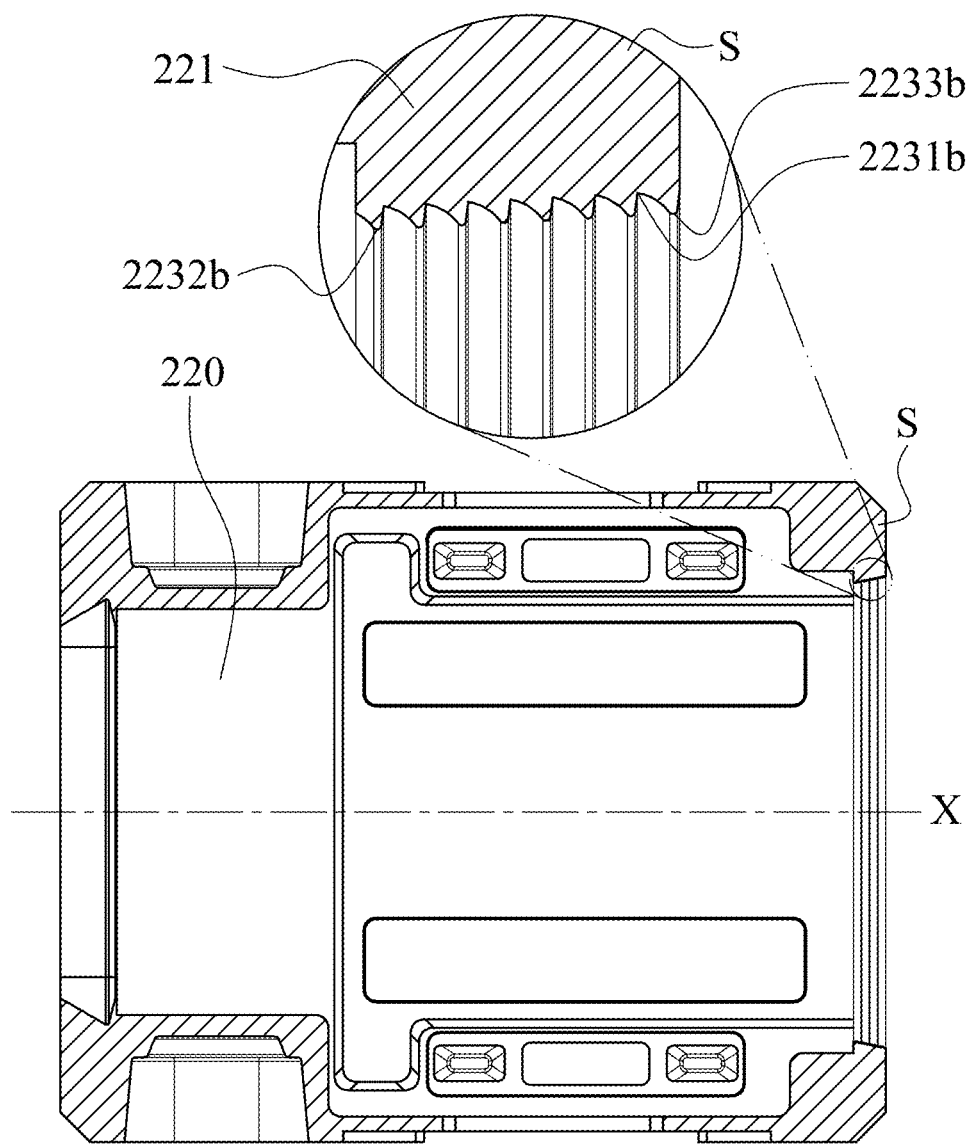
FIG. 2M shows a cross-sectional view of the first molded structure and the second molded structure of the 2nd example along the cutting line 2J-2J according to the 2nd embodiment in FIG. 2I.

FIG. 2M shows a cross-sectional view of the first molded structure 220 and the second molded structure 230 of the 2nd example along the cutting line 2J-2J according to the 2nd embodiment in FIG. 2I. In FIG. 2M, in the 2nd example of the 2nd embodiment, a cross section of the light passing hole 223 which passes through the optical axis X includes a valley point 2231b, a first crest point 2232b and a second crest point 2233b. The valley point 2231b is a farthest point away from the optical axis X in the cross section. The first crest point 2232b is a closest point to the optical axis X in the cross section. The second crest point 2233b is a closest point to the optical axis X in another side relative to the first crest point 2232b based on a perpendicular line Y (shown in FIG. 2N) from the valley point 2231b to the optical axis X.

Figure 2N:
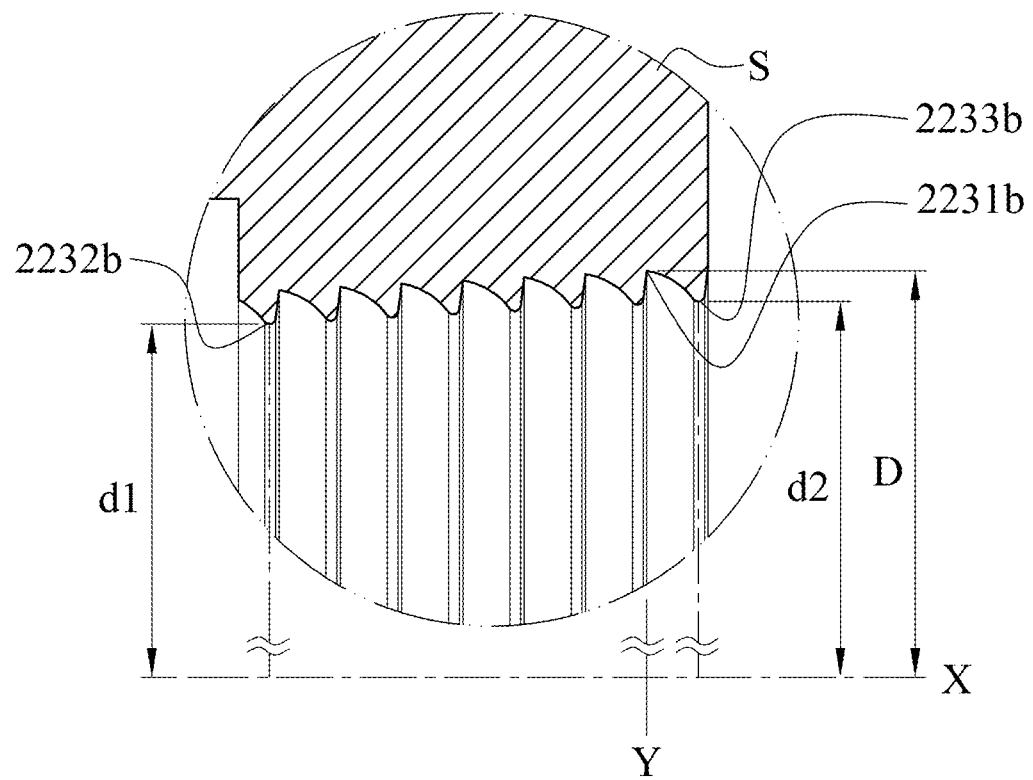
FIG. 2N shows a schematic view of parameters of the light passing hole of the 2nd example according to the 2nd embodiment in FIG. 2M.
Figure 2O:
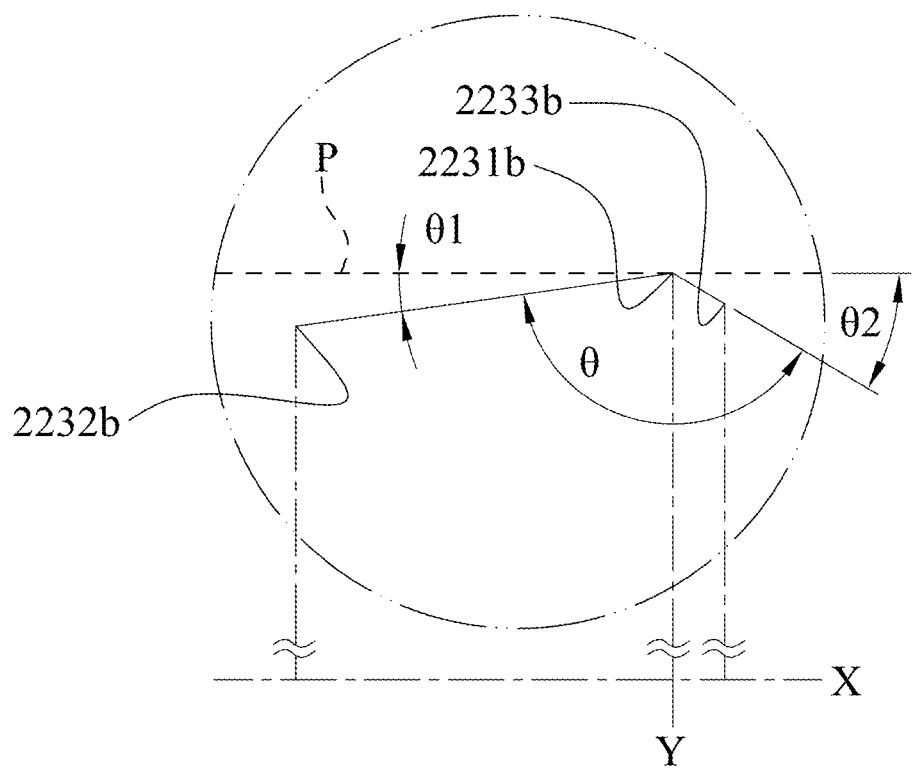
FIG. 2O shows another schematic view of parameters of the light passing hole of the 2nd example according to the 2nd embodiment in FIG. 2M.

FIG. 2N shows a schematic view of parameters of the light passing hole 223 of the 2nd example according to the 2nd embodiment in FIG. 2M. FIG. 2O shows another schematic view of parameters of the light passing hole 223 of the 2nd example according to the 2nd embodiment in FIG. 2M. In FIGS. 2N and 2O, when a distance between the valley point 2231b and the optical axis X is D, a distance between the first crest point 2232b and the optical axis X is d1, and a distance between the second crest point 2233b and the optical axis X is d2, an included angle θ is formed between a line joining the valley point 2231b and the first crest point 2232b and a line joining the valley point 2231b and the second crest point 2233b, an included angle θ1 is formed between the line joining the valley point 2231b and the first crest point 2232b and a line P parallel to the optical axis X, and an included angle θ2 is formed between the line joining the valley point 2231b and the second crest point 2233b and the line P parallel to the optical axis X, and an elastic drafting ratio defined by the cross section of the light passing hole 223 is EDR (EDR=[(D−d1)/D]×100%), the aforementioned parameters can be satisfied in the following Table 5.

TABLE 5 the 2nd example of the 2nd embodiment

| D (mm) | 5.58 | θ (degree) | 141.3 |
|---|---|---|---|
| d1 (mm) | 5.5 | θ1 (degree) | 8 |
| d2 (mm) | 5.53 | θ2 (degree) | 30.7 |
| d1/D | 0.986 | EDR (%) | 1.4 |
| d2/D | 0.991 | | |

Figure 2P:
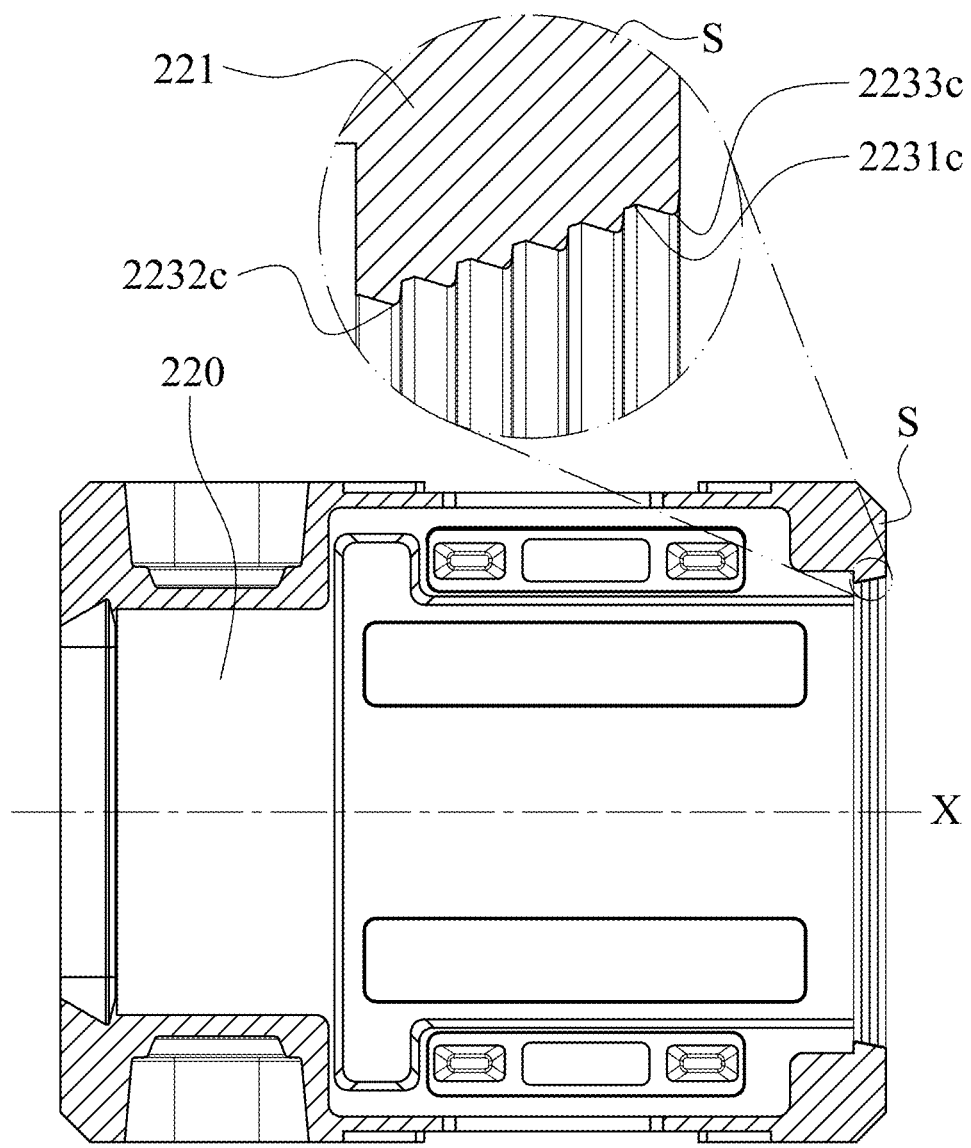
FIG. 2P shows a cross-sectional view of the first molded structure and the second molded structure of the 3rd example along the cutting line 2J-2J according to the 2nd embodiment in FIG. 2I.

FIG. 2P shows a cross-sectional view of the first molded structure 220 and the second molded structure 230 of the 3rd example along the cutting line 2J-2J according to the 2nd embodiment in FIG. 2I. In FIG. 2P, in the 3rd example of the 2nd embodiment, a cross section of the light passing hole 223 which passes through the optical axis X includes a valley point 2231c, a first crest point 2232c and a second crest point 2233c. The valley point 2231c is a farthest point away from the optical axis X in the cross section. The first crest point 2232c is a closest point to the optical axis X in the cross section. The second crest point 2233c is a closest point to the optical axis X in another side relative to the first crest point 2232c based on a perpendicular line Y (shown in FIG. 2Q) from the valley point 2231c to the optical axis X.

Figure 2Q:
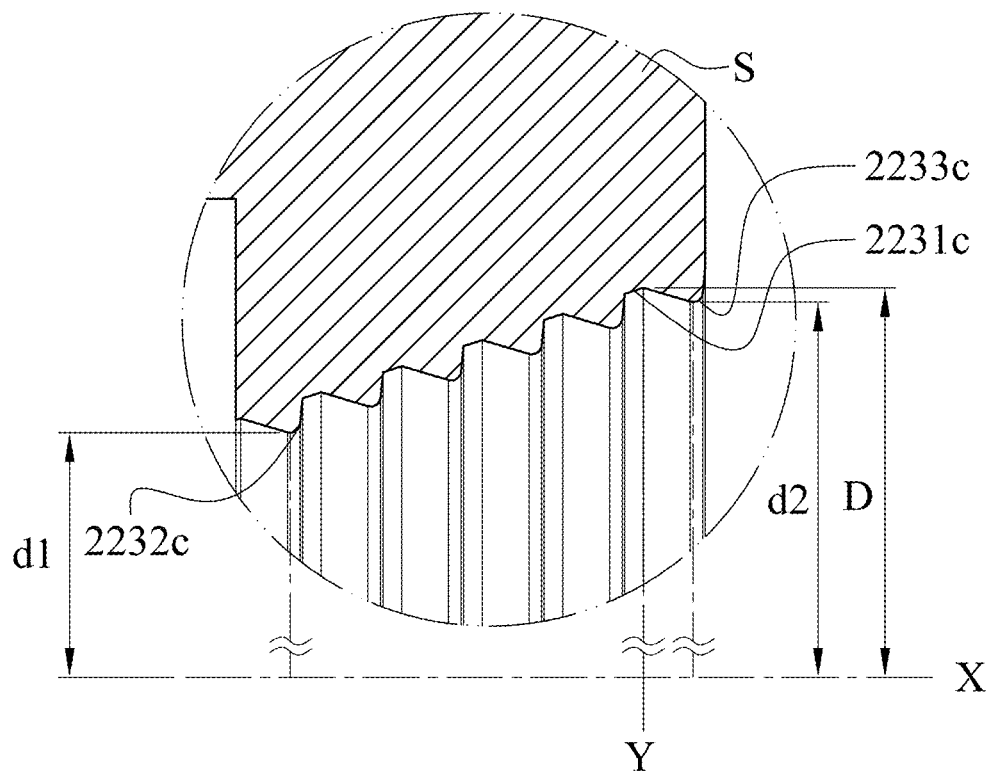
FIG. 2Q shows a schematic view of parameters of the light passing hole of the 3rd example according to the 2nd embodiment in FIG. 2P.
Figure 2R:
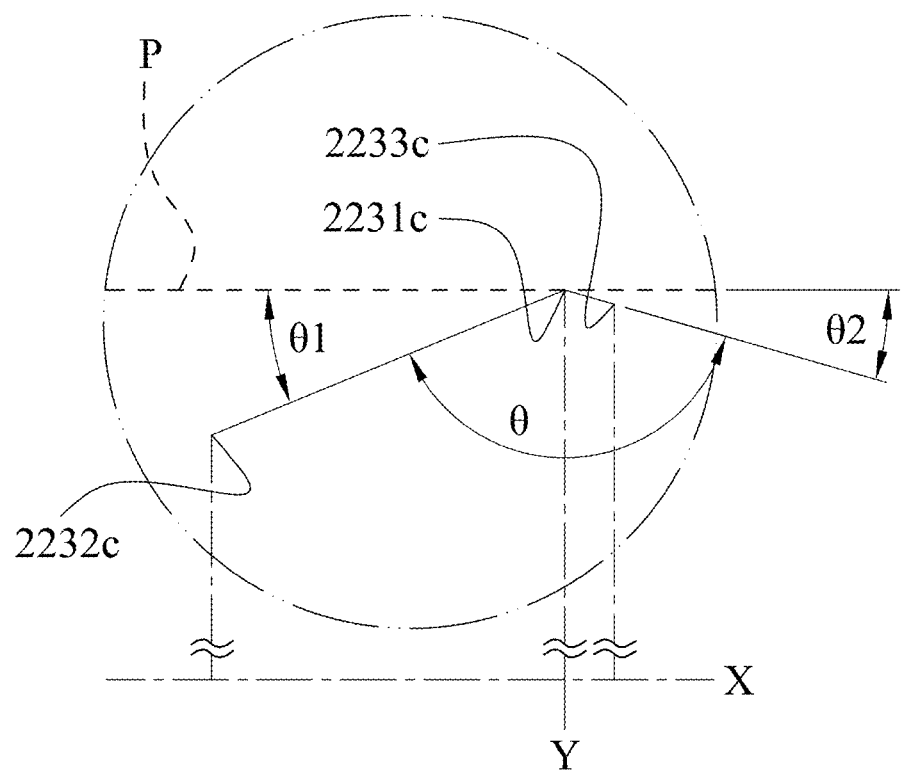
FIG. 2R shows another schematic view of parameters of the light passing hole of the 3rd example according to the 2nd embodiment in FIG. 2P.

FIG. 2Q shows a schematic view of parameters of the light passing hole 223 of the 3rd example according to the 2nd embodiment in FIG. 2P. FIG. 2R shows another schematic view of parameters of the light passing hole 223 of the 3rd example according to the 2nd embodiment in FIG. 2P. In FIGS. 2Q and 2R, when a distance between the valley point 2231c and the optical axis X is D, a distance between the first crest point 2232c and the optical axis X is d1, and a distance between the second crest point 2233c and the optical axis X is d2, an included angle θ is formed between a line joining the valley point 2231c and the first crest point 2232c and a line joining the valley point 2231c and the second crest point 2233c, an included angle θ1 is formed between the line joining the valley point 2231c and the first crest point 2232c and a line P parallel to the optical axis X, and an included angle θ2 is formed between the line joining the valley point 2231c and the second crest point 2233c and the line P parallel to the optical axis X, and an elastic drafting ratio defined by the cross section of the light passing hole 223 is EDR (EDR=[(D−d1)/D]×100%), the aforementioned parameters can be satisfied in the following Table 6.

TABLE 6 the 3rd example of the 2nd embodiment

| D (mm) | 5.55 | θ (degree) | 141.6 |
|---|---|---|---|
| d1 (mm) | 5.32 | θ1 (degree) | 22.3 |
| d2 (mm) | 5.53 | θ2 (degree) | 16.1 |
| d1/D | 0.959 | EDR (%) | 4.1 |
| d2/D | 0.996 | | |

3rd Embodiment

Figure 3A:
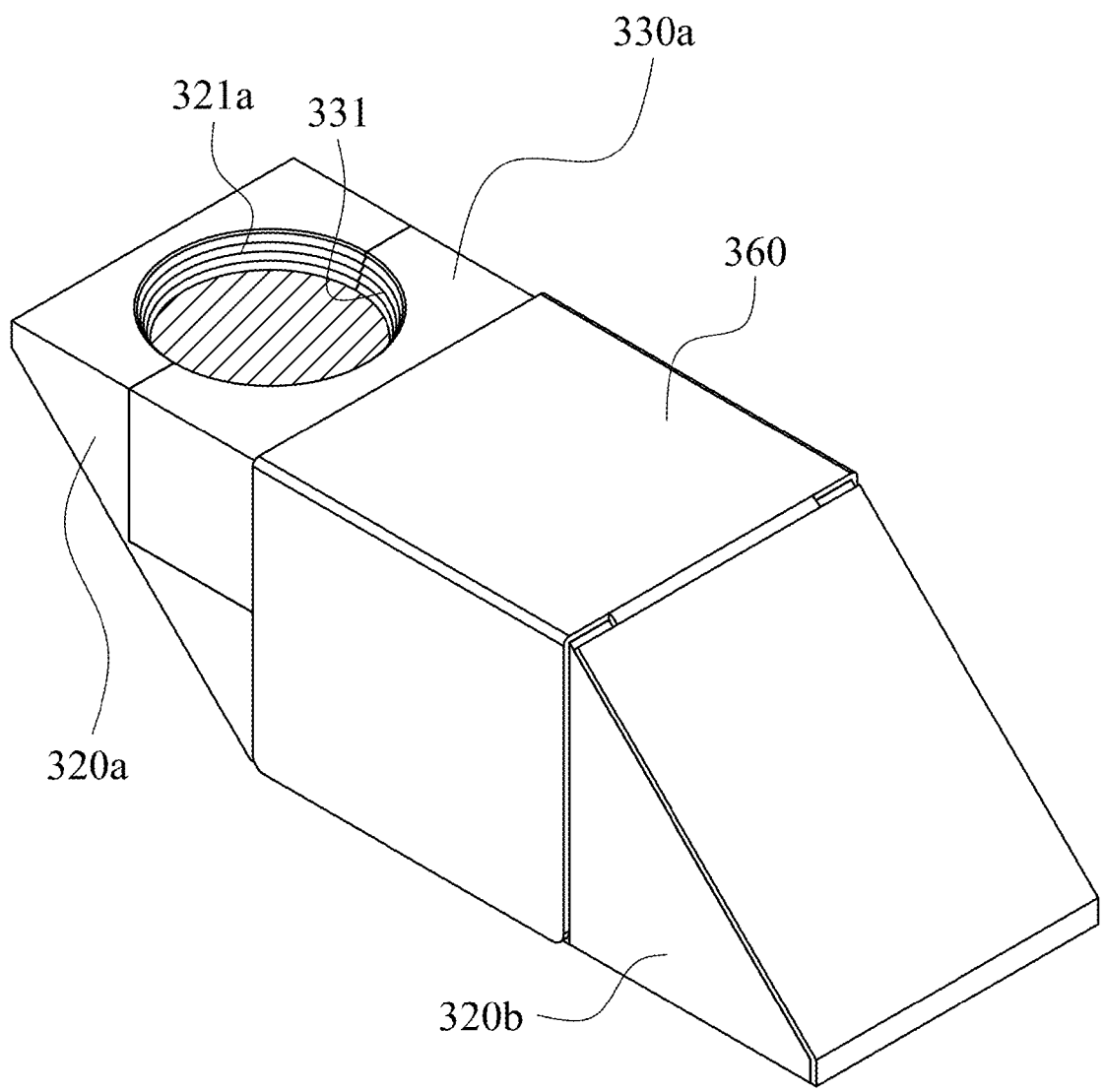
FIG. 3A shows a three-dimensional schematic view of a camera module according to the 3rd embodiment of the present disclosure.
Figure 3B:
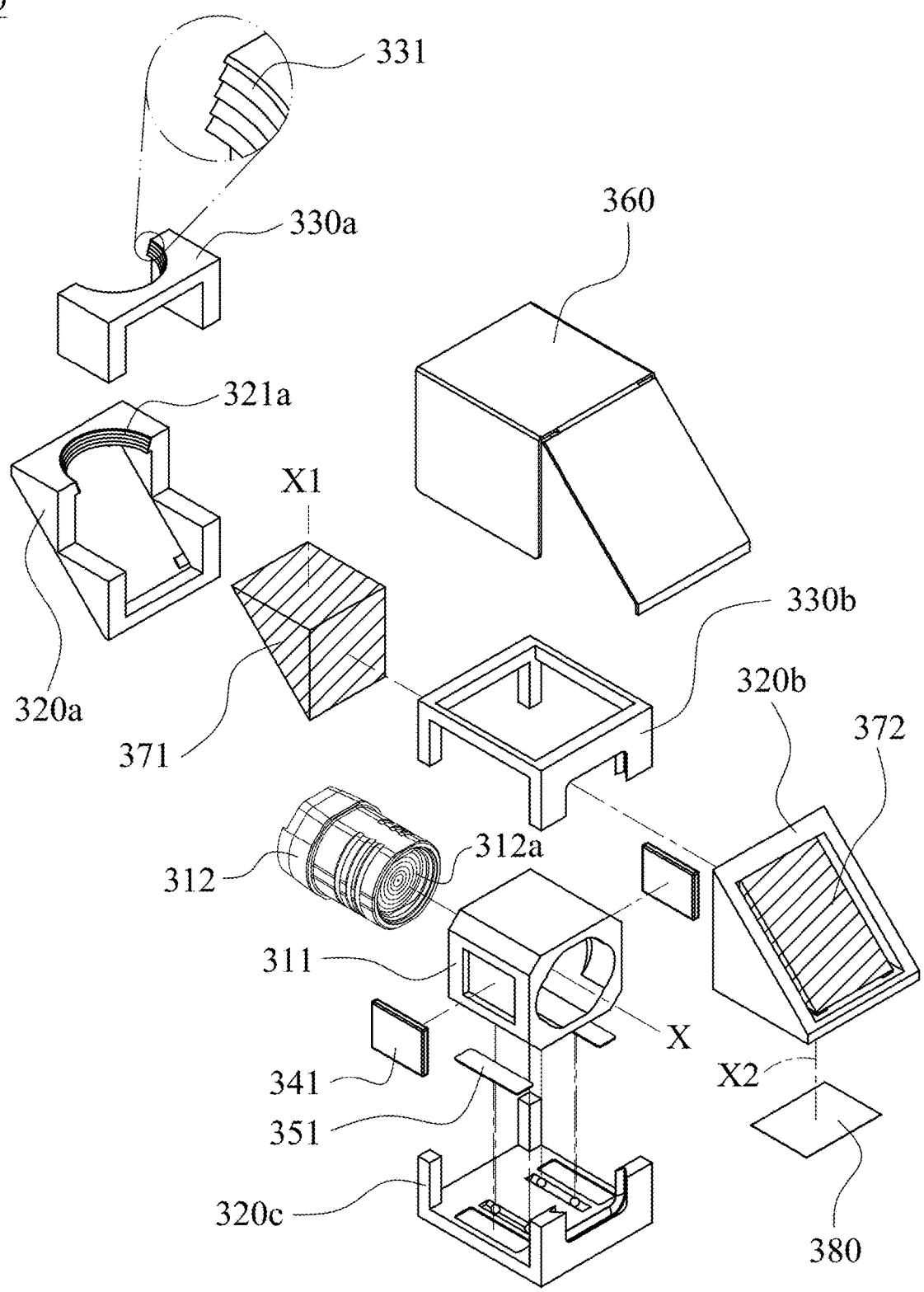
FIG. 3B shows an exploded view of the camera module according to the 3rd embodiment in FIG. 3A.
Figure 3C:
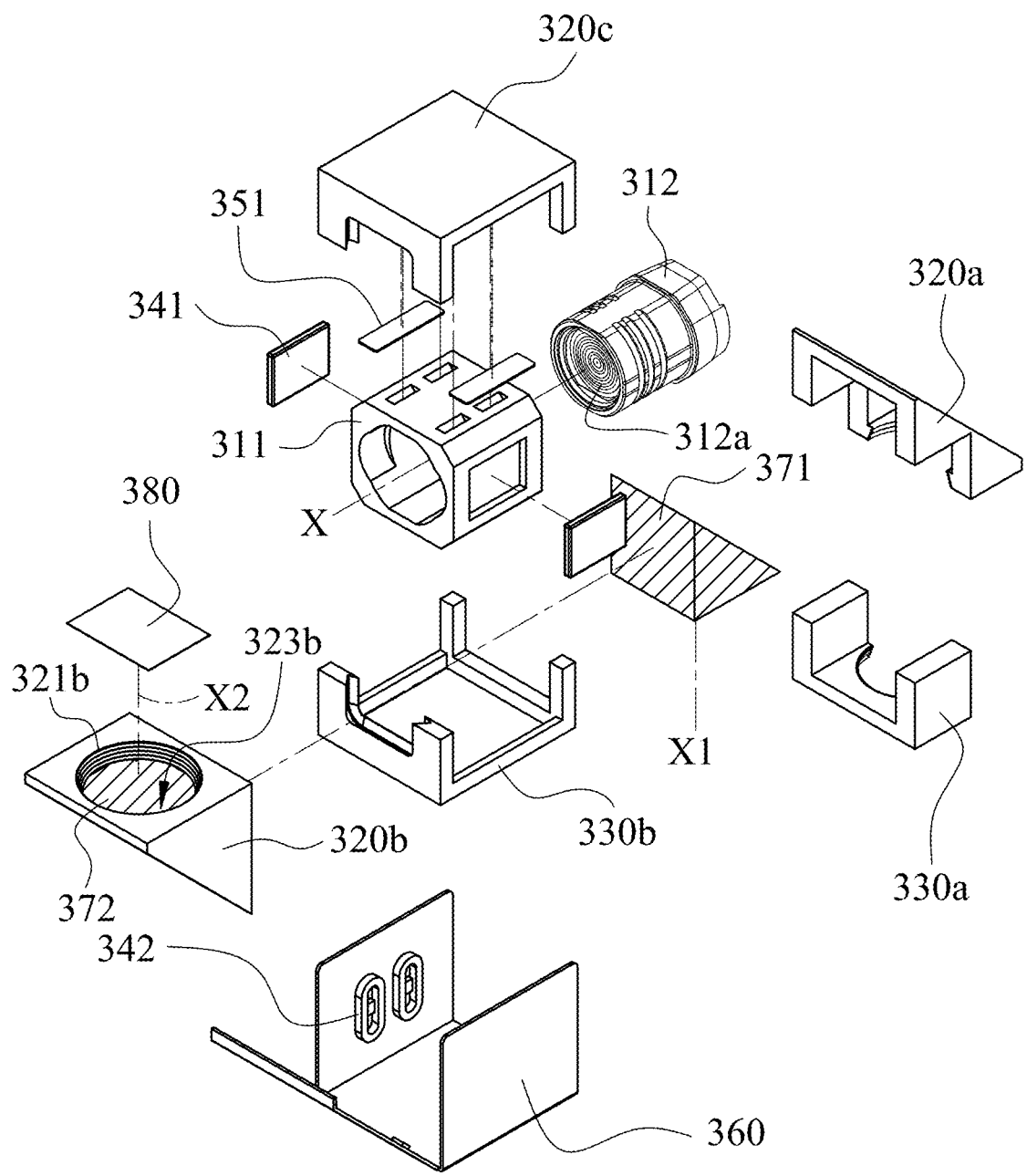
FIG. 3C shows another perspective of the exploded view of the camera module according to the 3rd embodiment in FIG. 3A.

FIG. 3A shows a three-dimensional schematic view of a camera module 300 according to the 3rd embodiment of the present disclosure. FIG. 3B shows an exploded view of the camera module 300 according to the 3rd embodiment in FIG. 3A. FIG. 3C shows another perspective of the exploded view of the camera module 300 according to the 3rd embodiment in FIG. 3A. In FIGS. 3A-3C, a camera module 300 includes an imaging lens assembly driving module (its reference numeral is omitted) and an image surface 380, and the image surface 380 is located at an image surface of the imaging lens assembly driving module. The imaging lens assembly driving module includes a lens carrier 311, a first molded structure (its reference numeral is omitted), a second molded structure (its reference numeral is omitted), a driving mechanism (its reference numeral is omitted), a mechanical member (its reference numeral is omitted), a top cover 360 and at least one light-folding element 371, 372.

The lens carrier 311 defines an optical axis X and is for carrying an image lens assembly 312, and the image lens assembly 312 includes an imaging lens element set 312a, but the present disclosure is not limited thereto. The first molded structure is disposed correspondingly to the lens carrier 311, the second molded structure is coupled to the first molded structure for forming an inner space (its reference numeral is omitted), and the lens carrier 311 and the light-folding elements 371, 372 are disposed in the inner space. The driving mechanism is for driving the lens carrier 311 to move along the optical axis X. The mechanical member is for connecting the lens carrier 311 and the first molded structure to each other. A part of each of the first molded structure and the second molded structure is covered in the top cover 360, and the lens carrier 311, the first molded structure, the second molded structure, the driving mechanism, the mechanical member and the light-folding element 372 are accommodated in the top cover 360.

In detail, the first molded structure can include three first molded substructures 320a, 320b, 320c, the second molded structure can include two second molded substructures 330a, 330b, but the present disclosure is not limited thereto. The first molded substructure 320a is coupled to the second molded substructure 330a for forming an inner space 322 (shown in FIG. 3G) where the light-folding element 371 can be disposed. The first molded substructure 320b forms an inner space where the lens carrier 311 can be disposed.

Specifically, the driving mechanism can include at least one driving magnet 341 and at least one driving coil 342. In the 3rd embodiment, a number of the driving magnet 341 is two, and a number of the driving coil 342 is four. The two driving magnets 341 are disposed on two sides of the lens carrier 311, respectively. Each two of the four driving coils 342 are disposed on two inner sides of the top cover 360, respectively. The two driving magnets 341 are corresponding to the each two of the driving coils 342, respectively, but the present disclosure is not limited thereto. Hence, via the relative corresponding between the driving magnets 341 and the driving coils 342, the lens carrier 311 can be moved for focusing.

In FIGS. 3B and 3C, the mechanical member can include at least one ferromagnetic element 351, and the ferromagnetic element 351 is corresponding to the driving mechanism. In the 3rd embodiment, a number of the ferromagnetic element 351 is two, and the two ferromagnetic elements 351 are disposed in the first molded substructure 320c and corresponding to the two driving magnets 341 of the driving mechanism, respectively, but the present disclosure is not limited thereto. Since the driving magnets 341 are disposed on the lens carrier 311 via the configuration of the ferromagnetic elements 351, the mechanical member can connect the lens carrier 311 and the first molded structure by magnetic force so as to improve the stability of focusing during the operation of the imaging lens assembly driving module.

Figure 3D:
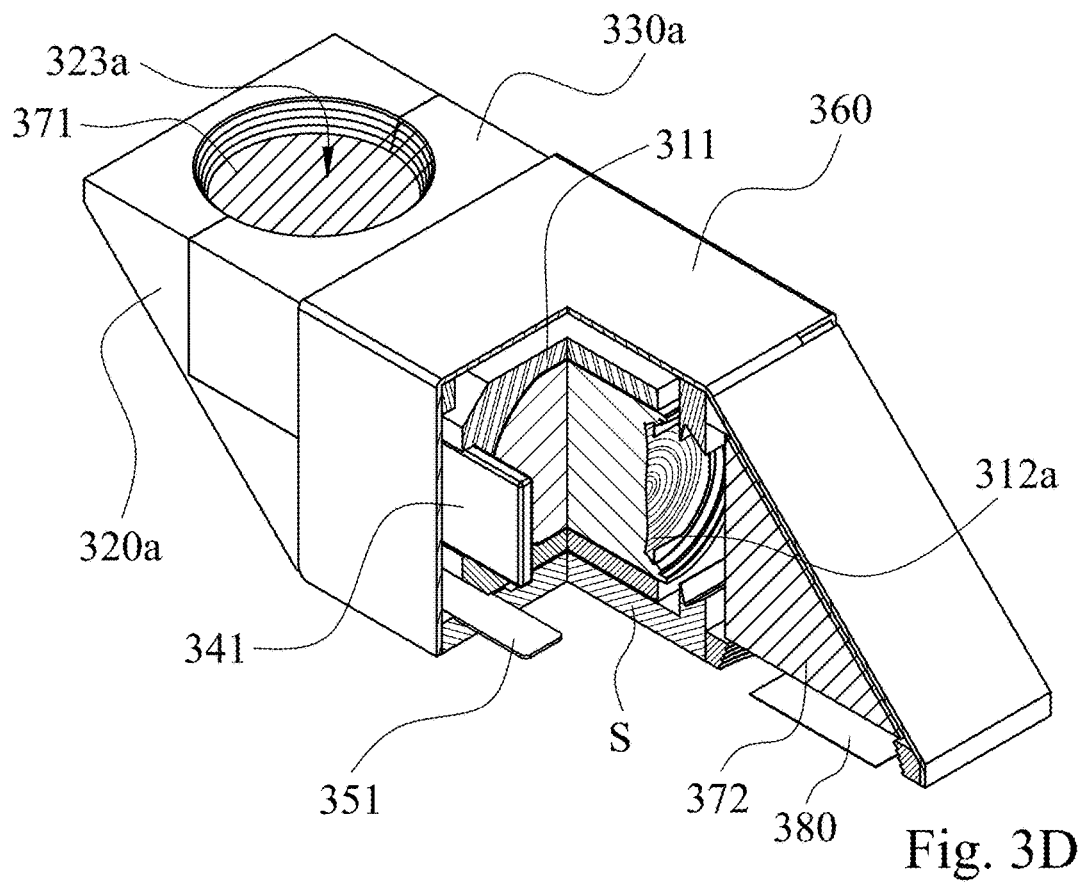
FIG. 3D shows a partial cross-sectional view of the camera module according to the 3rd embodiment in FIG. 3A.
Figure 3E:
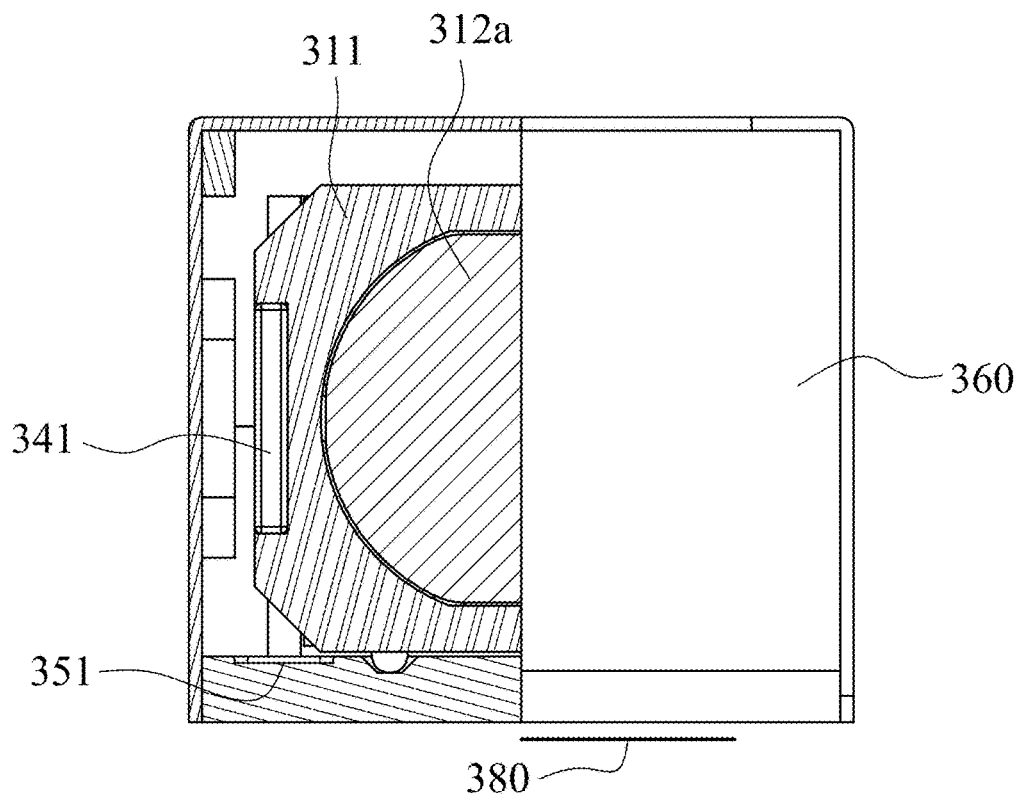
FIG. 3E shows another partial cross-sectional view of the camera module according to the 3rd embodiment in FIG. 3D.

FIG. 3D shows a partial cross-sectional view of the camera module 300 according to the 3rd embodiment in FIG. 3A. FIG. 3E shows another partial cross-sectional view of the camera module 300 according to the 3rd embodiment in FIG. 3D. In FIGS. 3D and 3E, the ferromagnetic elements 351 are disposed correspondingly to the driving magnets 341 of the driving mechanism. In detail, a part of each of two outer sides of the lens carrier 311 is clamped between each two of the ferromagnetic elements 351 and each of the two driving magnets 341, respectively. Hence, stability of movement of the lens carrier 311 can be improved.

In the imaging lens assembly driving module of the present disclosure, a light passing hole can be formed by at least one of the first molded structure and the second molded structure. In FIGS. 3B and 3C, in the 3rd embodiment, a light passing hole 323b is formed by the first molded substructure 320b of the first molded structure and includes a light blocking structure 321b. In detail, the first molded substructure 320b of the first molded structure forms an inner space (its reference numeral is omitted) by itself, and the light-folding element 372 is disposed therein. The light passing hole 323b of the first molded substructure 320b is an elastic demolding structure and in shape of a ring. Moreover, the light blocking structure 321b corresponding to the light passing hole 323b can be the light blocking structure 321b with concave-convex shape, but the present disclosure is not limited thereto. During the process of molding, the more sophisticated molding products can be achieved by design of molding because of elasticity of plastic material. Via the light blocking structure with concave-convex shape, the non-imaging light can be reflected so as to decrease the intensity of the non-imaging light. It has to be specified that, in the 3rd embodiment, a structure of the light passing hole 323b can be the same as the structure of the light passing hole 223 of the 1st, 2nd and 3rd examples according to the 2 embodiment, and it will not be described again herein.

Figure 3F:
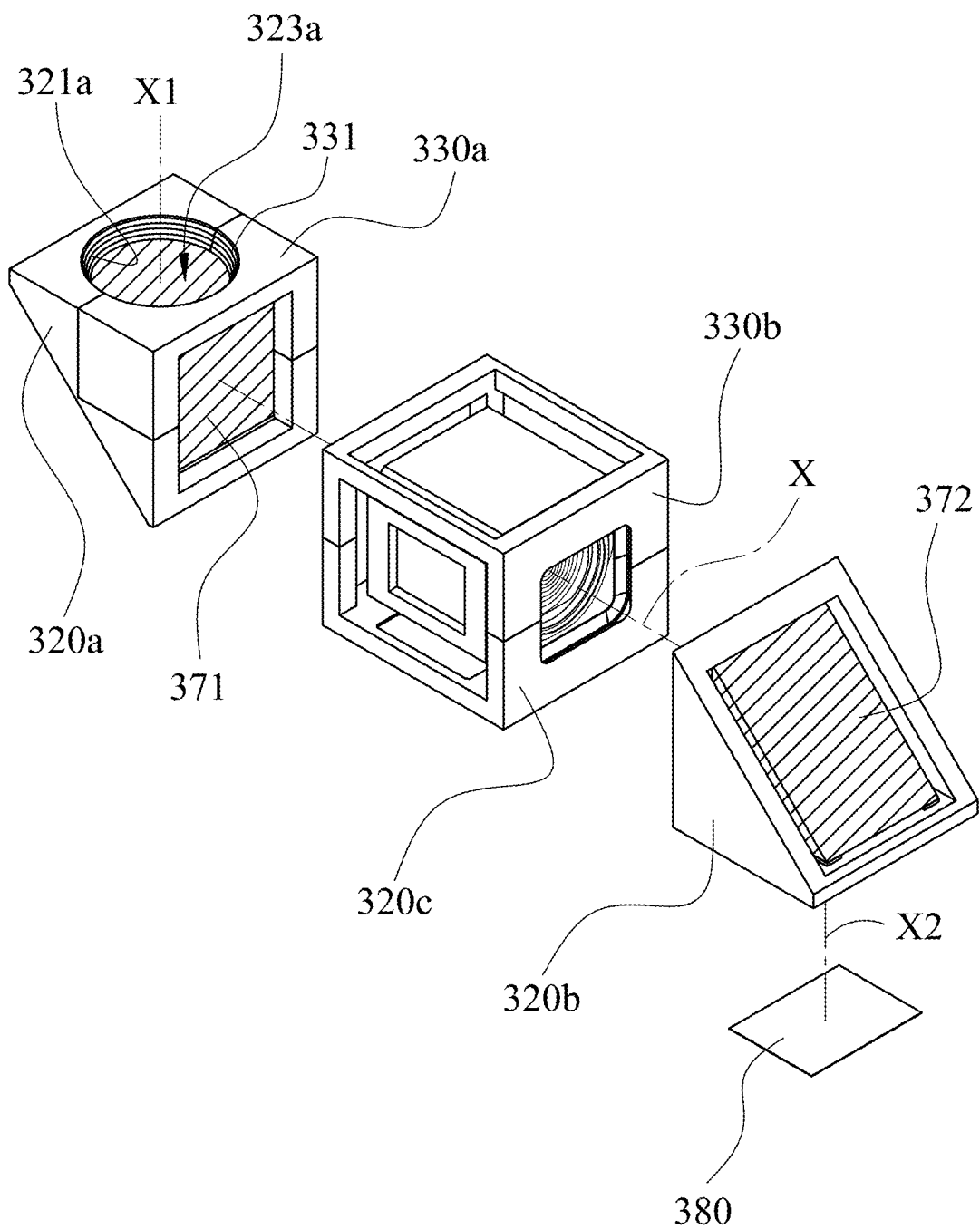
FIG. 3F shows another exploded view of the camera module according to the 3rd embodiment in FIG. 3A.
Figure 3G:
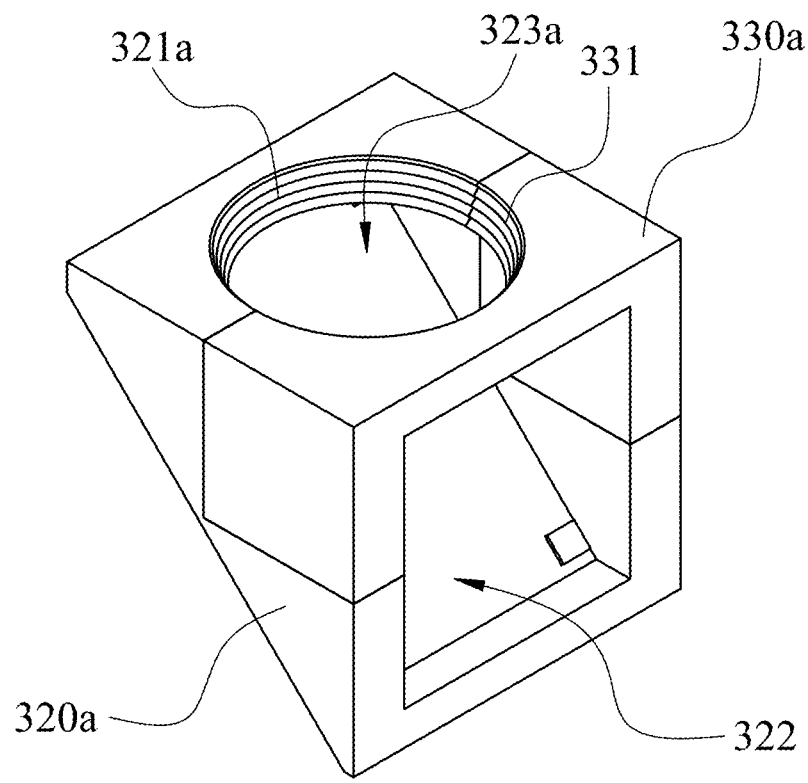
FIG. 3G shows a schematic view of the combination of the first molded substructure and the second molded substructure according to the 3rd embodiment in FIG. 3A.

FIG. 3F shows another exploded view of the camera module 300 according to the 3rd embodiment in FIG. 3A. FIG. 3G shows a schematic view of the combination of the first molded substructure 320a and the second molded substructure 330a according to the 3rd embodiment in FIG. 3A. In FIGS. 3F and 3G, the first molded substructure 320a of the first molded structure can include a first light blocking structure 321a, and the second molded substructure 330a of the second molded structure can include a second light blocking structure 331. The second molded substructure 330a can be coupled to the first molded substructure 320a for forming the inner space 322. The first molded substructure 320a is coupled to the second molded substructure 330a so that the first light blocking structure 321a and the second light blocking structure 331 are disposed correspondingly to each other for forming a light passing hole 323a. In detail, the first molded substructure 320a can be coupled to the second molded substructure 330a by point glue adhesion or design of plastic element engagement, but the present disclosure is not limited thereto.

Please refer to FIG. 3F, the light-folding elements 371, 372 can be prisms or mirrors, but the present disclosure is not limited thereto. In the 3rd embodiment, the light-folding elements 371, 372 are prisms. The light-folding elements 371, 372 is for folding an imaging light from an incident light path of the light-folding elements 371, 372 into an emergent light path of the light-folding elements 372, 372, and each of the light-folding elements 371, 372 defines another two optical axis X1, X2, respectively. Specifically, when imaging light enters the imaging lens assembly driving module along the optical axis X1, the light-folding element 371 will fold the light path of imaging light from the optical axis X1 to the optical axis X. After imaging light passes through the imaging lens assembly 312, the light-folding element 372 folds the light path of imaging light from the optical axis X to the optical axis X2 so as to fold the light path of imaging light into the image surface 380. Via the light-folding elements 371, 372, the more ideal configuration of the imaging lens assembly driving module can be achieved so that a light path with a long focal length can be accommodated in the small inner space. Hence, the feasibility of the micro lens assembly can be provided. In detail, the light-folding elements 371, 372 are disposed in the inner space 322 and the inner space formed by the first molded substructure 320b, respectively. Via the light passing holes 323a, 323b disposed on an object side and an image side of the light-folding element 371, non-imaging light can be effectively blocked. Hence, clarity of image can be maintained.

Moreover, each of the light passing holes 323a, 323b can surround the optical axis X1, X2, respectively, and the light passing holes 323a, 323b are in shape of closed rings. Hence, the continuity of the disposition of the first light blocking structure 321a and the second light blocking structure 331 corresponding to each other can be ensured so as to maintain the higher efficiency of light blocking.

Figure 3H:
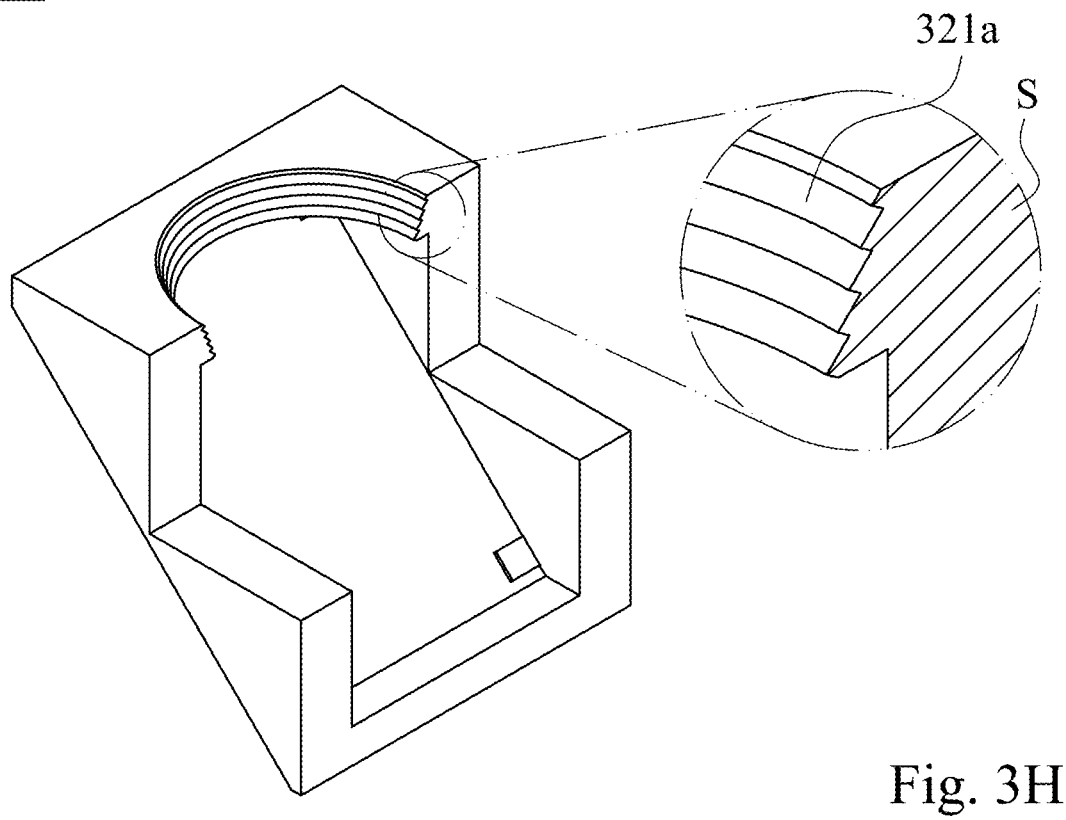
FIG. 3H shows a schematic view of the first molded substructure according to the 3rd embodiment in FIG. 3A.
Figure 3I:
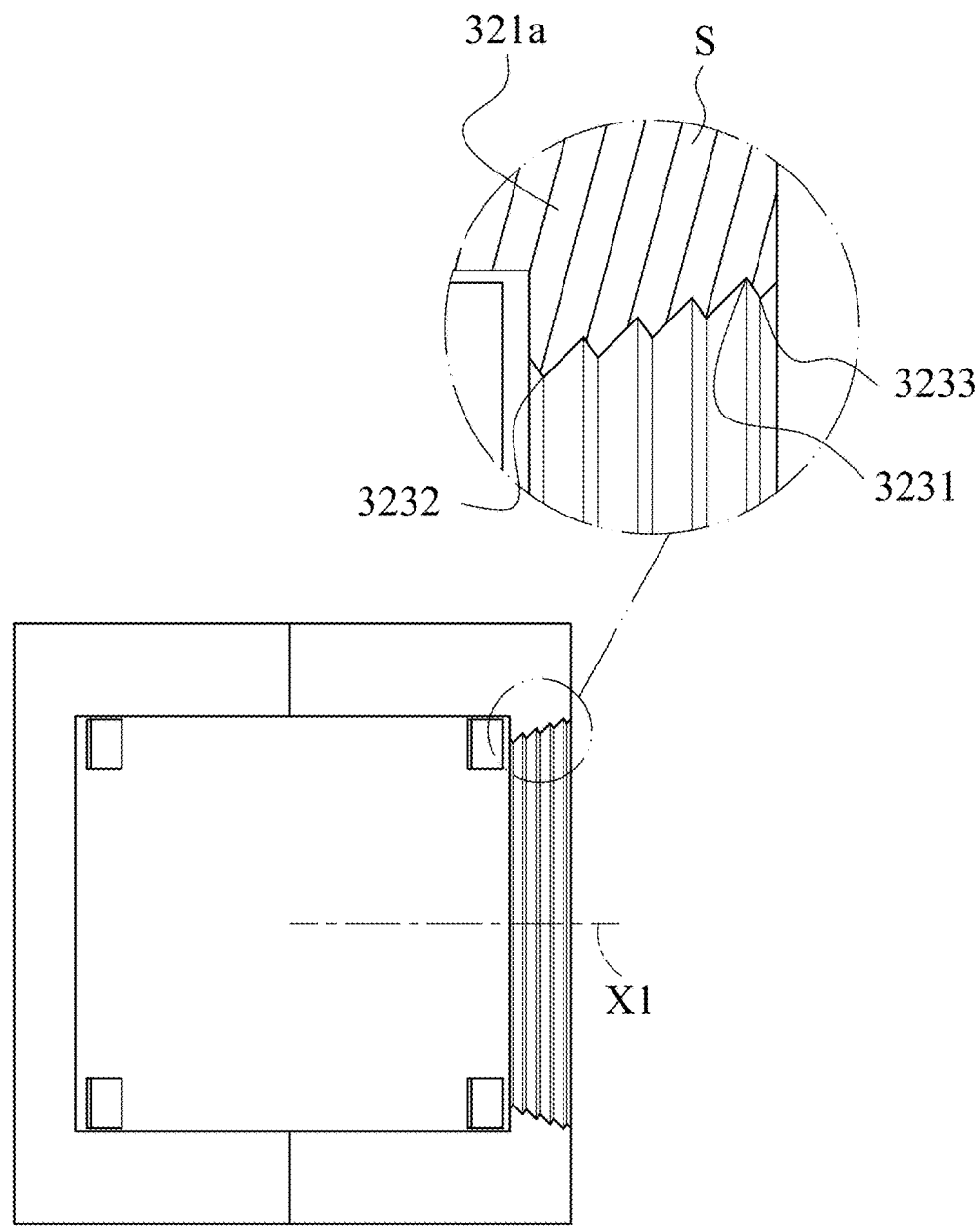
FIG. 3I shows a side view of the first molded substructure according to the 3rd embodiment in FIG. 3H.

FIG. 3H shows a schematic view of the first molded substructure 320a according to the 3rd embodiment in FIG. 3A. FIG. 3I shows a side view of the first molded substructure 320a according to the 3rd embodiment in FIG. 3H. A cross section of the light passing hole 323a which passes through the optical axis X1 includes a valley point 3231, a first crest point 3232 and a second crest point 3233. Specifically, the aforementioned cross section is an interface of coupling between the first molded substructure 320a and the second molded substructure 330a, the aforementioned cross section is perpendicular to a plane surface formed by the crossing of the optical axes X1, X, but the present disclosure is not limited thereto. The valley point 3231 is a farthest point away from the optical axis X1 in the cross section. The first crest point 3232 is a closest point to the optical axis X1 in the cross section. The second crest point 3233 is a closest point to the optical axis X1 in another side relative to the first crest point 3232 based on a perpendicular line Y (shown in FIG. 3J) from the valley point 3231 to the optical axis X1.

Figure 3J:
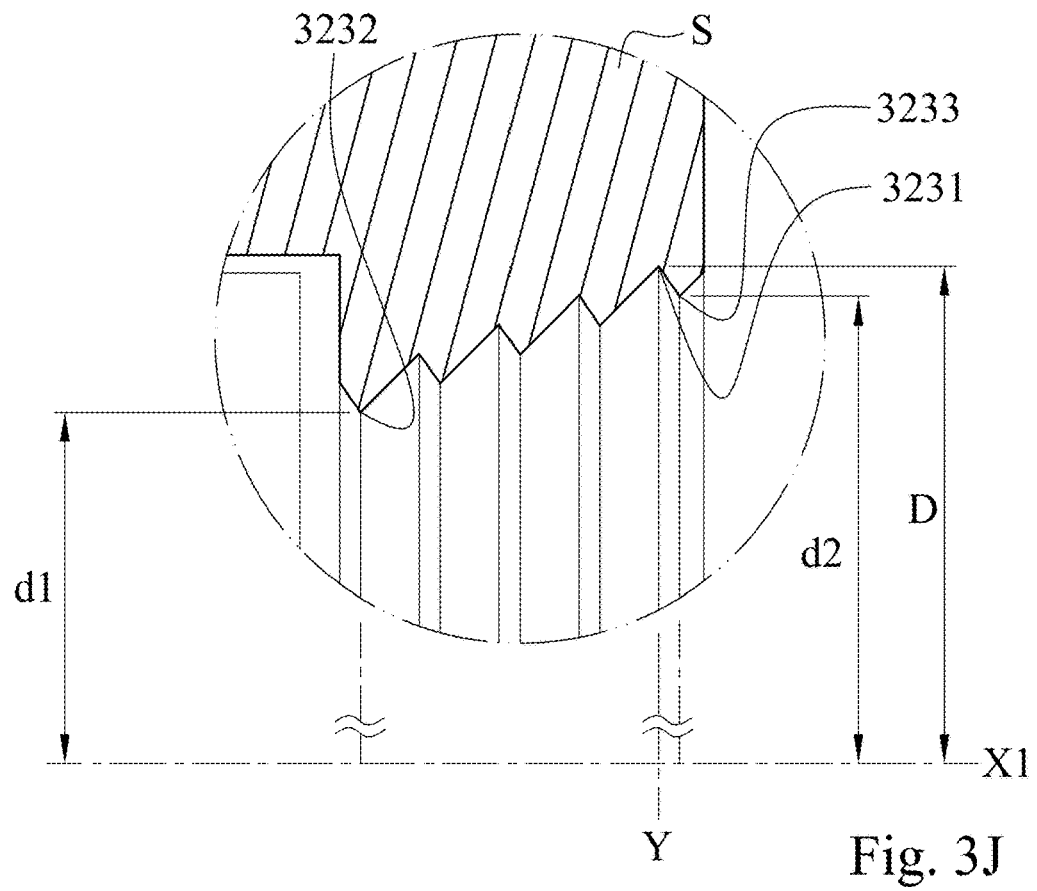
FIG. 3J shows a schematic view of parameters of the light passing hole according to the 3rd embodiment in FIG. 3I.

Specifically, the valley point 3231, the first crest point 3232 and the second crest point 3233 are the points in the cross section of the first light blocking structure 321a in FIG. 3J.

Moreover, structures of the first molded substructure 320c and the second molded substructure 330b can be the same as the structures of a first molded substructure 420c (shown in FIG. 4B) and a second molded substructure 430b (shown in FIG. 4B), and can also be the same as the structures of the first molded structure 120 and the second molded structure 130 of the 1st embodiment or the first molded structure 220 and the second molded structure 230 of the 2nd embodiment, but the present disclosure is not limited thereto. The detail structures of the first molded substructure 420c and the second molded substructure 430b are described in the 4th embodiment, and it will not be described herein.

Figure 3K:
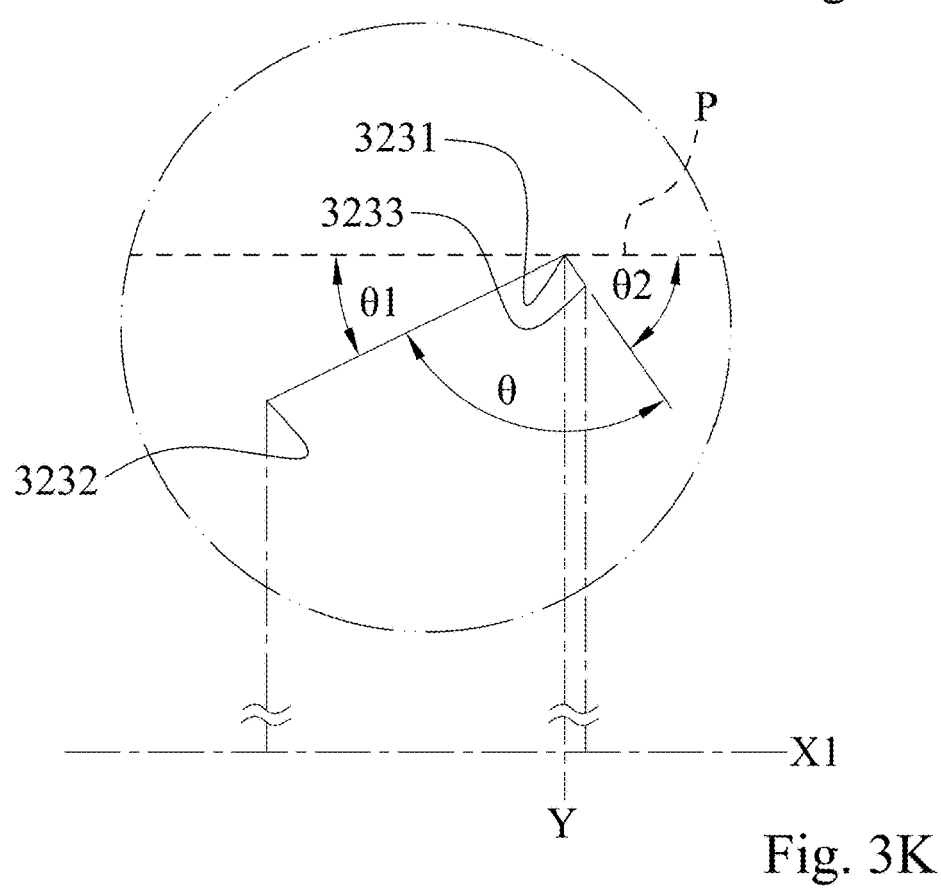
FIG. 3K shows another schematic view of parameters of the light passing hole according to the 3rd embodiment in FIG. 3I.

FIG. 3J shows a schematic view of parameters of the light passing hole 323a according to the 3rd embodiment in FIG. 3I. FIG. 3K shows another schematic view of parameters of the light passing hole 323a according to the 3rd embodiment in FIG. 3I. In FIGS. 3J and 3K, when a distance between the valley point 3231 and the optical axis X1 is D, a distance between the first crest point 3232 and the optical axis X1 is d1, and a distance between the second crest point 3233 and the optical axis X1 is d2, an included angle θ is formed between a line joining the valley point 3231 and the first crest point 3232 and a line joining the valley point 3231 and the second crest point 3233, an included angle θ1 is formed between the line joining the valley point 3231 and the first crest point 3232 and a line P parallel to the optical axis X1, and an included angle θ2 is formed between the line joining the valley point 3231 and the second crest point 3233 and the line P parallel to the optical axis X1, and an elastic drafting ratio defined by the cross section of the light passing hole 323a is EDR (EDR=[(D−d1)/D]×100%), the aforementioned parameters can be satisfied in the following Table 7.

TABLE 7 the 3rd embodiment

| D (mm) | 3.32 | θ (degree) | 98.9 |
|---|---|---|---|
| d1 (mm) | 2.92 | θ1 (degree) | 26.1 |
| d2 (mm) | 3.24 | θ2 (degree) | 55 |
| d1/D | 0.880 | EDR (%) | 12.0 |
| d2/D | 0.976 | | |

4th Embodiment

Figure 4A:
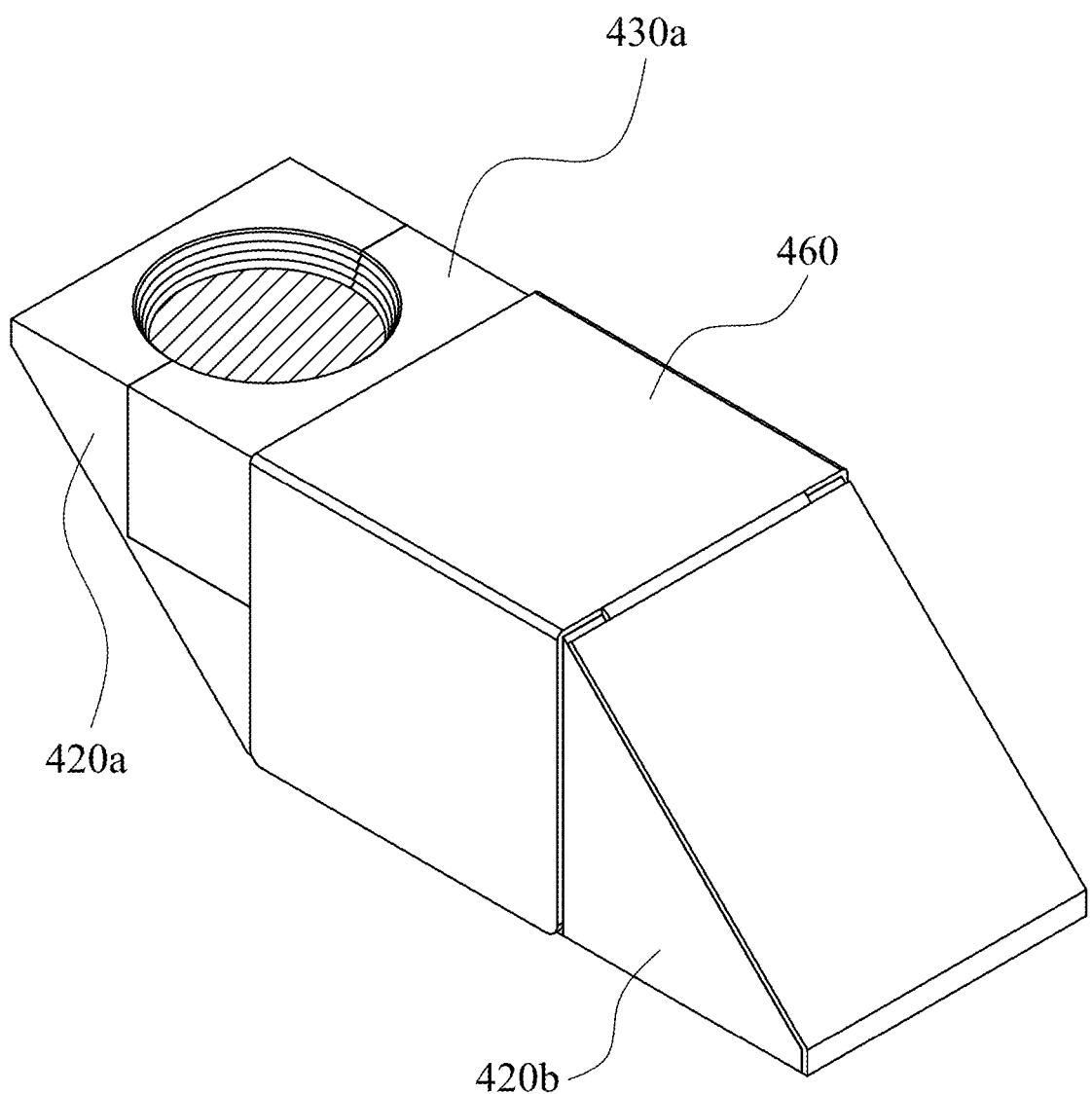
FIG. 4A shows a three-dimensional schematic view of a camera module according to the 4th embodiment of the present disclosure.
Figure 4B:
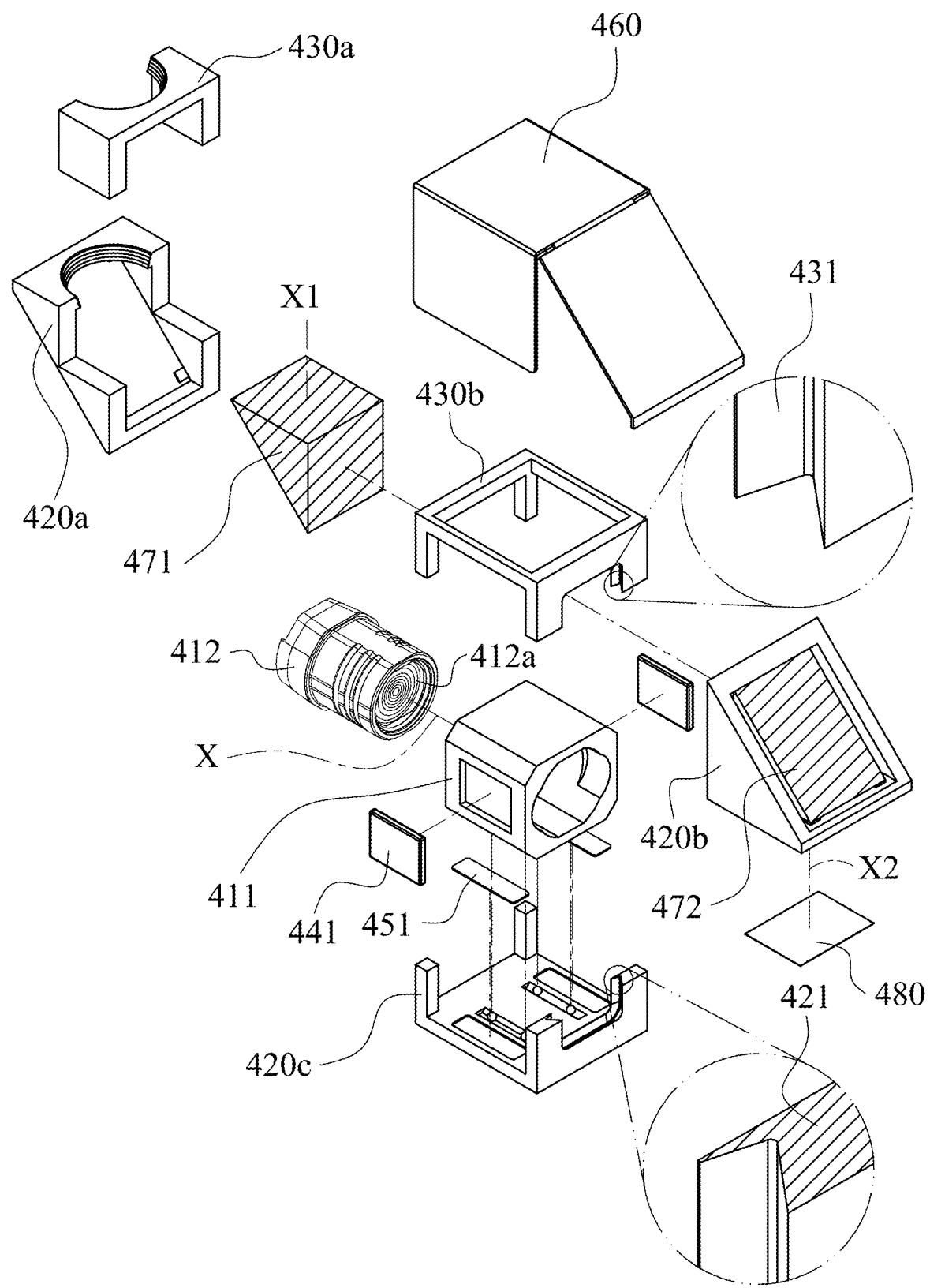
FIG. 4B shows an exploded view of the camera module according to the 4th embodiment in FIG. 4A.
Figure 4C:
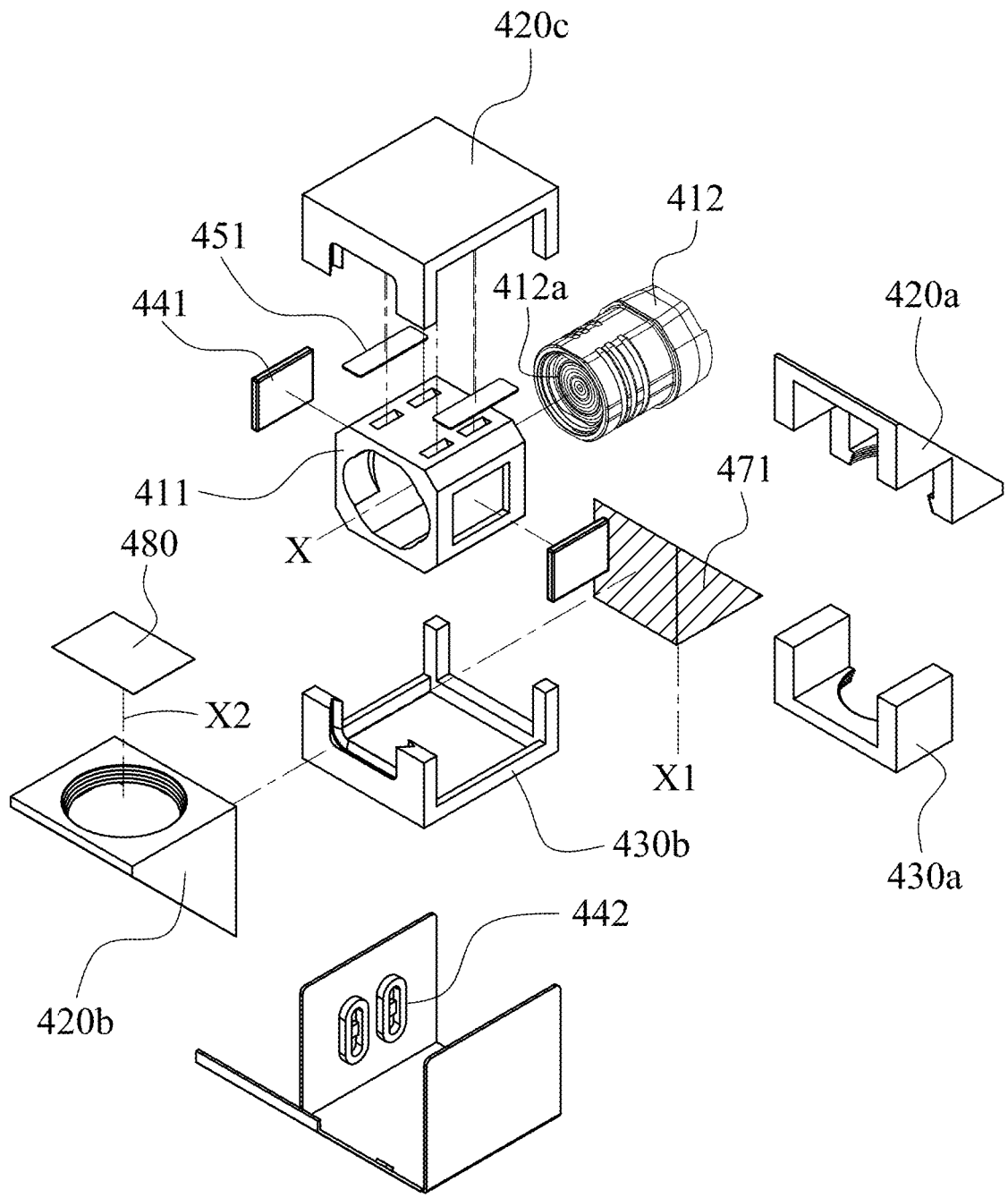
FIG. 4C shows another perspective of the exploded view of the camera module according to the 4th embodiment in FIG. 4A.

FIG. 4A shows a three-dimensional schematic view of a camera module 400 according to the 4th embodiment of the present disclosure. FIG. 4B shows an exploded view of the camera module 400 according to the 4th embodiment in FIG. 4A. FIG. 4C shows another perspective of the exploded view of the camera module 400 according to the 4th embodiment in FIG. 4A. In FIGS. 4A-4C, a camera module 400 includes an imaging lens assembly driving module (its reference numeral is omitted) and an image surface 480, and the image surface 480 is located at an image surface of the imaging lens assembly driving module. The imaging lens assembly driving module includes a lens carrier 411, a first molded structure (its reference numeral is omitted), a second molded structure (its reference numeral is omitted), a driving mechanism (its reference numeral is omitted), a mechanical member (its reference numeral is omitted), a top cover 460 and at least one light-folding element 471, 472.

The lens carrier 411 defines an optical axis X and is for carrying an image lens assembly 412, and the image lens assembly 412 includes an imaging lens element set 412a, but the present disclosure is not limited thereto. The first molded structure is disposed correspondingly to the lens carrier 411, the second molded structure is coupled to the first molded structure for forming an inner space (its reference numeral is omitted), and the lens carrier 411 and the light-folding elements 471, 472 are disposed in the inner space. The driving mechanism is for driving the lens carrier 411 to move along the optical axis X. The mechanical member is for connecting the lens carrier 411 and the first molded structure to each other. A part of each of the first molded structure and the second molded structure is covered in the top cover 460, and the lens carrier 411, the first molded structure, the second molded structure, the driving mechanism, the mechanical member and the light-folding element 472 are accommodated in the top cover 460.

In detail, the first molded structure can include three first molded substructures 420a, 420b, 420c, the second molded structure can include two second molded substructures 430a, 430b, but the present disclosure is not limited thereto. The first molded substructure 420a is coupled to the second molded substructure 430a for forming an inner space where the light-folding element 471 can be disposed. The first molded substructure 420c is coupled to the second molded substructure 430b for forming an inner space 422 (shown in FIG. 4D) where the lens carrier 411 can be disposed.

Specifically, the driving mechanism can include at least one driving magnet 441 and at least one driving coil 442. In the 4th embodiment, a number of the driving magnet 441 is two, and a number of the driving coil 442 is four. The two driving magnets 441 are disposed on two sides of the lens carrier 411, respectively. Each two of the four driving coils 442 are disposed on two inner sides of the top cover 360, respectively. The two driving magnets 441 are corresponding to the each two of the driving coils 442, respectively, but the present disclosure is not limited thereto. Hence, via the relative corresponding between the driving magnets 441 and the driving coils 442, the lens carrier 411 can be moved for focusing.

In FIGS. 4B and 4C, the mechanical member can include at least one ferromagnetic element 451, and the ferromagnetic element 451 is corresponding to the driving mechanism. In the 4th embodiment, a number of the ferromagnetic element 451 is two, and the two ferromagnetic elements 451 are disposed in the first molded substructure 420c and corresponding to the two driving magnets 441 of the driving mechanism, respectively, but the present disclosure is not limited thereto. Since the driving magnets 441 are disposed on the lens carrier 411 via the configuration of the ferromagnetic elements 451, the mechanical member can connect the lens carrier 411 and the first molded structure by magnetic force so as to improve the stability of focusing during the operation of the imaging lens assembly driving module.

Structures and the configuration of the first molded substructures 420a, 420b, the second molded substructures 430a and the light-folding elements 471, 472 are the same as the structures and the configuration of the first molded substructures 320a, 320b, the second molded substructures 330a and the light-folding elements 371, 372, and it will not be describe again herein.

Figure 4D:
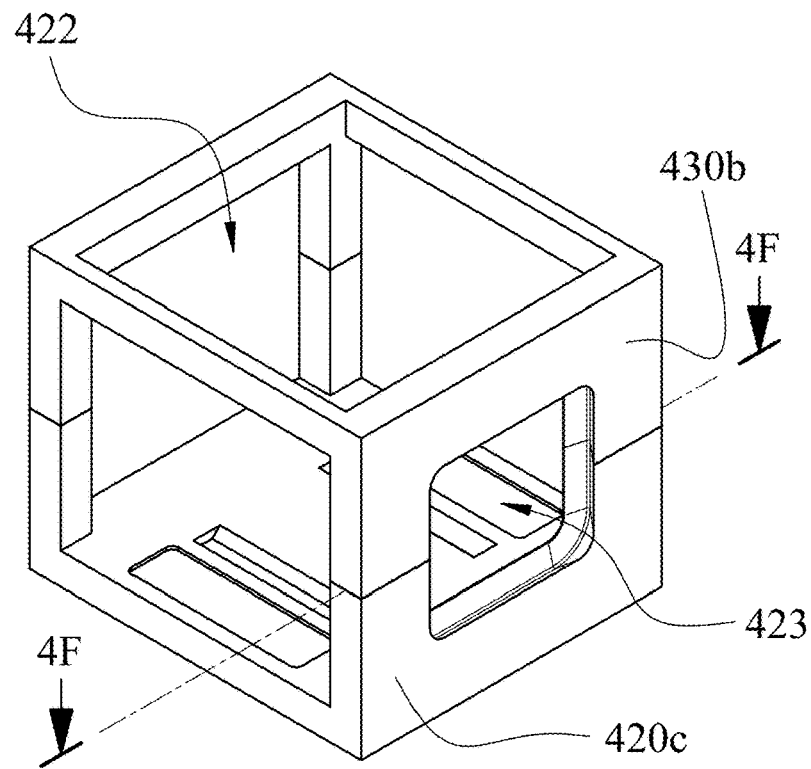
FIG. 4D shows a schematic view of the coupling of the first molded substructure and the second molded substructure according to the 4th embodiment in FIG. 4A.
Figure 4E:
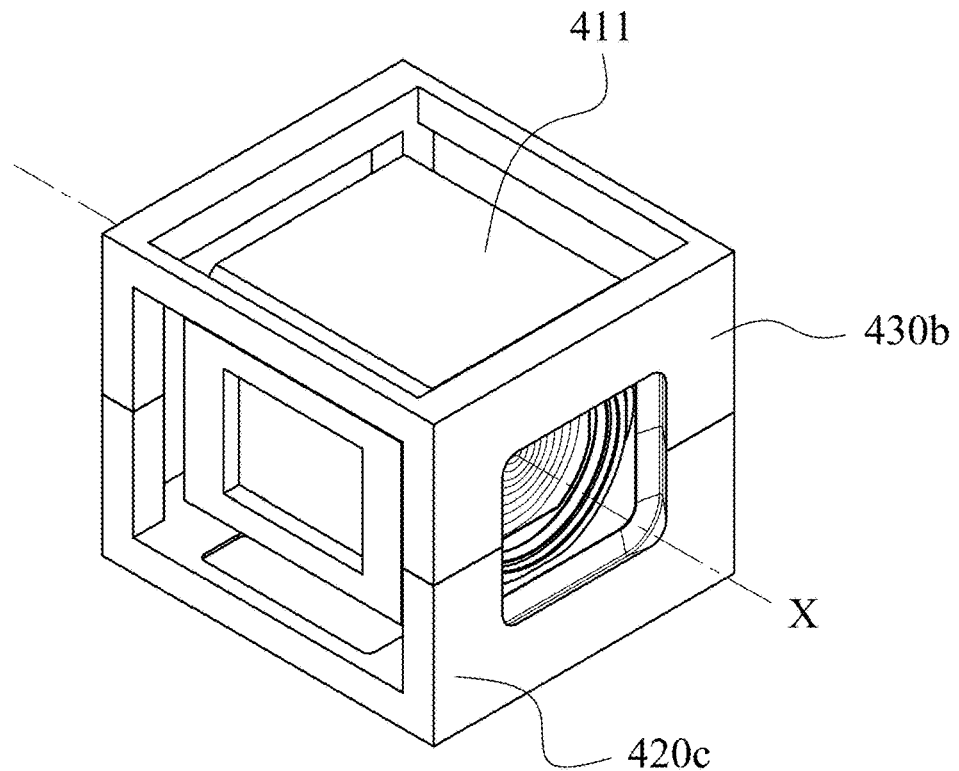
FIG. 4E shows a schematic view of the combination of the lens carrier, the first molded substructure and the second molded substructure according to the 4th embodiment in FIG. 4A.

FIG. 4D shows a schematic view of the coupling of the first molded substructure 420c and the second molded substructure 430b according to the 4th embodiment in FIG. 4A. FIG. 4E shows a schematic view of the combination of the lens carrier 411, the first molded substructure 420c and the second molded substructure 430b according to the 4th embodiment in FIG. 4A. The first molded substructure 420c of the first molded structure can include a first light blocking structure 421, and the second molded substructure 430b of the second molded structure can include a second light blocking structure 431. The first molded substructure 420c is coupled to the second molded substructure 430b so that the first light blocking structure 421 and the second light blocking structure 431 are disposed correspondingly to each other for forming a light passing hole 423. The optical axis X can pass through the light passing hole 423 so that the lens carrier 411 and the light passing hole 423 are configured coaxially. Therefore, coaxiality between the lens carrier 411 and the light passing hole 423 can be maintained so as to prevent the light passing hole 423 from blocking the light excluding non-imaging light. Hence, the imaging quality can be improved. In detail, the first molded substructure 420c can be coupled to the second molded substructure 430b by point glue adhesion or design of plastic element engagement, but the present disclosure is not limited thereto. Moreover, the light passing holes 423 can surround the optical axis X, and the light passing holes 423 is in shape of a closed ring. Hence, the continuity of the disposition of the first light blocking structure 421 and the second light blocking structure 431 corresponding to each other can be ensured so as to maintain the higher efficiency of light blocking.

Figure 4F:
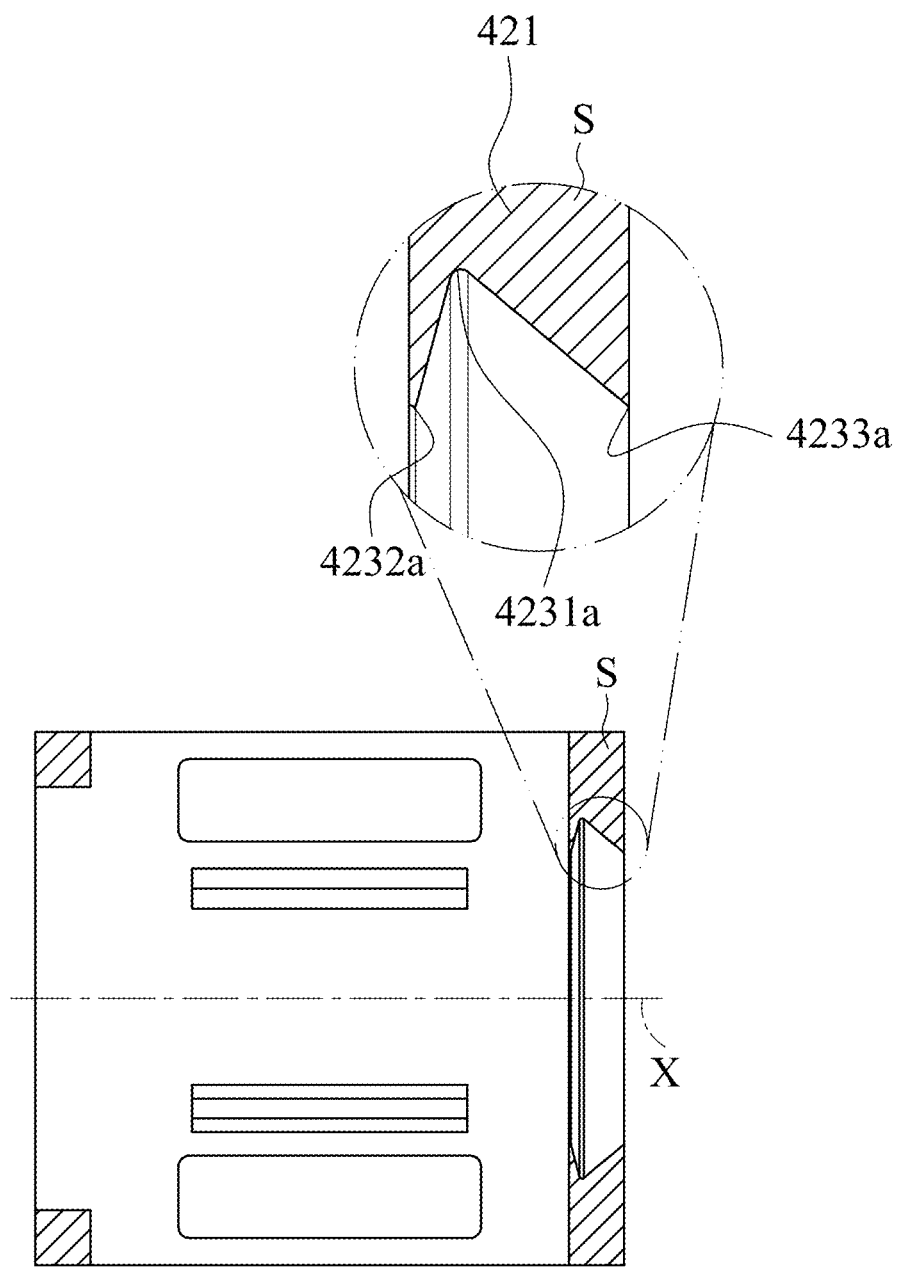
FIG. 4F shows a cross-sectional view of the first molded substructure and the second molded substructure along a cutting line 4F-4F according to the 4th embodiment in FIG. 4D.

FIG. 4F shows a cross-sectional view of the first molded substructure 420c and the second molded substructure 430b along a cutting line 4F-4F according to the 4th embodiment in FIG. 4D. It has to be specified that the light passing hole 423 formed by the first light blocking structure 421 and the second light blocking structure 431 in the 4th embodiment can provide two different structures of the light passing hole 423 of the 1st example and the 2nd example according to different requirements of optical design. To be simplified, the light passing hole 423 of the 1st example and the 2nd example according to the 4th embodiment are labeled as the same, and the other elements and the configuration thereof of the 1st example and the 2nd example according to the 4th embodiment are the same, and it will not be described herein.

In FIG. 4F, in the 1st example of the 4th embodiment, a cross section of the light passing hole 423 which passes through the optical axis X includes a valley point 4231a, a first crest point 4232a and a second crest point 4233a. Specifically, the aforementioned cross section is an interface of coupling between the first molded substructure 420c and the second molded substructure 430b, but the present disclosure is not limited thereto. The valley point 4231a is a farthest point away from the optical axis X in the cross section. The first crest point 4232a is a closest point to the optical axis X in the cross section. The second crest point 4233a is a closest point to the optical axis X in another side relative to the first crest point 4232a based on a perpendicular line Y (shown in FIG. 4G) from the valley point 4231a to the optical axis X. Specifically, the valley point 4231a, the first crest point 4232a and the second crest point 4233a are the points in the cross section of the light blocking structure formed by the first light blocking structure 421 and the second light blocking structure 431 in FIG. 4G.

Figure 4G:
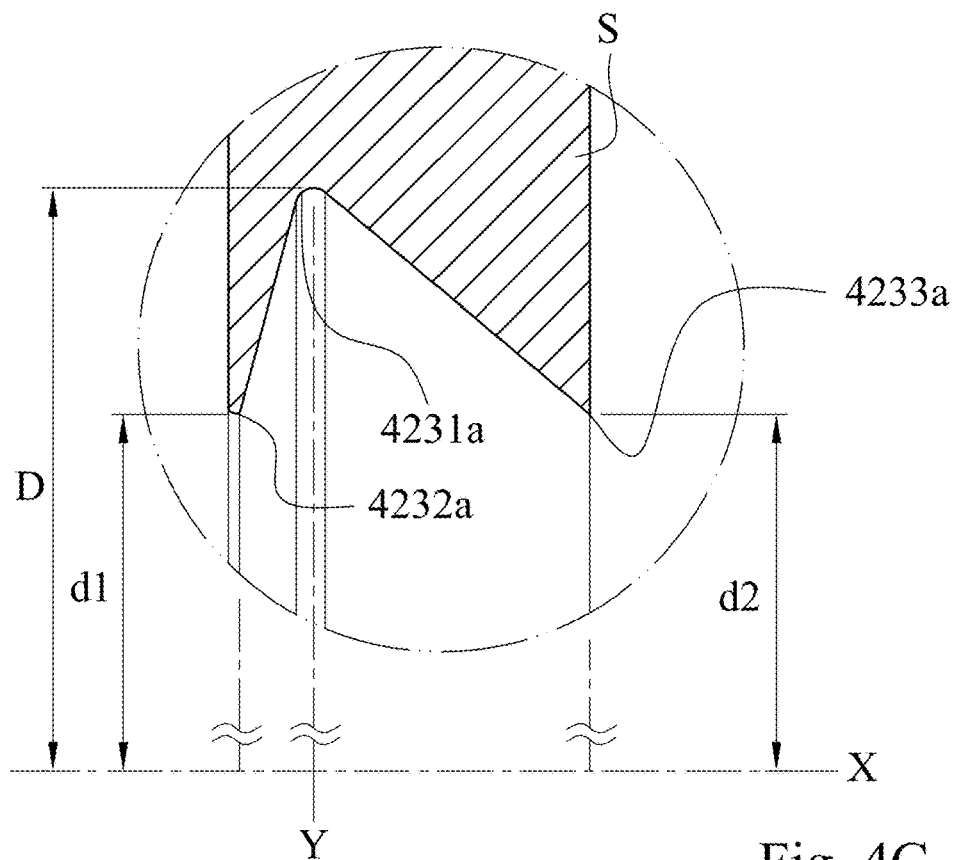
FIG. 4G shows a schematic view of parameters of the light passing hole of the 1st example according to the 4th embodiment in FIG. 4G.
Figure 4H:
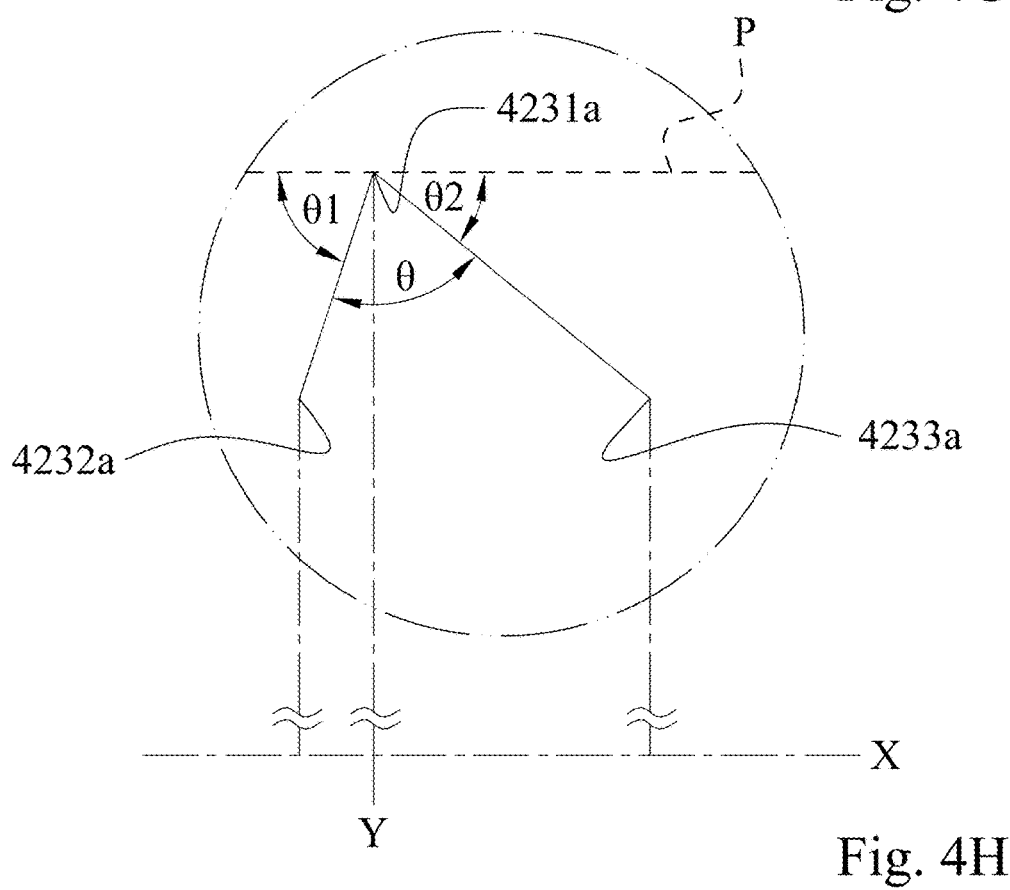
FIG. 4H shows another schematic view of parameters of the light passing hole of the 1st example according to the 4th embodiment in FIG. 4F.

FIG. 4G shows a schematic view of parameters of the light passing hole 423 of the 1st example according to the 4th embodiment in FIG. 4G. FIG. 4H shows another schematic view of parameters of the light passing hole 423 of the 1st example according to the 4th embodiment in FIG. 4F. In FIGS. 4G and 4H, when a distance between the valley point 4231a and the optical axis X is D, a distance between the first crest point 4232a and the optical axis X is d1, and a distance between the second crest point 4233a and the optical axis X is d2, an included angle θ is formed between a line joining the valley point 4231a and the first crest point 4232a and a line joining the valley point 4231a and the second crest point 4233a, an included angle θ1 is formed between the line joining the valley point 4231a and the first crest point 4232a and a line P parallel to the optical axis X, and an included angle θ2 is formed between the line joining the valley point 4231a and the second crest point 4233a and the line P parallel to the optical axis X, and an elastic drafting ratio defined by the cross section of the light passing hole 423 is EDR (EDR=[(D−d1)/D]×100%), the aforementioned parameters can be satisfied in the following Table 8.

TABLE 8 the 1st example of the 4th embodiment

| D (mm) | 3.28 | θ (degree) | 68.9 |
|---|---|---|---|
| d1 (mm) | 2.65 | θ1 (degree) | 71.8 |
| d2 (mm) | 2.65 | θ2 (degree) | 39.3 |
| d1/D | 0.808 | EDR (%) | 19.2 |
| d2/D | 0.808 | | |

Figure 4I:
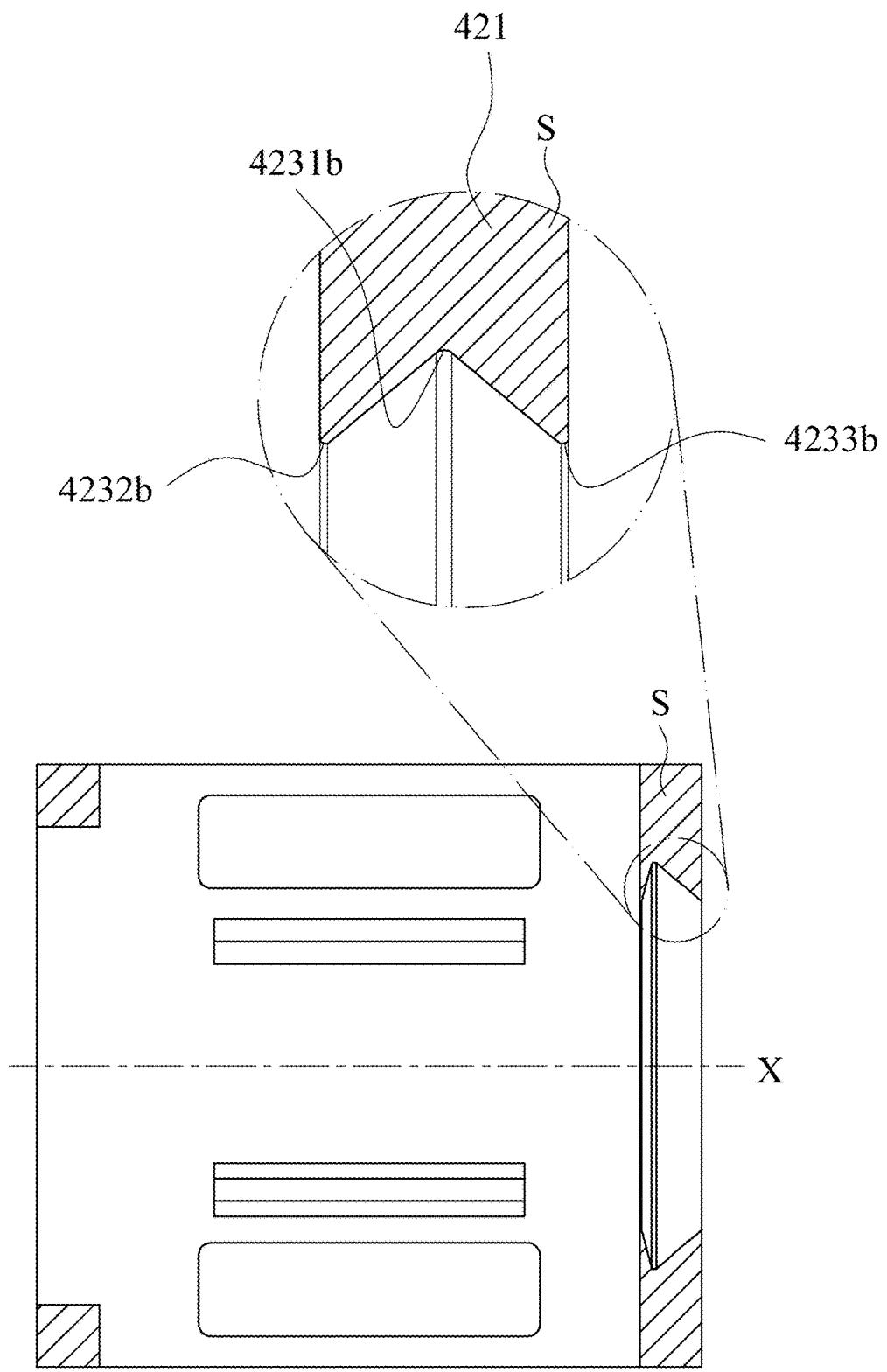
FIG. 4I shows a cross-sectional view of the first molded substructure and the second molded substructure of the 2nd example along a cutting line 4F-4F according to the 4th embodiment in FIG. 4D.

FIG. 4I shows a cross-sectional view of the first molded substructure 420c and the second molded substructure 430b of the 2nd example along a cutting line 4F-4F according to the 4th embodiment in FIG. 4D. In FIG. 4I, in the 2nd example of the 4th embodiment, a cross section of the light passing hole 423 which passes through the optical axis X includes a valley point 4231b, a first crest point 4232b and a second crest point 4233b. Specifically, the aforementioned cross section is an interface of coupling between the first molded substructure 420c and the second molded substructure 430b, but the present disclosure is not limited thereto. The valley point 4231b is a farthest point away from the optical axis X in the cross section. The first crest point 4232b is a closest point to the optical axis X in the cross section. The second crest point 4233b is a closest point to the optical axis X in another side relative to the first crest point 4232b based on a perpendicular line Y (shown in FIG. 4G) from the valley point 4231b to the optical axis X. Specifically, the valley point 4231b, the first crest point 4232b and the second crest point 4233b are the points in the cross section of the light blocking structure formed by the first light blocking structure 421 and the second light blocking structure 431 in FIG. 4J.

Figure 4J:
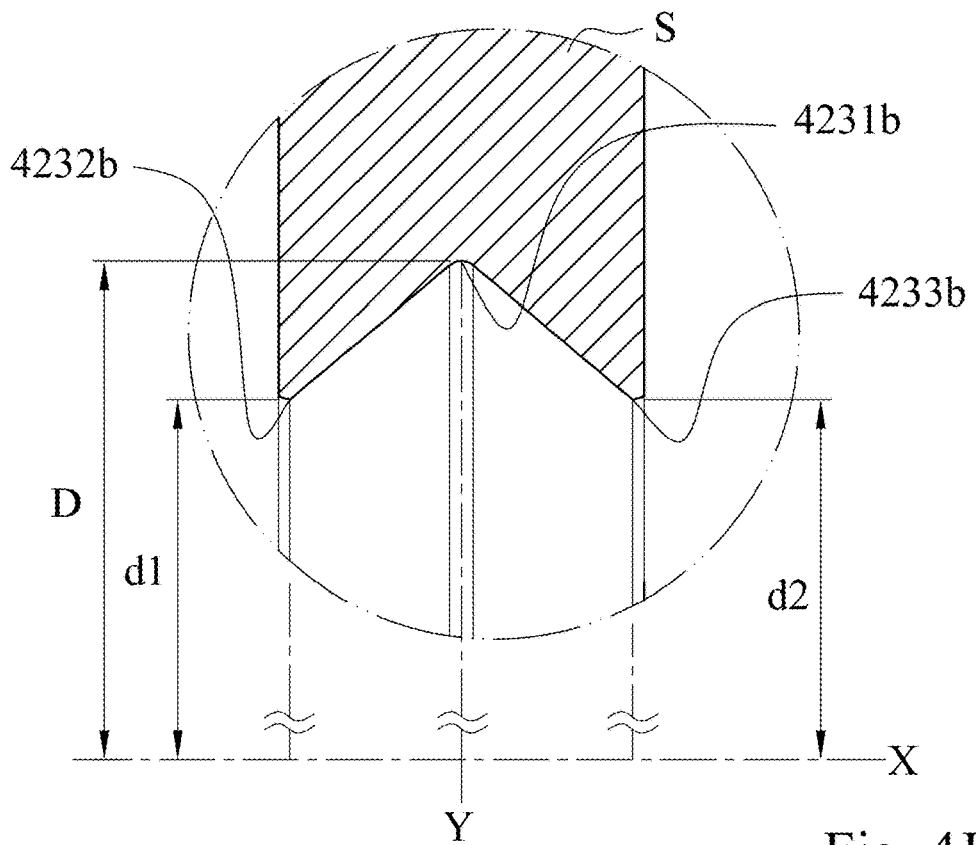
FIG. 4J shows a schematic view of parameters of the light passing hole of the 2nd example according to the 4th embodiment in FIG. 4I.
Figure 4K:
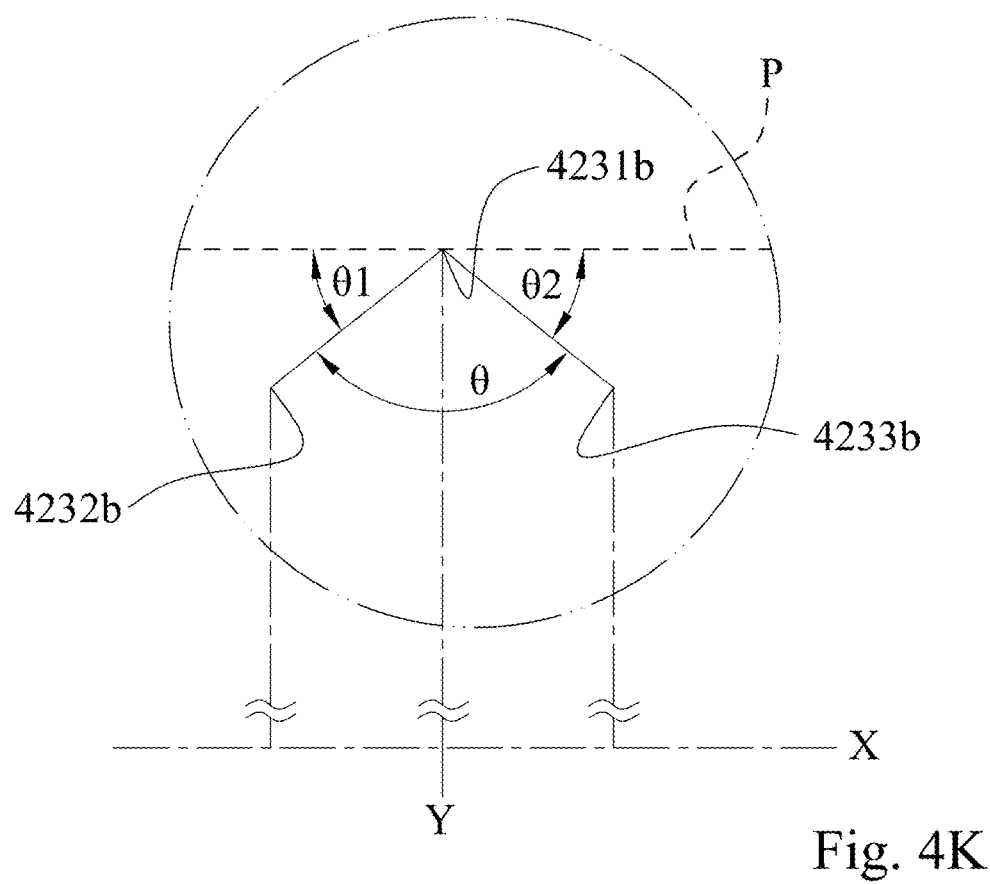
FIG. 4K shows another schematic view of parameters of the light passing hole of the 2nd example according to the 4th embodiment in FIG. 4I.

FIG. 4J shows a schematic view of parameters of the light passing hole 423 of the 2nd example according to the 4th embodiment in FIG. 4I. FIG. 4K shows another schematic view of parameters of the light passing hole 423 of the 2nd example according to the 4th embodiment in FIG. 4I. In FIGS. 4J and 4K, when a distance between the valley point 4231b and the optical axis X is D, a distance between the first crest point 4232b and the optical axis X is d1, and a distance between the second crest point 4233b and the optical axis X is d2, an included angle θ is formed between a line joining the valley point 4231a and the first crest point 4232b and a line joining the valley point 4231b and the second crest point 4233b, an included angle θ1 is formed between the line joining the valley point 4231a and the first crest point 4232a and a line P parallel to the optical axis X, and an included angle θ2 is formed between the line joining the valley point 4231b and the second crest point 4233b and the line P parallel to the optical axis X, and an elastic drafting ratio defined by the cross section of the light passing hole 423 is EDR (EDR=[(D−d1)/D]×100%), the aforementioned parameters can be satisfied in the following Table 9.

TABLE 9

| the 2nd example of the 4th embodiment | | | |
|---|---|---|---|
| D (mm) | 3.03 | θ (degree) | 102.2 |
| d1 (mm) | 2.65 | θ1 (degree) | 38.9 |
| d2 (mm) | 2.65 | θ2 (degree) | 38.9 |
| d1/D | 0.875 | EDR (%) | 12.5 |
| d2/D | 0.875 | | |

5th Embodiment

FIG. 5A shows a three-dimensional schematic view of an imaging lens assembly module 500 according to the 5th embodiment of the present disclosure. FIG. 5B shows an exploded view of the imaging lens assembly module 500 according to the 5th embodiment in FIG. 5A. FIG. 5C shows another perspective of the exploded view of the imaging lens assembly module 500 according to the 5th embodiment in FIG. 5A. In FIGS. 5A-5C, a camera module (its reference numeral is omitted) includes an imaging lens assembly module 500 and an image surface 560 (shown in FIG. 5K). The imaging lens assembly module includes a lens carrier (its reference numeral is omitted). The lens carrier includes an imaging lens element set 510, a light-folding element 540, a first molded structure 520, a second molded structure 530, and a fixing base 550.

The imaging lens element set 510 defines the optical axis X. The light-folding element 540 is for folding an imaging light from an incident light path L1 (shown in FIG. 5K) of the light-folding element 540 into an emergent light path L2 (shown in FIG. 5K) of the light-folding element 540, and the light-folding element 540 is disposed on the fixing base 550. The first molded structure 520 is disposed correspondingly to the light-folding element 540 and includes a first light blocking structure 521. The second molded structure 530 can be coupled to the first molded structure 520 for forming an inner space (its reference numeral is omitted). At least one of the imaging lens element set 510 and the light-folding element 540 is accommodated in the inner space, and the second molded structure 530 includes a second light blocking structure 531.

FIG. 5D shows a schematic view of a coupling between the first molded structure 520 and the second molded structure 530 according to the 5th embodiment in FIG. 5A. FIG. 5E shows a side view of the coupling between the first molded structure 520 and the second molded structure 530 according to the 5th embodiment in FIG. 5A. FIG. 5F shows a cross-sectional view of the first molded structure 520 and the second molded structure 530 along a cutting line 5F-5F according to the 5th embodiment in FIG. 5E. In FIGS. 5D-5F, the first molded structure 520 is coupled to the second molded structure 530 so that the first light blocking structure 521 and the second light blocking structure 531 are disposed correspondingly to each other for forming a light passing hole, that is, a first light passing hole 523. In the 5th embodiment, the imaging lens element set 510 and the light-folding element 540 are accommodated in the inner space. In detail, the first molded structure 520 can be coupled to the second molded structure 530 by point glue adhesion or design of plastic element engagement, but the present disclosure is not limited thereto.

FIG. 5G shows a side view of the first molded structure 520 and the second molded structure 530 according to the 5th embodiment in FIG. 5A. FIG. 5H shows another side view of the first molded structure 520 and the second molded structure 530 according to the 5th embodiment in FIG. 5A.

FIG. 5I shows still another side view of the first molded structure 520 and the second molded structure 530 according to the 5th embodiment in FIG. 5A. In FIGS. 5A-5G, the first molded structure 520 can further include a third light blocking structure 522, the second molded structure 530 can further include a fourth light blocking structure 532, and the first molded structure 520 is coupled to the second molded structure 530 so that the third light blocking structure 522 is disposed correspondingly to the fourth light blocking structure 532 for forming another light passing hole, that is, a second light passing hole 524. Structures of the first light passing hole 523 and the second light passing hole 524 can be the same as the structures of the light passing hole 123, 223, 224, 323a, 323b, 423 in the 1st embodiment to the 4th embodiment, and it will not be described again herein. Hence, one lens carrier can include more than two light passing holes so as to correspond to the more sophisticated optical design and decrease assembling tolerance.

FIG. 5J shows a cross-sectional view of the imaging lens assembly module 500 along a cutting line 5F-5F according to the 5th embodiment in FIG. 5E. FIG. 5K shows a schematic view of the incident light path L1 and the emergent light path L2 of the light-folding element 540 according to the 5th embodiment in FIG. 5A. In FIGS. 5J and 5K, the light-folding element 540 can be a prism or a mirror, but the present disclosure is not limited thereto. The light-folding element can fold the light path of imaging light by at least one reflecting surface therein. A number of times of folding increase as a number of reflecting surfaces in the light-folding element. Specifically, when a light path of imaging light enters the imaging lens assembly module 500 along the incident light path L1, the light-folding element 540 folds the light path of imaging light from the incident light path L1 into the emergent light path L2 so as to fold the light path of imaging light into the image surface 560. Via the configuration of the light-folding element 540, periscope type imaging lens assembly can be manufactured. Hence, the requirement of a light path with long focal length can be satisfied. In the 5th embodiment, the light-folding element 540 is a prism. The incident light path L1 of the light-folding element 540 passes through the first light passing hole 523; the emergent light path L2 of the light-folding element 540 passes through the second light passing hole 524. Thus, a light blocking requirement of the emergent light path L2 can be satisfied. Hence, the generation of stray light can be reduced.

6th Embodiment

FIG. 6A shows a three-dimensional schematic view of a camera module 600 according to the 6th embodiment of the present disclosure. FIG. 6B shows a cross-sectional view of the camera module 600 along a cutting line 6B-6B according to the 6th embodiment in FIG. 6A. FIG. 6C shows a cross-sectional view of the first molded structure 620, the second molded structure 630, the third molded structure 640 and the fourth molded structure 660 along a cutting line 6B-6B according to the 6th embodiment in FIG. 6A. FIG. 6D shows another cross-sectional view of the first molded structure 620, the second molded structure 630, the third molded structure 640 and the fourth molded structure 660 along a cutting line 6B-6B according to the 6th embodiment in FIG. 6A. In FIGS. 6A-6D, a camera module 600 includes an imaging lens assembly module (its reference numeral is omitted) and an image surface 670. The imaging lens assembly module includes a lens carrier (its reference numeral is omitted). The lens carrier includes an imaging lens element set 610, a light-folding element 650, a first molded structure 620, a second molded structure 630, a third molded structure 640, and a fourth molded structure 660.

The imaging lens element set 610 defines the optical axis X. The light-folding element 650 is for folding an imaging light from an incident light path L1 (shown in FIG. 6E) of the light-folding element 650 into an emergent light path L2 (shown in FIG. 6E) of the light-folding element 650. In the 6th embodiment, the third molded structure 640 is coupled to the first molded structure 620 and the second molded structure 630 for forming an inner space (its reference numeral is omitted). The imaging lens element set 610 is accommodated in the inner space.

Moreover, the first molded structure 620 is disposed correspondingly to the imaging lens element set 610 and includes first light blocking structures 621 (shown in FIG. 6H), 621a. The second molded structure 630 is disposed correspondingly to the imaging lens element set 610 and includes second light blocking structures 631, 631a. The third molded structure 640 is coupled to the first molded structure 620 and the second molded structure 630 for forming an inner space (its reference numeral is omitted), and at least one of the imaging lens element set 610 and the light-folding element 650 is accommodated in the inner space. In the 6th embodiment, the imaging lens element set 610 is accommodated in the inner space, but the present disclosure is not limited thereto. The third molded structure 640 includes third light blocking structures 641, 641a. The first molded structure 620 and the second molded structure 630 are coupled to the third molded structure 640 so that the first light blocking structure 621a, the second light blocking structure 631a and the third light blocking structure 641a are disposed correspondingly to each other for forming a light passing hole, that is, a first light passing hole 622. A structure of the first light passing hole 622 can be the same as the structures of the light passing hole 123, 223, 224, 323a, 323b, 423, 523, 524 in the 1st embodiment to the 5th embodiment, and it will not be described again herein.

Specifically, the fourth molded structure 660 can include a fourth light blocking structure 661, and the fourth light blocking structure 661 forms a light passing hole, that is, a second light passing hole 662. The second light passing hole 662 is corresponding to the fourth light blocking structure 661. A structure of the second light passing hole 662 can be the same as the structures of the light passing hole 123, 223, 224, 323a, 323b, 423, 523, 524 in the 1st embodiment to the 5th embodiment, and it will not be described again herein.

FIG. 6E shows a schematic view of the incident light path L1 and the emergent light path L2 of the light-folding element 650 according to the 6th embodiment in FIG. 6A. In FIG. 6E, when a light path of imaging light enters the imaging lens element set 610 along the incident light path L1, the light-folding element 650 folds the light path of imaging light from the incident light path L1 into the emergent light path L2 so that the light path of imaging light can pass through the second light passing hole 662 and the light path of imaging light is folded into the image surface 670. Thus, a light blocking requirement of the emergent light path L2 can be satisfied. Hence, the generation of stray light can be reduced. In detail, the incident light path L1 is parallel to the optical axis X. Via the light-folding element, the more ideal configuration of the imaging lens assembly module can be achieved so that a light path with a long focal length can be accommodated in the small inner space. Hence, the feasibility of the micro lens assembly can be provided.

FIG. 6F shows an exploded side view of the imaging lens element set 610, the first molded structure 620, the second molded structure 630 and the third molded structure 640 according to the 6th embodiment in FIG. 6A. FIG. 6G shows a schematic view of the first molded structure 620 and a mold M according to the 6th embodiment in FIG. 6F. FIG. 6H shows an exploded view of the imaging lens element set 610, the first molded structure 620, the second molded structure 630 and the third molded structure 640 according to the 6th embodiment in FIG. 6F. FIG. 6I shows another exploded view of the imaging lens element set 610, the first molded structure 620, the second molded structure 630 and the third molded structure 640 according to the 6th embodiment in FIG. 6F. FIG. 6J shows a schematic view of the combination of the first molded structure 620, the second molded structure 630 and the third molded structure 640 according to the 6th embodiment in FIG. 6F. In FIGS. 6F and 6G, the first molded structure 620 can be manufactured via elastic demolding from a mold M, and the mold M can be removed from the first molded structure 620 along a removing direction M1. The second molded structure 630 and the third molded structure 640 can also be manufactured via elastic demolding from the mold M, but the present disclosure is not limited thereto. During the process of molding, the more sophisticated molding products can be achieved by design of molding because of elasticity of plastic material. Via the light blocking structure with concave-convex shape, the non-imaging light can be reflected so as to decrease the intensity of the non-imaging light. Via the configuration of the first molded structure 620, the second molded structure 630 and the third molded structure 640, the lens carrier can be a detachable molded product so as to reduce the difficulty of demolding. Hence, the yield rate of the products can be improved.

In FIGS. 6H-6J, the first molded structure 620 and the second molded structure 630 are coupled to the third molded structure 640 so that the first light blocking structure 621, the second light blocking structure 631 and the third light blocking structure 641 are disposed correspondingly to each other for forming a light passing hole, that is, a third light passing hole 623. In other words, in the 6th embodiment, the first molded structure 620 and the second molded structure 630 are coupled to the third molded structure 640 so that each of the first light blocking structure 621a, the second light blocking structure 631a and the third light blocking structure 641a, and the first light blocking structure 621, the second light blocking structure 631 and the third light blocking structure 641 is corresponding to forming the first light passing hole 622 and the third light passing hole 623, respectively. Via a molded structure formed by the coupling of a plurality of molded structures, it is favorable for corresponding to the design requirement of the more sophisticated light blocking structure. Moreover, the incident light path L1 of the light-folding element 650 can pass through the third light passing hole 623. Hence, the generation of stray light can be reduced. Thus, a light blocking requirement of the incident light path L1 can be satisfied.

FIG. 6K shows a partial cross-sectional view of the imaging lens element set 610, the first molded structure 620, the second molded structure 630 and the third molded structure 640 of the 1st example according to the 6th embodiment in FIG. 6J. It has to be specified that the third light passing hole 623 formed by the first light blocking structure 621, the second light blocking structure 631 and the third light blocking structure 641 in the 6th embodiment can provide two different structures of the light passing hole of the 1st example and the 2nd example according to different requirements of optical design. To be simplified, the third light passing hole 623 of the 1st example and the 2nd example according to the 6th embodiment are labeled as the same, and the other elements and the configuration thereof of the 1st example and the 2nd example according to the 6th embodiment are the same, and it will not be described herein.

In FIG. 6K, a cross section of the third light passing hole 623 which passes through the optical axis X includes a valley point 6231a, a first crest point 6232a and a second crest point 6233a. Specifically, the aforementioned cross section is an interface of coupling between the first molded structure 620, the second molded structure 630 and the third molded structure 640, but the present disclosure is not limited thereto. The valley point 6231a is a farthest point away from the optical axis X in the cross section. The first crest point 6232a is a closest point to the optical axis X in the cross section. The second crest point 6233a is a closest point to the optical axis X in another side relative to the first crest point 6232a based on a perpendicular line Y (shown in FIG. 6L) from the valley point 6231a to the optical axis X. Specifically, the valley point 6231a, the first crest point 6232a and the second crest point 6233a are the points in the cross section of the light blocking structure formed by the first light blocking structure 621, the second light blocking structure 631 and the third light blocking structure 641 in FIG. 6K.

FIG. 6L shows a schematic view of parameters of the third light passing hole 623 of the 1st example according to the 6th embodiment in FIG. 6K. FIG. 6M shows another schematic view of parameters of the third light passing hole 623 of the 1st example according to the 6th embodiment in FIG. 6K. In FIGS. 6L and 6M, when a distance between the valley point 6231a and the optical axis X is D, a distance between the first crest point 6232a and the optical axis X is d1, and a distance between the second crest point 6233a and the optical axis X is d2, an included angle θ is formed between a line joining the valley point 6231a and the first crest point 6232a and a line joining the valley point 6231a and the second crest point 6233a, an included angle θ1 is formed between the line joining the valley point 6231a and the first crest point 6232a and a line P parallel to the optical axis X, and an included angle θ2 is formed between the line joining the valley point 6231a and the second crest point 6233a and the line P parallel to the optical axis X, and an elastic drafting ratio defined by the cross section of the third light passing hole 623 is EDR (EDR=[(D−d1)/D]×100%), the aforementioned parameters can be satisfied in the following Table 10.

TABLE 10 the 1st example of the 6th embodiment

| D (mm) | 2.83 | θ (degree) | 90.8 |
| d1 (mm) | 2.75 | θ1 (degree) | 44.5 |
| d2 (mm) | 2.75 | θ2 (degree) | 44.7 |
| d1/D | 0.972 | EDR (%) | 2.8 |
| d2/D | 0.972 | | |

FIG. 6N shows a partial cross-sectional view of the imaging lens element set 610, the first molded structure 620, the second molded structure 630 and the third molded structure 640 of the 2nd example according to the 6th embodiment in FIG. 6J. In FIG. 6N, a cross section of the third light passing hole 623 which passes through the optical axis X includes a valley point 6231b, a first crest point 6232b and a second crest point 6233b. Specifically, the aforementioned cross section is an interface of coupling between the first molded structure 620, the second molded structure 630 and the third molded structure 640, but the present disclosure is not limited thereto. The valley point 6231b is a farthest point away from the optical axis X in the cross section. The first crest point 6232b is a closest point to the optical axis X in the cross section. The second crest point 6233b is a closest point to the optical axis X in another side relative to the first crest point 6232b based on a perpendicular line Y (shown in FIG. 6O) from the valley point 6231b to the optical axis X. Specifically, the valley point 6231b, the first crest point 6232b and the second crest point 6233b are the points in the cross section of the light blocking structure formed by the first light blocking structure 621, the second light blocking structure 631 and the third light blocking structure 641 in FIG. 6N.

FIG. 6O shows a schematic view of parameters of the third light passing hole 623 of the 2nd example according to the 6th embodiment in FIG. 6N. FIG. 6P shows another schematic view of parameters of the third light passing hole 623 of the 2nd example according to the 6th embodiment in FIG. 6N. In FIGS. 6O and 6P, when a distance between the valley point 6231b and the optical axis X is D, a distance between the first crest point 6232b and the optical axis X is d1, and a distance between the second crest point 6233b and the optical axis X is d2, an included angle θ is formed between a line joining the valley point 6231b and the first crest point 6232b and a line joining the valley point 6231b and the second crest point 6233b, an included angle θ1 is formed between the line joining the valley point 6231b and the first crest point 6232b and a line P parallel to the optical axis X, and an included angle θ2 is formed between the line joining the valley point 6231b and the second crest point 6233b and the line P parallel to the optical axis X, and an elastic drafting ratio defined by the cross section of the third light passing hole 623 is EDR (EDR=[(D−d1)/D]×100%), the aforementioned parameters can be satisfied in the following Table 11.

TABLE 11 the 2nd example of the 6th embodiment

| D (mm) | 2.82 | θ (degree) | 92.7 |
| d1 (mm) | 2.75 | θ1 (degree) | 37.4 |
| d2 (mm) | 2.72 | θ2 (degree) | 49.9 |
| d1/D | 0.975 | EDR (%) | 2.5 |
| d2/D | 0.965 | | |

7th Embodiment

FIG. 7A shows a schematic view of an electronic device 700 according to the 7th embodiment of the present disclosure. FIG. 7B shows another schematic view of the electronic device 700 according to the 7th embodiment in FIG. 7A. In FIG. 7A and FIG. 7B, the electronic device 700 according to the 7th embodiment is a smartphone, the electronic device 700 includes a camera module 701 (as shown in FIG. 7C), and the camera module 701 is an ultra-wide angle camera module 702, a high-pixel camera module 703 and a telephoto camera module 704, wherein an image sensor (not shown) is disposed on an image surface (not shown) of the camera module 701. Furthermore, the camera module 701 can be any one according to the 1st embodiment to the 6th embodiment, but the present disclosure is not limited thereto. Hence, it is favorable for fulfilling a mass production and an appearance requirement of a camera module in the recent market of electronic devices.

Furthermore, the user can activate the capturing mode by a user interface 705 of the electronic device 700, wherein the user interface 705 according to the 7th embodiment can be a touch screen for displaying a screen and having a touch function, and the user interface 705 can be for manually adjusting field of view to switch the different camera module 701. At this moment, the imaging lens assembly module of the camera module 701 collects an imaging light on the image sensor and outputs electronic signals associated with images to an image signal processor (ISP) 706.

FIG. 7C shows a block diagram of the electronic device 700 according to the 7th embodiment in FIG. 7A. In FIGS. 7B and 7C, the electronic device 700 can further include an optical anti-shake mechanism 707. Moreover, the electronic device 700 can further include at least one focusing assisting module 710 and at least one sensing component 708. The focusing assisting module 710 can be a flash module 709, an infrared distance measurement component, a laser focus module, etc. The flash module 709 is for compensating the color temperature. The sensing component 708 can have functions for sensing physical momentum and kinetic energies, such as an accelerator, a gyroscope, and a Hall effect element, so as to sense shaking or jitters applied by hands of the user or external environments. Thus the autofocus function and the optical anti-shake mechanism 707 of the camera module 701 disposed on the electronic device 700 can function to obtain a great image quality and facilitate the electronic device 700 according to the present disclosure to have a capturing function with multiple modes, such as taking optimized selfies, high dynamic range (HDR) with a low light source, 4K resolution recording, etc. Furthermore, the user can visually see the captured image of the camera through the user interface 705 and manually operate the view finding range on the user interface 705 to achieve the auto focus function of what you see is what you get.

Furthermore, the camera module 701, the image sensor, the optical anti-shake mechanism 707, the sensing component 708 and the focusing assisting module 710 can be disposed on a flexible printed circuit board (FPC) (its reference numeral is omitted) and electrically connected to the ISP 706 and so on via a connector (not shown) so as to operate a picturing process. Recent electronic devices such as smartphones have a trend towards thinness and lightness. The imaging lens assembly module and the related elements are disposed on a FPC and circuits are assembled into a main board of an electronic device by a connector. Hence, it can fulfill a mechanical design of a limited inner space of the electronic device and a requirement of a circuit layout and obtain a larger allowance, and it is also favorable for an autofocus function of the imaging lens assembly module obtaining a flexible control via a touch screen of the electronic device. In the 7th embodiment, the electronic device 700 can include a plurality of the sensing component 708 and a plurality of the focusing assisting module 710, and the sensing component 708 and the focusing assisting module 710 are disposed on a FPC and another at least one FPC (not shown) and electrically connected to the ISP 706 and so on via a corresponding connector so as to operate a picturing process. In other embodiment (not shown), the sensing component and the auxiliary optical elements can be disposed on a main board of an electronic device or a board of the other form according to a mechanical design and a requirement of a circuit layout.

Furthermore, the electronic device 700 can further include, but not be limited to, a display, a control unit, a storage unit, a random-access memory (RAM), a read-only memory (ROM), or the combination thereof.

FIG. 7D is a schematic view of an image captured by the ultra-wide angle camera module 702 according to the 7th embodiment in FIG. 7A. In FIG. 7D, a larger ranged image can be captured via the ultra-wide angle camera module 702, and the ultra-wide angle camera module 702 has a function for containing more views.

FIG. 7E is a schematic view of an image captured by the high-pixel camera module 703 according to the 7th embodiment in FIG. 7A. In FIG. 7E, a certain ranged and high-pixel image can be captured via the high-pixel camera module 703, and the high-pixel camera module 703 has a function for high resolution and low distortion.

FIG. 7F is a schematic view of an image captured by the telephoto camera module 704 according to the 7th embodiment in FIG. 7A. In FIG. 7F, a far image can be captured and enlarged to a high magnification via the telephoto camera module 704, and the telephoto camera module 704 has a function for a high magnification.

In FIGS. 7D-7F, when an image is captured via the camera module 701 having various focal lengths and processed via a technology of an image processing, a zoom function of the electronic device 700 can be achieved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An imaging lens assembly driving module, comprising:
  a lens carrier defining an optical axis;
  a first molded structure disposed correspondingly to the lens carrier and comprising a first light blocking structure;
  a second molded structure coupled to the first molded structure for forming an inner space, the lens carrier accommodated in the inner space, and the second molded structure comprising a second light blocking structure;
  a driving mechanism for driving the lens carrier to move along the optical axis; and
  a mechanical member for connecting the lens carrier and the first molded structure;
  wherein the first molded structure is coupled to the second molded structure so that the first light blocking structure and the second light blocking structure are disposed correspondingly to each other for forming a light passing hole, and the optical axis passes through the light passing hole;
  wherein a cross section of the light passing hole passing through the optical axis comprises:
  a valley point being a farthest point away from the optical axis in the cross section;
  a first crest point being a closest point to the optical axis in the cross section; and
  a second crest point being a closest point to the optical axis in another side relative to the first crest point based on a perpendicular line from the valley point to the optical axis;

wherein a distance between the valley point and the optical axis is D, a distance between the first crest point and the optical axis is d1, a distance between the second crest point and the optical axis is d2, and the following conditions are satisfied:

$0.1<d1/D<0.95$; and $0.1<d2/D<0.95$.

2. The imaging lens assembly driving module of claim 1, wherein the distance between the valley point and the optical axis is D, the distance between the first crest point and the optical axis is d1, the distance between the second crest point and the optical axis is d2, and the following conditions are satisfied:

$0.5<d1/D<0.91$; and $0.5<d2/D<0.91$.

3. The imaging lens assembly driving module of claim 1, wherein the optical axis passes through the light passing hole so that the lens carrier and the light passing hole are configured coaxially.

4. The imaging lens assembly driving module of claim 3, wherein the light passing hole surrounds the optical axis and is in shape of a closed ring.

5. The imaging lens assembly driving module of claim 1, wherein the mechanical member comprises at least one ferromagnetic element, and the at least one ferromagnetic element is corresponding to the driving mechanism.

6. The imaging lens assembly driving module of claim 1, wherein an included angle θ is formed between a line joining the valley point and the first crest point and a line joining the valley point and the second crest point, an included angle θ1 is formed between the line joining the valley point and the first crest point and a line parallel to the optical axis, and an included angle θ2 is formed between the line joining the valley point and the second crest point and the line parallel to the optical axis.

7. The imaging lens assembly driving module of claim 6, wherein the included angle θ is formed between the line joining the valley point and the first crest point and a line joining the valley point and the second crest point, the included angle θ1 is formed between the line joining the valley point and the first crest point and the line parallel to the optical axis, the included angle θ2 is formed between the line joining the valley point and the second crest point and the line parallel to the optical axis, and the following condition is satisfied:

θ+θ1+θ2=180 degrees.

8. The imaging lens assembly driving module of claim 7, wherein the included angle θ1 is formed between the line joining the valley point and the first crest point and the line parallel to the optical axis, the included angle θ2 is formed between the line joining the valley point and the second crest point and the line parallel to the optical axis, and the following conditions are satisfied:

5 degrees<θ1<157 degrees; and 5 degrees<θ2<157 degrees.

9. A camera module, comprising:
the imaging lens assembly driving module of claim 1.

10. An electronic device, comprising:
the camera module of claim 9; and
an image sensor disposed on an image surface of the camera module.

11. An imaging lens assembly driving module, comprising:
a lens carrier defining an optical axis;
a first molded structure disposed correspondingly to the lens carrier;
a second molded structure coupled to the first molded structure, wherein an inner space is formed by the first molded structure and the second molded structure, and the lens carrier is accommodated in the inner space;
a driving mechanism for driving the lens carrier to move along the optical axis; and
a mechanical member for connecting the lens carrier and the first molded structure;
wherein a light passing hole is formed by at least one of the first molded structure and the second molded structure and comprises a light blocking structure, and the optical axis passes through the light passing hole;
wherein a cross section of the light passing hole passing through the optical axis comprises:
a valley point being a farthest point away from the optical axis in the cross section;
a first crest point being a closest point to the optical axis in the cross section; and
a second crest point being a closest point to the optical axis in another side relative to the first crest point based on a perpendicular line from the valley point to the optical axis;
wherein a distance between the valley point and the optical axis is D, a distance between the first crest point and the optical axis is d1, a distance between the second crest point and the optical axis is d2, and the following conditions are satisfied:

$0.1<d1/D<d2/D$; and $0.9<d2/D<1.0$.

12. The imaging lens assembly driving module of claim 11, wherein the distance between the valley point and the optical axis is D, the distance between the first crest point and the optical axis is d1, the distance between the second crest point and the optical axis is d2, and the following conditions are satisfied:

$0.5<d1/D<d2/D$; and $0.94<d2/D<1.0$.

13. The imaging lens assembly driving module of claim 11, wherein the optical axis passes through the light passing hole so that the lens carrier and the light passing hole are configured coaxially.

14. The imaging lens assembly driving module of claim 13, wherein the light passing hole surrounds the optical axis and is in shape of a closed ring.

15. The imaging lens assembly driving module of claim 11, wherein the distance between the valley point and the optical axis is D, the distance between the first crest point and the optical axis is d1, an elastic drafting ratio defined by the cross section of the light passing hole is EDR, and the following conditions are satisfied:

$EDR=[(D-d1)/D]\times100\%$; and $0\%<EDR<15\%$.

16. The imaging lens assembly driving module of claim 11, further comprising:
at least one light-folding element for folding imaging light from an incident light path of the at least one light-folding element into an emergent light of the at least one light-folding element, and defining another optical axis.

17. The imaging lens assembly driving module of claim 16, wherein an inner space is formed by the first molded structure, and the at least one light-folding element is accommodated in the inner space.

18. The imaging lens assembly driving module of claim 11, wherein the mechanical member comprises at least one ferromagnetic element, and the at least one ferromagnetic element is corresponding to the driving mechanism.

19. The imaging lens assembly driving module of claim 11, wherein an included angle $\theta$ is formed between a line joining the valley point and the first crest point and a line joining the valley point and the second crest point, an included angle $\theta 1$ is formed between the line joining the valley point and the first crest point and a line parallel to the optical axis, and an included angle $\theta 2$ is formed between the line joining the valley point and the second crest point and the line parallel to the optical axis.

20. The imaging lens assembly driving module of claim 19, wherein the included angle $\theta$ is formed between the line joining the valley point and the first crest point and a line joining the valley point and the second crest point, the included angle $\theta 1$ is formed between the line joining the valley point and the first crest point and the line parallel to the optical axis, the included angle $\theta 2$ is formed between the line joining the valley point and the second crest point and the line parallel to the optical axis, and the following condition is satisfied:

$$\theta+\theta 1+\theta 2=180 \text{ degrees.}$$

21. The imaging lens assembly driving module of claim 20, wherein the included angle $\theta 1$ is formed between the line joining the valley point and the first crest point and the line parallel to the optical axis, the included angle $\theta 2$ is formed between the line joining the valley point and the second crest point and the line parallel to the optical axis, and the following conditions are satisfied:

$$5 \text{ degrees}<\theta 1<157 \text{ degrees; and}$$

$$5 \text{ degrees}<\theta 2<157 \text{ degrees.}$$

* * * * *